United States Patent
Shikii et al.

(10) Patent No.: US 10,272,920 B2
(45) Date of Patent: Apr. 30, 2019

(54) PROCESSING METHOD, PROGRAM, PROCESSING APPARATUS, AND DETECTION SYSTEM

(71) Applicant: Panasonic Intellectual Property Corporation of America, Torrance, CA (US)

(72) Inventors: Shinichi Shikii, Nara (JP); Koichi Kusukame, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/509,251

(22) Filed: Oct. 8, 2014

(65) Prior Publication Data
US 2015/0105976 A1    Apr. 16, 2015

(30) Foreign Application Priority Data
Oct. 11, 2013   (JP) ................................ 2013-214106

(51) Int. Cl.
*B60W 40/08*   (2012.01)
*B60W 50/14*   (2012.01)
(Continued)

(52) U.S. Cl.
CPC ......... *B60W 40/08* (2013.01); *B60H 1/00742* (2013.01); *B60K 28/00* (2013.01);
(Continued)

(58) Field of Classification Search
CPC ......... B60W 40/08; B60W 2040/0818; B60W 2040/0827; B60W 2040/0881;
(Continued)

(56) References Cited

U.S. PATENT DOCUMENTS 5,390,728 A     2/1995 Ban
6,556,137 B1 *  4/2003 Oka et al. .............. B60N 2/002
                                                280/735
(Continued)

FOREIGN PATENT DOCUMENTS

EP   2088014    8/2009
GB   2324864    11/1998
(Continued)

OTHER PUBLICATIONS

Translation of Tsuji JP 2004161087 A, Jun. 10, 2004.*
The Extended European Search Report dated Oct. 16, 2015 for the related European Patent Application No. 14188484.1.

*Primary Examiner* — Dale W Hilgendorf
(74) *Attorney, Agent, or Firm* — Greenblum & Bernstein, P.L.C.

(57) ABSTRACT

A processing method for a processing apparatus, the processing method causing a computer of the processing apparatus to execute steps comprising: detecting a position and a state of a passenger inside a vehicle on the basis of information indicating a state of space including seats of the vehicle, the information obtained from a sensor provided inside the vehicle, notifying an operator of the vehicle of the detected position and state of the passenger, and transmitting, upon detecting an operation, which is performed by the operator of the vehicle, for controlling a device near the detected position of the passenger, a control command corresponding to the operation to the device.

15 Claims, 56 Drawing Sheets

(51) Int. Cl.
    *B60K 28/00*     (2006.01)
    *B60K 28/04*     (2006.01)
    *B60K 28/06*     (2006.01)
    *B60K 35/00*     (2006.01)
    *B60K 37/06*     (2006.01)
    *B60H 1/00*     (2006.01)
    *G06F 3/0488*     (2013.01)
    *G06F 3/0481*     (2013.01)

(52) U.S. Cl.
    CPC .............. *B60K 28/04* (2013.01); *B60K 28/06* (2013.01); *B60K 35/00* (2013.01); *B60K 37/06* (2013.01); *B60W 50/14* (2013.01); *G06F 3/0488* (2013.01); *G06F 3/04817* (2013.01); *B60H 1/00785* (2013.01); *B60H 1/00964* (2013.01); *B60K 2350/00* (2013.01); *B60K 2350/2013* (2013.01); *B60K 2350/901* (2013.01); *B60K 2350/903* (2013.01); *B60K 2350/906* (2013.01); *B60W 2040/0818* (2013.01); *B60W 2040/0827* (2013.01); *B60W 2040/0881* (2013.01); *B60W 2050/146* (2013.01)

(58) Field of Classification Search
    CPC . B60W 50/14; B60W 2050/146; B60K 28/04; B60K 35/00; B60K 28/06; B60K 37/06; B60K 2035/901; B60K 2350/903; B60K 2350/906; B60K 2350/00; B60H 1/00742; B60H 1/00785; B60H 1/00964
    See application file for complete search history.

(56) References Cited

U.S. PATENT DOCUMENTS

| | | | | |
|---|---|---|---|---|
| 7,894,953 | B2* | 2/2011 | Geisler et al. ... | B60K 2350/906 701/36 |
| 2001/0039806 | A1* | 11/2001 | Kawai ................ | B60H 1/00792 62/229 |
| 2002/0089157 | A1* | 7/2002 | Breed et al. ....... | G06K 9/00362 280/735 |
| 2002/0091473 | A1* | 7/2002 | Gardner ............... | G07C 5/0808 701/32.7 |
| 2003/0023352 | A1* | 1/2003 | Ogino .................... | B60K 35/00 701/1 |
| 2005/0024342 | A1* | 2/2005 | Young .................... | G06F 3/016 345/173 |
| 2006/0284839 | A1* | 12/2006 | Breed .................... | B60W 50/16 345/156 |
| 2008/0211779 | A1* | 9/2008 | Pryor ................. | G01C 21/3664 345/173 |
| 2008/0302014 | A1* | 12/2008 | Szczerba ............... | B60K 35/00 49/31 |
| 2011/0246026 | A1* | 10/2011 | Shuster ................. | B60K 37/06 701/36 |
| 2011/0295466 | A1* | 12/2011 | Ostu et al. ........ | B60R 21/01534 701/45 |
| 2012/0142264 | A1 | 6/2012 | Sagou et al. | |
| 2012/0212353 | A1* | 8/2012 | Fung ..................... | B60K 28/06 701/41 |
| 2012/0232749 | A1* | 9/2012 | Schoenberg ............ | B60N 2/26 701/36 |
| 2013/0030645 | A1* | 1/2013 | Divine et al. .......... | B60K 35/00 701/36 |
| 2013/0226408 | A1* | 8/2013 | Fung ..................... | B60K 28/06 701/41 |
| 2013/0338857 | A1* | 12/2013 | Sampigethaya .... | G06F 19/3418 701/3 |

FOREIGN PATENT DOCUMENTS

| | | |
|---|---|---|
| JP | 05-278441 | 10/1993 |
| JP | 06-032139 | 2/1994 |
| JP | 2002-087184 A | 3/2002 |
| JP | 2004161087 A * | 6/2004 |
| JP | 2005-075198 A | 3/2005 |
| JP | 2009-255838 A | 11/2009 |
| JP | 2010-141843 A | 6/2010 |
| JP | 2011-230529 | 11/2011 |
| JP | 2011-257071 A | 12/2011 |

* cited by examiner

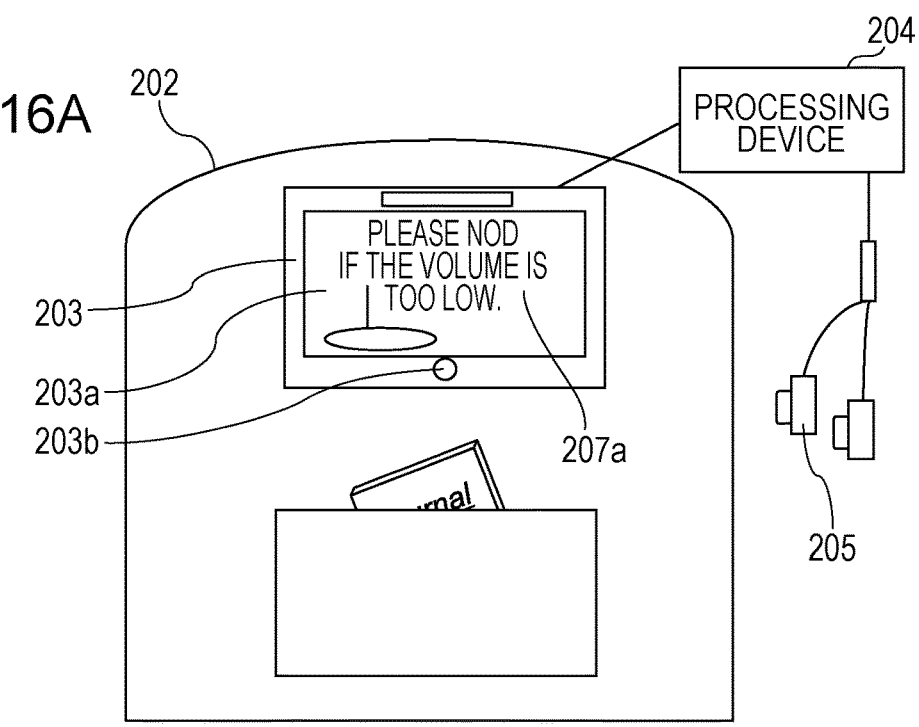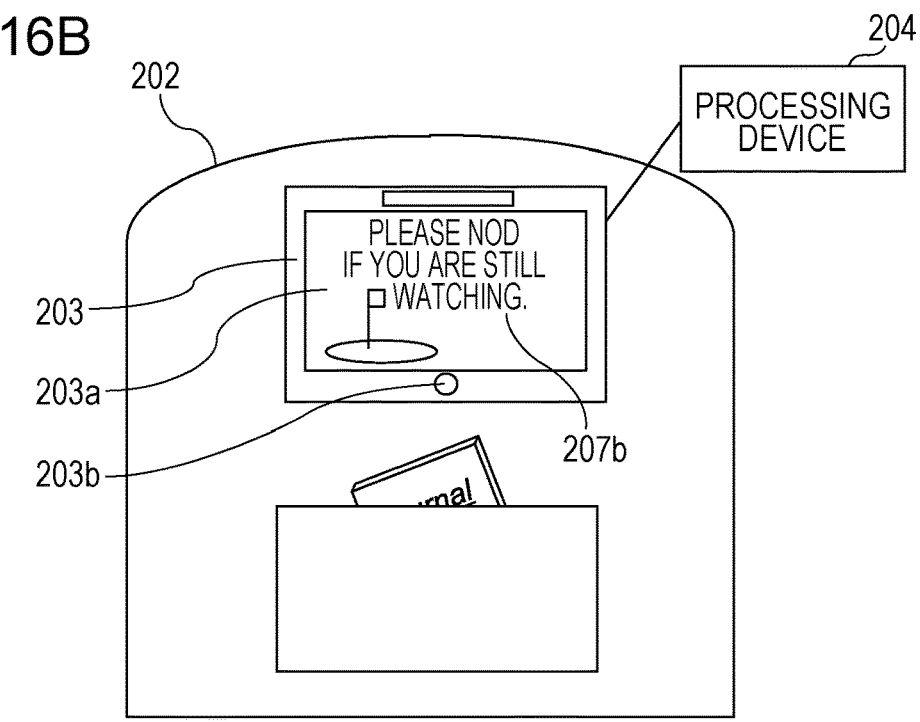

700

701a

736

1091a

1091b

PROCESSING METHOD, PROGRAM, PROCESSING APPARATUS, AND DETECTION SYSTEM

This application claims priority to Japanese Patent Application No. 2013-214106, filed on Oct. 11, 2013, the contents of which are hereby incorporated by reference.

BACKGROUND OF THE INVENTION

1. Field of the Invention

The present disclosure relates to a processing method, a program, a processing apparatus, and a detection system.

2. Description of the Related Art

In Japanese Patent Publication No. H06-032139, a configuration is disclosed in which an infrared sensor is provided inside an automobile and the number of passengers is detected on the basis of obtained infrared distribution in order to adjust air conditioning inside the automobile.

In addition, in Japanese Patent Publication No. H05-278441, a configuration is disclosed in which an infrared sensor provided inside an automobile detects the positions of passengers in order to optimize an acoustic environment and a lighting environment, as well as air conditioning.

In addition, in Japanese Patent Publication No. 2011-230529, a configuration is disclosed in which a vibration sensor determines whether an infant in an automobile is asleep in order to optimize air conditioning.

SUMMARY OF THE INVENTION

A processing method according to an aspect of the present disclosure is a processing method for a processing apparatus. The processing method causing a computer of the processing apparatus to execute steps comprising: (1) detecting a position and a state of a passenger inside a vehicle on the basis of information indicating a state of space including seats of the vehicle obtained from a sensor provided inside the vehicle, (2) notifying an operator of the vehicle of the detected position and state of the passenger, and (3) transmitting, upon detecting an operation, which is performed by the operator of the vehicle, for controlling a device near the detected position of the passenger, a control command corresponding to the operation to the device.

Comprehensive or specific aspects may be realized by a system, an apparatus, an integrated circuit, a computer program, or a recording medium, or may be realized by an arbitrary combination of a system, an apparatus, a method, an integrated circuit, a computer program, and a recording medium.

According to the present disclosure, further improvements can be achieved.

BRIEF DESCRIPTION OF THE DRAWINGS

FIG. 16A is a diagram illustrating an example of a display screen of a display apparatus in the detection system according to the second embodiment of the present disclosure.

FIG. 16B is a diagram illustrating another example of the display screen of the display apparatus in the detection system according to the second embodiment of the present disclosure.

DESCRIPTION OF THE PREFERRED EMBODIMENTS

Figure 1A:
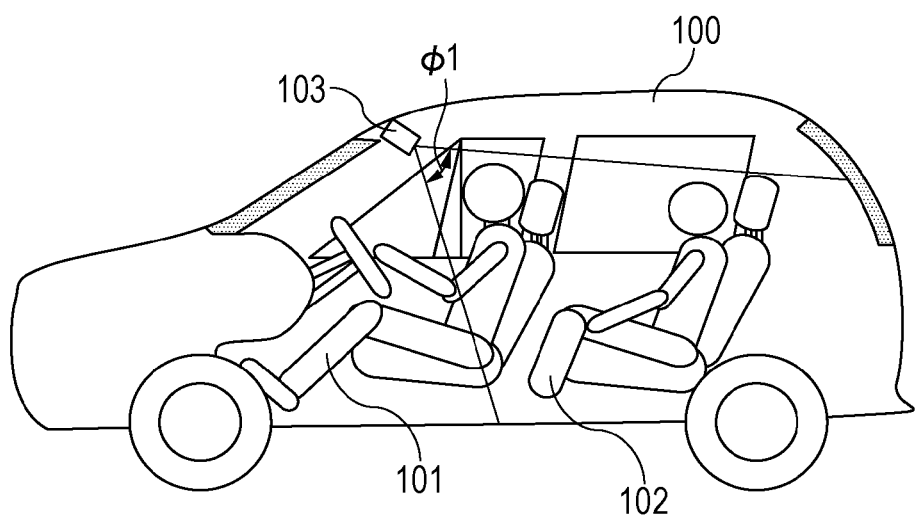
FIG. 1A is a schematic side view of the inside of an automobile in which a detection system according to a first embodiment of the present disclosure is installed.

First, problems examined by the present inventors to establish aspects of the invention disclosed in the present disclosure will be described.

Underlying Knowledge Forming Basis of the Present Disclosure

Infrared sensors are being actively developed these years. In a near-infrared region, where the wavelength ranges from 0.7 to 2.5 micrometers, infrared sensors are used, for example, in infrared cameras for security purposes, remote controls for television sets or the like, and the like. In a mid-infrared region, where the wavelength ranges from 2.5 to 4.0 micrometers, infrared sensors are often used for identifying a substance on the basis of an absorption spectrum unique to a measurement target obtained by performing spectrophotometry on a transmission spectrum of the measurement target. Furthermore, in a far-infrared region, where the wavelength ranges from 4.0 to 10 micrometers and a peak of a blackbody radiation spectrum near room temperature exists, infrared sensors can measure the surface temperature of an object in a non-contact manner by detecting infrared radiation from the object. This is generally used as thermography, in which the surface temperature of an object is detected in two dimensions. In addition, since far-infrared radiation from the surface of an object is directly detected, no particular light source is needed for measurement in darkness, and therefore thermography can be used in various situations. In an application, thermography can be used in a moving room in which a plurality of persons exist at more or less predetermined positions, such as in an automobile or in an airplane.

In Japanese Patent Publication No. H06-032139, a configuration is disclosed in which an infrared sensor is provided inside an automobile and the number of passengers is detected from obtained infrared distribution in order to optimize air conditioning in the automobile.

In Japanese Patent Publication No. H06-032139, however, the infrared sensor detects only whether the passengers are seated and does not detect the states of the passengers. Therefore, in order to check the states of the passengers, a driver needs to talk to or look at the passengers (for example, at a front passenger seat or a back seat). Therefore, the driver needs to perform a troublesome operation during driving, which is problematic.

In Japanese Patent Publication No. H05-278441, a configuration is disclosed in which an infrared sensor provided inside an automobile detects the positions of passengers in order to optimize an audio environment and a lighting environment, as well as air conditioning. In Japanese Patent Publication No. H05-278441, however, the infrared sensor detects only the positions of passengers and does not detect the states of the passengers. Therefore, in order to check the states of the passengers, a driver needs to talk to or look at the passengers. Therefore, the driver needs to perform a troublesome operation during driving, which is problematic.

In Japanese Patent Publication No. 2011-230529, a configuration is disclosed in which a vibration sensor detects whether an infant in an automobile is asleep in order to optimize air conditioning. In such a moving room, however, the movement of the vehicle causes vibration, and therefore the vibration sensor is likely to draw a wrong conclusion, which is problematic.

Furthermore, in Japanese Unexamined Patent Application Publication No. 2011-230529, a configuration is disclosed in which a temperature sensor is mounted on a child car seat at such a position that an infant's body comes into contact with the temperature sensor and detects the body temperature of the infant. In addition, another temperature sensor is mounted on the child car seat at a different position at which the temperature sensor does not come into contact with the infant's body and detects temperature around the child car seat.

In such a configuration, only the state of the infant seated in the child car seat can be detected. Since an automobile includes a plurality of seats, if a temperature sensor is mounted on each seat, sensors as many as the seats of the automobile are needed, which is problematic. Furthermore, in order to check the states of passengers seated on seats other than the child car seat, a driver needs to talk to or look at the passengers. Therefore, the driver needs to perform a troublesome operation during driving, which is problematic.

The present disclosure provides a processing method used by a processing apparatus capable of certainly detecting the states of passengers regardless of the positions of the passengers, enabling a driver to recognize the states of the passengers without talking to or looking at the passengers during driving, and controlling devices in accordance with the recognized states of the passengers.

A processing method according to an aspect of the present disclosure is a processing method for a processing apparatus. The processing method causes a computer of the processing apparatus to execute steps comprises: (1) detecting a position and a state of a passenger inside a vehicle on the basis of information indicating a state of space including seats of the vehicle, the information obtained from a sensor provided inside the vehicle, (2) notifying an operator of the vehicle of the detected position and state of the passenger, and (3) transmitting, upon detecting an operation, which is performed by the operator of the vehicle, for controlling a device near the detected position of the passenger, a control command corresponding to the operation to the device.

By configuring the processing method in this manner, the state of the passenger of the vehicle can be certainly detected. The operator of the vehicle can recognize the state of the passenger without talking to or looking back at the passenger during driving, and can accordingly control the device in accordance with the recognized state of the passenger. Therefore, the operator of the vehicle can operate the vehicle more safely and control the inside of the vehicle in such a way as to establish a comfortable state to the passenger.

In the processing method according to the aspect of the present disclosure, the processing apparatus is connected to a display in front of the operator of the vehicle, in the notifying, a display screen indicating a diagram including the seats inside the vehicle is displayed on the display, an icon corresponding to the state of the passenger inside the vehicle at a position of the diagram corresponding to the detected position of the passenger is displayed on the display, and an icon for controlling the device near the detected position of the passenger in the diagram is displayed on the display. If it has been detected that the icon for controlling the device has been selected, a control command for the device corresponding to the selected icon for controlling the device is transmitted to the device.

By configuring the processing method in this manner, the state of the passenger of the vehicle can be certainly detected. By checking the display provided in front of the operator of the vehicle, the operator of the vehicle can recognize the state of the passenger without talking to or looking back at the passenger during driving, and can accordingly control the device in accordance with the recognized state of the passenger. Therefore, the operator of the vehicle can operate the vehicle more safely and control the inside of the vehicle in such a way as to establish a comfortable state to the passenger. In addition, since whether the passenger is asleep is detected using the image sensor, whether the passenger is asleep can be accurately detected even in a vibrating vehicle.

In the processing method according to the aspect of the present disclosure, the information obtained from the sensor is information indicating temperature distribution in the space including the seats of the vehicle. The position of the passenger and whether the passenger is asleep are determined on the basis of the temperature distribution, and, if it has been determined that the passenger is asleep, an icon, indicating that the passenger is asleep, is displayed on the display.

Therefore, the state of the passenger of the vehicle can be certainly detected. By checking the display provided in front of the operator of the vehicle, the operator of the vehicle can recognize whether the passenger is asleep without talking to or looking back at the passenger during driving.

In the processing method according to the aspect of the present disclosure, the information obtained from the sensor is information indicating temperature distribution in the space including the seats of the vehicle. Whether the passenger is asleep is determined on the basis of an amount of variation in the temperature distribution over time, the variation obtained from the sensor, and, if it has been determined that the passenger is asleep, the display displays an icon, indicating that the passenger is asleep, is displayed on the display.

Therefore, the state of the passenger of the vehicle can be certainly detected. By checking the display provided in front of the operator of the vehicle, the operator of the vehicle can recognize whether the passenger is asleep without talking to or looking back at the passenger during driving.

In the processing method according to the aspect of the present disclosure, an icon for controlling, among air conditioners installed at a plurality of positions inside the vehicle, an air conditioner installed near the detected position of the passenger is displayed on the display. If it has been detected that the icon has been selected, a control command for controlling at least any of air volume, set temperature, and a wind direction of the air conditioner corresponding to the icon.

Since the processing method is configured in this manner, the operator of the vehicle can recognize the state of the passenger by checking the display provided in front thereof, without talking to or looking back at the passenger during driving. Accordingly, the operator of the vehicle can control the air conditioner in accordance with the recognized state of the passenger.

In the processing method according to the aspect of the present disclosure, the information obtained from the sensor is information indicating temperature distribution in the space including the seats of the vehicle. Whether the passenger is wearing a seatbelt is detected on the basis of the temperature distribution in the vehicle, and, if it has been determined that the passenger is not wearing the seatbelt, the operator of the vehicle is notified that the passenger is not wearing the seatbelt.

By configuring the processing method in this manner, the operator of the vehicle can recognize whether the passenger is wearing the seatbelt without talking to or looking back at the passenger during driving.

In the processing method according to the aspect of the present disclosure, the seatbelt includes two materials having different values of emissivity, and whether the seatbelt is used is detected by detecting a pattern of temperature distribution corresponding to the two materials.

By configuring the processing method in this manner, the temperature distribution corresponding to the seatbelt appears as temperature distribution based on the different values of emissivity of the two materials. Therefore, the seatbelt can be detected more certainly.

In the processing method according to the aspect of the present disclosure, the information obtained from the sensor is information indicating temperature distribution in the space including the seats of the vehicle. A position of a seatbelt worn by the passenger is detected on the basis of the temperature distribution in the vehicle, and warning information is issued on the basis of the position of the passenger and the position of the seatbelt.

By configuring the processing method in this manner, the operator of the vehicle can recognize whether the passenger is appropriately wearing the seatbelt without talking to or looking back at the passenger during driving.

In the processing method according to the aspect of the present disclosure, the seatbelt includes two materials having different values of emissivity, and the position of the seatbelt is detected by detecting a pattern of temperature distribution corresponding to the two materials.

By configuring the processing method in this manner, the temperature distribution corresponding to the seatbelt appears as temperature distribution based on the different values of emissivity of the two materials. Therefore, the seatbelt can be detected more certainly.

In the processing method according to the aspect of the present disclosure, the display is inhibited from displaying the icon for controlling the device while the vehicle is running.

By configuring the processing method in this manner, it becomes possible to prevent the operator of the vehicle from operating the vehicle while looking at the icon displayed on the display during driving.

In the processing method according to the aspect of the present disclosure, the sensor is an infrared array sensor. The information obtained from the sensor is a thermal image indicating temperature distribution in the space including the seats of the vehicle.

Since the processing method is configured in this manner, the state and the position of the passenger inside the vehicle can be detected by analyzing the thermal image. Furthermore, since the infrared array sensor provided inside the vehicle is used, the detection can be accurately performed even in a vibrating vehicle.

In the processing method according to the aspect of the present disclosure, the vehicle is an automobile.

By configuring the processing method in this manner, the operator of the vehicle can recognize the state of the passenger in the vehicle without talking to or looking back at the passenger, and can accordingly control the device in accordance with the recognized state of the passenger. Therefore, the driver can drive the automobile more safely and control the inside of the automobile in such a way as to establish a comfortable state to the passenger.

A computer-readable non-transitory recording medium recording a program according to an aspect of the present disclosure is a computer-readable non-transitory recording medium recording a program executed by a processing apparatus. The program causes the processing apparatus to: (1) detect a position and a state of a passenger inside a vehicle on the basis of information indicating a state of space including seats of the vehicle, the information obtained from a sensor provided inside the vehicle, (2) notify an operator of the vehicle of the detected position and state of the passenger, and (3) transmit, upon detecting an operation, which is performed by the operator of the vehicle, for controlling a device near the detected position of the passenger, a control command corresponding to the operation to the device.

By configuring the program in this manner, the state of the passenger of the vehicle can be certainly detected. The operator of the vehicle can recognize the state of the passenger without talking to or looking back at the passenger, and can accordingly control the device in accordance with the recognized state of the passenger. Therefore, the driver can operate the vehicle more safely and control the inside of the vehicle in such a way as to establish a comfortable state to the passenger.

A processing apparatus according to an aspect of the present disclosure is a processing apparatus including position detection unit that detects a position of a passenger inside a vehicle on the basis of information indicating a state of space including seats of the vehicle, the information obtained from a sensor provided inside the vehicle and a state detection unit that detects a state of the passenger inside the vehicle on the basis of the information indicating the state of the space including the seats of the vehicle. An operator of the vehicle is notified of the detected position and state of the passenger. If it has been detected that an operation, which is performed by the operator of the vehicle, for controlling a device near the detected position of the passenger, a control command corresponding to the operation is transmitted to the device.

By configuring the processing apparatus in this manner, the state of the passenger of the vehicle can be certainly detected. The operator of the vehicle can recognize the state of the passenger without talking to or looking back at the passenger, and can accordingly control the device in accordance with the recognized state of the passenger. Therefore, the driver can operate the vehicle more safely and control the inside of the vehicle in such a way as to establish a comfortable state to the passenger.

A detection system according to an aspect of the present disclosure is a detection system including a sensor provided inside a vehicle and a processing apparatus including position detection unit that detects a position of a passenger inside a vehicle on the basis of information indicating a state of space including seats of the vehicle, the information obtained from a sensor provided inside the vehicle and a state detection unit that detects a state of the passenger inside the vehicle on the basis of the information indicating the state of the space including the seats of the vehicle. The processing apparatus notifies an operator of the vehicle of the detected position and state of the passenger. If it has been detected that an operation, which is performed by the operator of the vehicle, for controlling a device near the detected position of the passenger, a control command corresponding to the operation is transmitted to the device.

By configuring the detection system in this manner, the state of the passenger of the vehicle can be certainly detected. The operator of the vehicle can recognize the state of the passenger without talking to or looking back at the passenger, and can accordingly control the device in accordance with the recognized state of the passenger. Therefore, the driver can operate the vehicle more safely and control the inside of the vehicle in such a way as to establish a comfortable state to the passenger.

Embodiments of the present disclosure will be described hereinafter with reference to the drawings. The same components are given the same reference numerals, and redundant description thereof might be omitted. In the drawings, components are schematically illustrated in order to facilitate understanding.

In addition, the embodiments that will be described hereinafter indicate specific examples of the present disclosure. Values, shapes, components, steps, order of the steps mentioned in the embodiments are examples, and do not limit the present disclosure. In addition, among the components described in the embodiments, those not mentioned in independent claims, which indicate broadest concepts, will be described as arbitrary components. The embodiments may be arbitrarily combined with one another.

In the embodiments, an automobile and an airplane will be taken as examples of the above-described vehicle. The vehicle that adopts the detection system disclosed herein is not limited to one of these, and may be any vehicle such as a train or a bus.

First Embodiment

A detection system 106 according to a first embodiment of the present disclosure will be described with reference to FIGS. 1A to 12. In this embodiment, an example in which the detection system 106 is incorporated into an automobile 100 will be described.

Figure 1B:
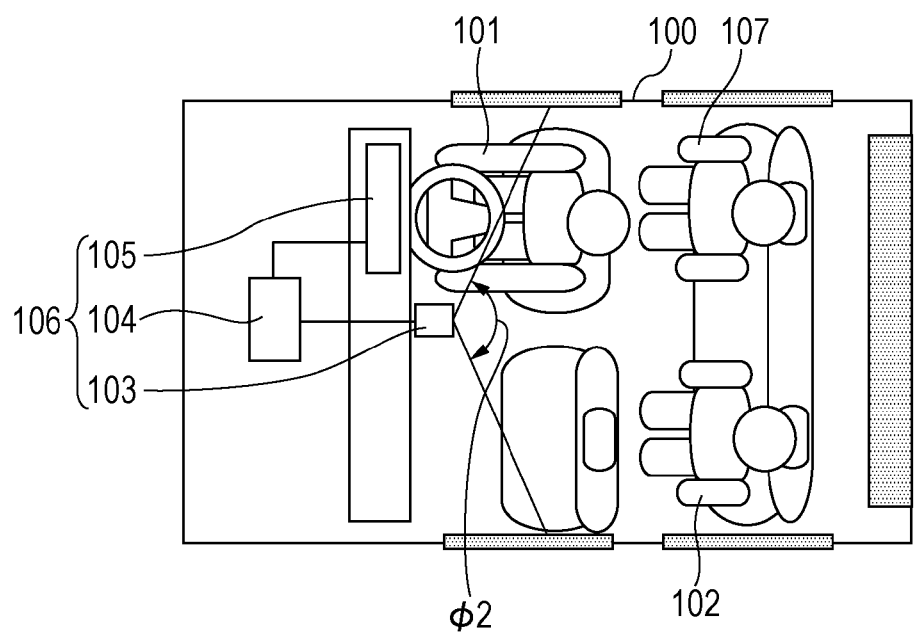
FIG. 1B is a schematic plan view of the inside of the automobile in which the detection system according to the first embodiment of the present disclosure is installed.

FIG. 1A is a schematic side view of an example of the inside of the automobile 100 in which the detection system 106 according to the first embodiment of the present disclosure is installed. FIG. 1B is a schematic plan view of an example of the inside of the automobile 100 in which the detection system 106 according to the first embodiment of the present disclosure is installed.

The detection system 106 according to this embodiment comprises, for example, an infrared array sensor 103 corresponding to an image sensor, a processing apparatus 104 connected to the infrared array sensor 103, and an information display panel 105, which is connected to the processing apparatus 104, as notification means for notifying a driver 101 of information. In the example illustrated in FIGS. 1A and 1B, the driver 101 is seated on a driver's seat of the automobile 100, and passengers 102 and 107 are seated on a backseat.

Figure 2:
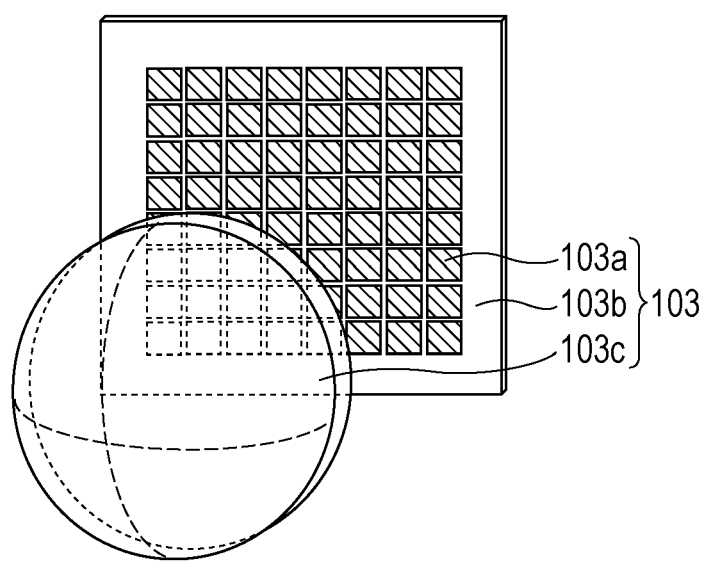
FIG. 2 is a schematic diagram illustrating an example of an infrared array sensor in the detection system according to the first embodiment of the present disclosure.

FIG. 2 is a diagram illustrating an example of the infrared array sensor 103 in the detection system 106 according to the first embodiment of the present disclosure. The infrared array sensor 103 is, for example, a thermal image sensor that detects a thermal image.

In the infrared array sensor 103, as illustrated in FIG. 2, infrared detection elements 103a that detect infrared radiation are arranged on an infrared array substrate 103b. The infrared array sensor 103 forms an image on each of the infrared detection elements 103a through a lens 103c. By using this configuration, the infrared array sensor 103 can detect the distribution of the surface temperature of an object in space as a thermal image.

There are two major types of infrared detection element 103a. One is a thermopile, which detects an increase in temperature caused by incident infrared radiation as electromotive force. The other is a bolometer, which detects an increased in the temperature of the element caused by incident infrared radiation as a change in resistance. Thermopiles are generally lower in cost but have lower temperature resolution, and bolometers have higher temperature resolution but higher in cost. Therefore, the two types of infrared detection element 103a need to be used in accordance with usage. Although the number of pixels illustrated in FIG. 2 is eight in a vertical direction and eight in a horizontal direction, the number of pixels is not limited to this. A higher resolution image can be captured when the number of pixels is larger. Therefore, the number of pixels may be set as necessary in accordance with, for example, cost, the size of the infrared detection elements 103a, the performance of the lens 103c, and the like. Since the lens 103c needs to transmit far-infrared radiation, germanium or the like is usually used as a material of the lens 103c, but these days silicon, zinc sulfide, zinc selenide, chalcogenide, high-density polyethylene, or the like might be used. These candidate materials of the lens 103c have their respective advantages and disadvantages in transmittance, formability, cost, and the like. The material of the lens 103c may be selected as necessary in accordance with usage or cost.

The infrared array sensor 103 is installed inside the automobile 100. As illustrated in FIG. 1B, the infrared array sensor 103 is small enough to be mounted on a front part of a ceiling at such a position between the driver's seat and the front passenger seat that the driver's operation is not interfered with. As illustrated in FIGS. 1A and 1B, the vertical angle of view of the infrared array sensor 103 is $\phi 1$, and the horizontal angle of view of the infrared array sensor 103 is $\phi 2$. Therefore, space including seats (all the seats in this example) of the automobile 100 is included in the angle of view of the infrared array sensor 103. Accordingly, if there is a passenger in the space including the seats of the automobile 100, the infrared array sensor 103 can detect the surface temperature of the passenger. In the example illustrated in FIGS. 1A and 1B, the infrared array sensor 103 can detect all of the driver 101 and the passengers 102 and 107, who correspond to passengers of the automobile 100. Therefore, the single infrared array sensor 103 can detect the entirety of temperature distribution in the space inside the automobile 100 including the passengers of the automobile 100. Furthermore, in FIGS. 1A and 1B, even if, for example, the passenger 107 has moved to the center of the backseat, the infrared array sensor 103 can detect the temperature distribution of the passenger 107 with no problem. Therefore, the infrared array sensor 103 can detect the passengers in the backseat regardless of the positions of the passengers.

Next, a thermal image captured by the infrared array sensor 103 will be schematically described with reference to FIGS. 3A and 3B.

Figure 3A:
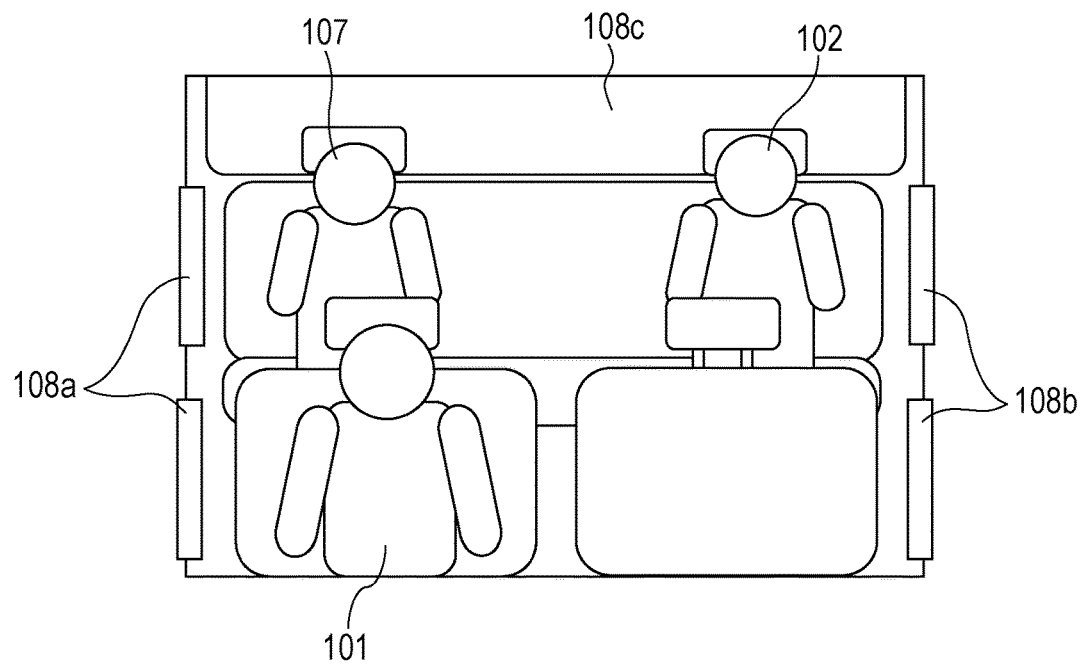
FIG. 3A is a schematic diagram illustrating an example of a target whose image is to be captured by the infrared array sensor in the detection system according to the first embodiment of the present disclosure.

FIG. 3A is a schematic diagram illustrating an example of a target whose image is to be captured by the infrared array sensor 103 in the detection system 106 according to the first embodiment of the present disclosure. FIG. 3B is a diagram illustrating an example of a thermal image captured by the infrared array sensor 103.

FIG. 3A is a schematic diagram of not a thermal image but an actual condition of the inside of the automobile 100. The driver 101 and the passengers 102 and 107 are on board, and the front passenger seat is vacant. Right windows 108a, left windows 108b, and a rear window 108c are arranged as illustrated in FIG. 3A. FIG. 3B is a schematic diagram of a thermal image of the inside of the automobile 100 captured by the infrared array sensor 103. In FIG. 3B, for example, the density of hatching becomes higher as the temperature increases, and the density of hatching becomes lower as the temperature decreases. The actual thermal image is, however, a grayscale image, and the value of each pixel of the grayscale image is a value corresponding to the detected temperature. For example, in the actual thermal image, a pixel value for higher density is given as the temperature increases, and a pixel value for lower density is given as the temperature decreases.

Figure 3B:
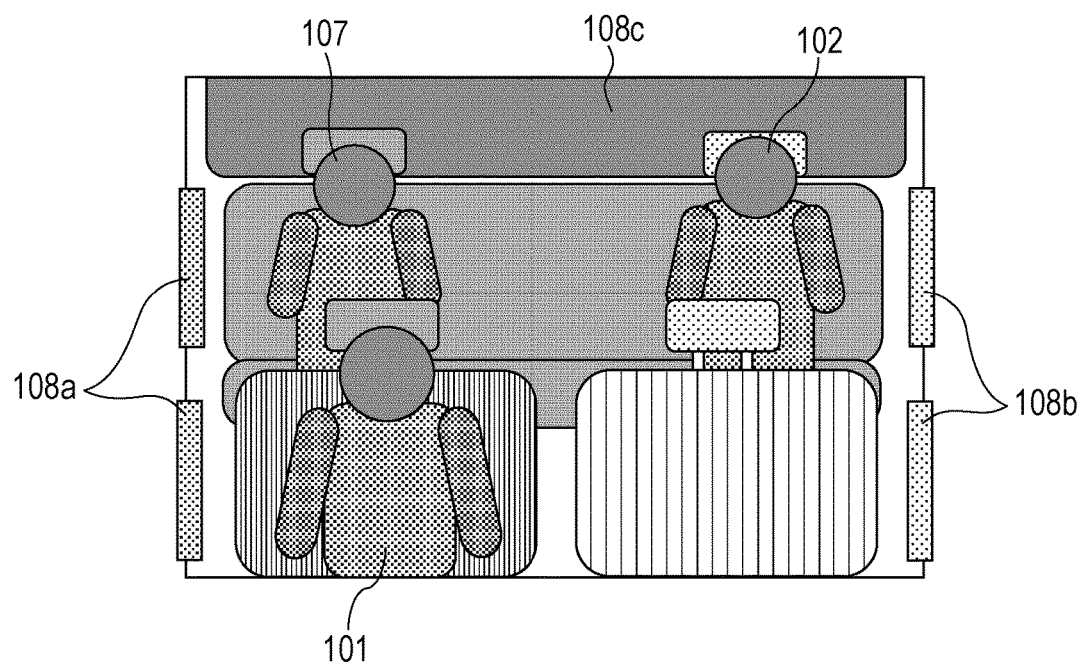
FIG. 3B is a diagram illustrating an example of a thermal image captured by the infrared array sensor.

In the thermal image illustrated in FIG. 3B, the temperatures of faces of the driver 101 and the passengers 102 and 107 are the highest, and the temperature of the rear window 108c is the second highest. The temperatures of arms of the driver 101 and the passengers 102 and 107 are the third highest. The temperatures of clothes of the driver 101 and the passengers 102 and 107 are the fourth highest, and the temperatures of the seats for the driver 101 and the passengers 102 and 107 are the fifth highest. The temperatures of the right windows 108a are substantially the same as those of the seats for the driver 101 and the passenger 102 and 107. The temperatures of the right windows 108a are higher than those of the left windows 108b. On the basis of the temperatures of the windows, it can be inferred that the sun is at the back of the automobile 100 on the side of the driver's seat.

The temperature distribution, which is illustrated in FIG. 3B, obtained by the infrared array sensor 103 is transmitted to the processing apparatus 104. The processing apparatus 104 then detects the position and movement (the amount of body movement) of each of the persons inside the automobile 100 through image processing, determines whether each of the detected persons is asleep or awake, and controls the information display panel 105 and another device (output a control command).

Figure 4:
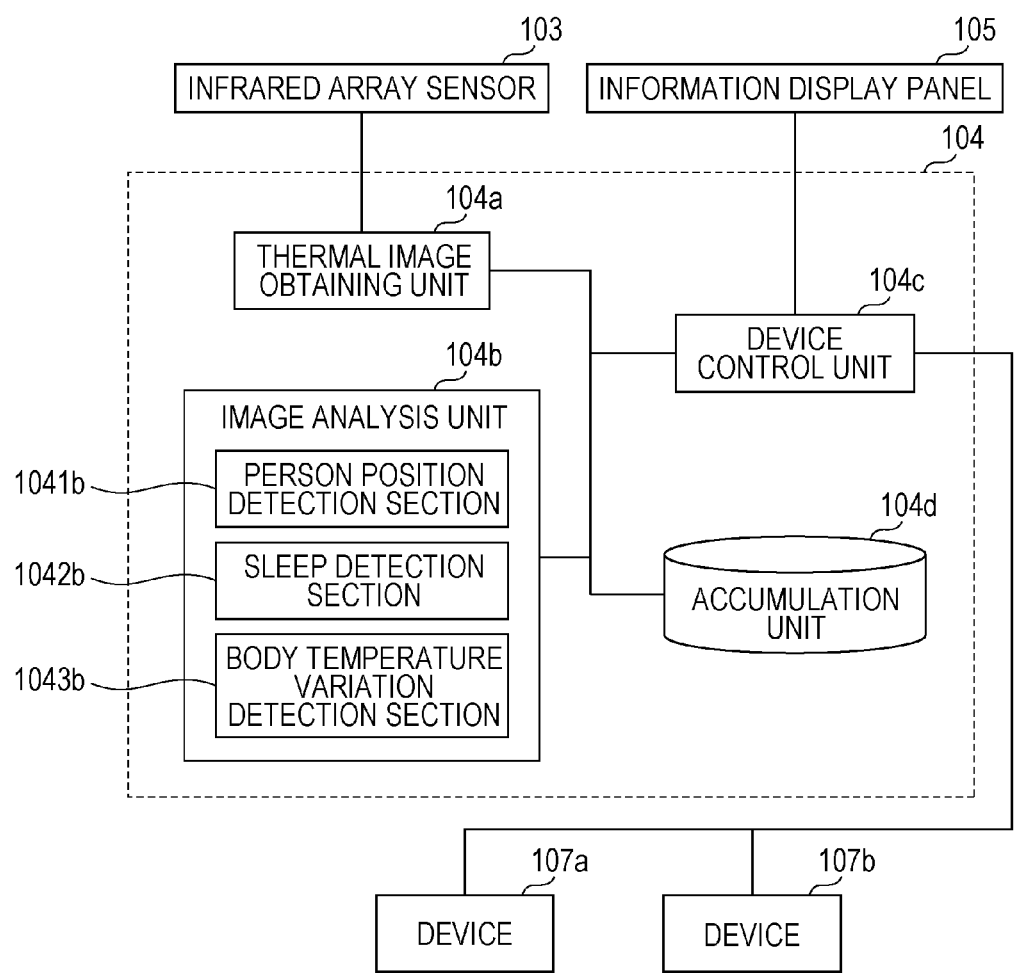
FIG. 4 is a block diagram illustrating an example of the configuration of the detection system according to the first embodiment of the present disclosure.

FIG. 4 is a block diagram illustrating an example of the configuration of the detection system 106. The detection system 106 includes, for example, the infrared array sensor 103, the processing apparatus 104, and devices 107a and 107b. The information display panel 105 includes, for example, a touch panel display. The information display panel 105 is installed, for example, in front of the driver 101.

The devices 107a and 107b are devices installed in the automobile 100.

The processing apparatus 104 obtains a thermal image from the infrared array sensor 103. The processing apparatus 104 detects the positions of the persons inside the automobile 100 by processing the obtained thermal image. The processing apparatus 104 detects the movement of each of the detected persons (the amount of body movement) and determines on the basis of a result of the detection whether each of the driver 101 and the passengers 102 and 107 is asleep or awake. The processing apparatus 104 detects the state of each of the driver 101 and the passengers 102 and 107 (in this example, whether each of the driver 101 and the passengers 102 and 107 is asleep or awake) on the basis of the result of the detection. The processing apparatus 104 displays an icon indicating whether each of the passengers 102 and 107 is asleep or awake on the information display panel 105 on the basis of a result of the determination.

In addition, the processing apparatus 104 accumulates information regarding the installed positions of devices in the automobile 100 and may display, on the information display panel 105, icons for controlling the devices 107a and 107b installed near the seated positions of the passengers 102 and 107, respectively. Alternatively, the processing apparatus 104 may combine the icons with a diagram including the seats inside the automobile 100 and display the diagram on the information display panel 105.

In addition, when an operation has been performed on one of the icons for controlling the devices displayed on the information display panel 105, the processing apparatus 104 outputs a control command according to the operation to the corresponding device. Upon receiving the control command, the device performs control according to the control command.

The processing apparatus 104 includes, for example, a thermal image obtaining unit 104a, an image analysis unit 104b, a device control unit 104c, and an accumulation unit 104d. The image analysis unit 104b includes, for example, a person position detection section 1041b, a sleep detection section 1042b, and a body temperature variation detection section 1043b.

The processing apparatus 104 is configured, for example, using a computer. The computer includes a central processing unit (CPU), a memory, and hardware, which is not illustrated. The accumulation unit 104d corresponds, for example, to the memory. The memory is a storage device such as a hard disk, a read-only memory (ROM), or a random-access memory (RAM). The memory accumulates, for example, programs that function as the thermal image obtaining unit 104a, the image analysis unit 104b, and the device control unit 104c. By reading the programs from the memory and executing the programs using the CPU, the functions of the thermal image obtaining unit 104a, the image analysis unit 104b, and the device control unit 104c are realized. Alternatively, the functions of the thermal image obtaining unit 104a, the image analysis unit 104b, and the device control unit 104c in the processing apparatus 104 may be realized by integrated circuits.

Since FIG. 4 schematically illustrates the functional configuration of the processing apparatus 104, the processing apparatus 104 need not have this functional configuration but may have another functional configuration.

That is, a device other than the processing apparatus 104 may have part of the functional configuration illustrated in FIG. 4. The accumulation unit 104d accumulates, for example, information to be displayed on the information display panel 105. The accumulation unit 104d accumulates, for example, data corresponding to the diagram including the seats inside the automobile 100. In addition, the accumulation unit 104d accumulates an icon indicating that a person detected by the image analysis unit 104b is asleep. In addition, the accumulation unit 104d accumulates an icon indicating that a person detected by the image analysis unit 104b is awake. In addition, the accumulation unit 104d accumulates information regarding the positions of the devices installed in the automobile 100. The installed positions of the devices may be accumulated while being associated with, for example, the seats of the automobile 100. In addition, the accumulation unit 104d accumulates icons corresponding to the devices installed in the automobile 100 and control commands output when the icons have been operated while associating the icons and control commands with each other.

The thermal image obtaining unit 104a obtains, for example, a thermal image from the infrared array sensor 103 at a certain timing.

The person position detection section 1041b detects the position (or a seat) and movement (the amount of body movement) of each of the persons inside the automobile 100. The person position detection section 1041b can identify the seat used by each of the detected persons on the basis of the detected position of each of the persons. The sleep detection section 1042b detects whether each of the detected persons, namely the passengers 102 and 107, is asleep or awake. The body temperature variation detection section 1043b detects whether each of the passengers is asleep by analyzing the temperature distribution of the thermal image in detail.

The device control unit 104c extracts an icon indicating that each of the detected persons is asleep or awake from the accumulation unit 104d and transmits the extracted icon and a control command for displaying the icon to the information display panel 105.

In addition, the device control unit 104c may extract an icon for controlling the device installed near the seated position (or the seat) of the passenger 107 from the accumulation unit 104d and transmit the extracted icon and a control command for displaying the icon to the information display panel 105.

For example, if the seat used by the passenger 107 has been identified as a seat behind the driver 101, the device control unit 104c may extract an icon for controlling a device associated with this seat from the accumulation unit 104d and transmit the extracted icon and a control command for displaying the icon to the information display panel 105.

In addition, the device control unit 104c may extract the diagram including the seats inside the automobile 100 from the accumulation unit 104d and display the diagram on the information display panel 105 along with the icons.

In the above example, the accumulation unit 104d accumulates the icon indicating whether each of the persons is asleep or awake, the icon for controlling the device installed near the seated position of the passenger 102, the icon for controlling the device installed near the seated position (or the seat) of the passenger 107, and the diagram. However, the component that accumulates these pieces of information is not limited to the accumulation unit 104d. For example, an accumulation unit such as a memory, which is not illustrated, included in the information display panel 105 may accumulate these pieces of information. In this case, the above-described icons need not be transmitted, but only control commands for displaying the corresponding icons may be transmitted to the information display panel 105.

In addition, when an operation has been performed on an icon for controlling a device displayed on the information display panel 105, the information display panel 105 outputs operation data corresponding to the operation to the device control unit 104c. The device control unit 104c detects that the operation has been performed on the information display panel 105 by receiving the operation data corresponding to the operation from the information display panel 105. And the device control unit 104c extracts a control command according to the operation from the accumulation unit 104d and outputs the control command to the corresponding device. Upon receiving the control command, the device performs control according to the control command.

Figure 5:
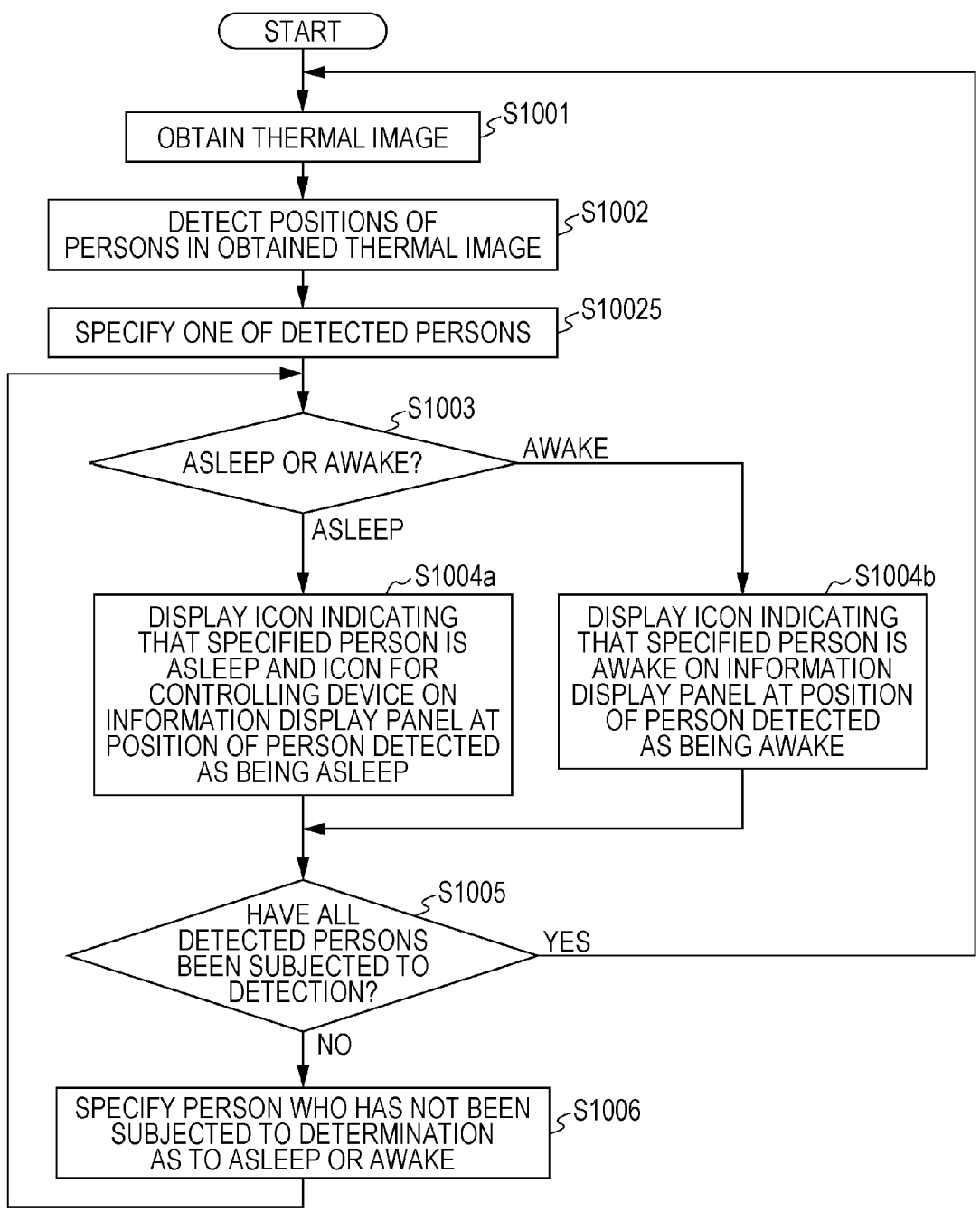
FIG. 5 is a flowchart illustrating an example of a process performed by the detection system according to the first embodiment of the present disclosure.

FIG. 5 is a flowchart illustrating an example of a process performed by the detection system 106 according to the first embodiment of the present disclosure.

First, in step S1001, the thermal image obtaining unit 104a obtains a thermal image from the infrared array sensor 103. A timing at which the thermal image is obtained (that is, a timing at which the infrared array sensor 103 outputs the thermal image to the processing apparatus 104) is not particularly limited. For example, if person position detection section 1041b, which will be described later, has detected a person inside the automobile 100, time taken until a result of step S1005, which will be described later, becomes "YES" after the processing in step S1001 is performed may be set as a certain period of time, and thermal images may be output at intervals of the certain period of time.

Next, in step S1002, the person position detection section 1041b of the image analysis unit 104b detects the positions of persons in the obtained thermal image through image processing. For example, the person position detection section 1041b holds in advance pattern images used for detecting persons in the thermal image. The pattern images include, for example, a pattern image having a shape of a human face, a pattern image having a shape of an arm, a pattern image having a shape of a hand, and a pattern image having a shape of clothes. In addition, the person position detection section 1041b holds in advance pattern images corresponding to shapes of the seats (in this example, the driver's seat, the seat next to the driver's seat (front passenger seat), and the backseat) inside the automobile 100. These images may be accumulated in the accumulation unit 104d.

If one of the above-mentioned pattern images corresponding to a human is included in the obtained thermal image, the person position detection section 1041b detects a person. Here, the driver 101 and the passengers 102 and 107 are detected inside the automobile 100.

Alternatively, as a method for detecting the position of a person used by the processing apparatus 104 in the image processing, for example, a lateral profile of the obtained thermal image may be examined and a position at which temperature is high over a certain width may be detected as the position of a person, because the person's head can be detected in such a manner. Alternatively, the temperature distribution inside the automobile 100 may be detected when a door of the automobile 100 has been unlocked, and then the number of persons and the positions of the persons may be detected by detecting the distribution of the persons on the basis of differences between thermal images. Various other methods may be used for detecting a person, and the method used is not particularly limited.

Next, in step S10025, one of the detected persons is specified. In the example according to this embodiment, any of the driver 101 and the passengers 102 and 107 is specified.

Next, in step S1003, for example, the sleep detection section 1042b of the image analysis unit 104b uses a previously obtained thermal image and a currently obtained thermal image to see if there is a difference between the thermal images in terms of the position of the specified person detected by the person position detection section 1041b and determines whether the specified person is asleep or awake. If it has been determined in step S1003 that the specified person is asleep, the process proceeds to step S1004a. If it has been determined in step S1003 that the specified person is awake, the process proceeds to step S1004b.

For example, the image analysis unit 104b determines whether the specified person is asleep or awake by calculating the movement (the amount of body movement) of the specified person. First, by calculating a difference value between the obtained thermal image to be processed and the previously obtained thermal image, the amount of body movement is calculated. Here, the previously obtained image is, if thermal images are obtained at certain time intervals, a thermal image obtained immediately before the timing at which the current thermal image is obtained.

Figure 6:
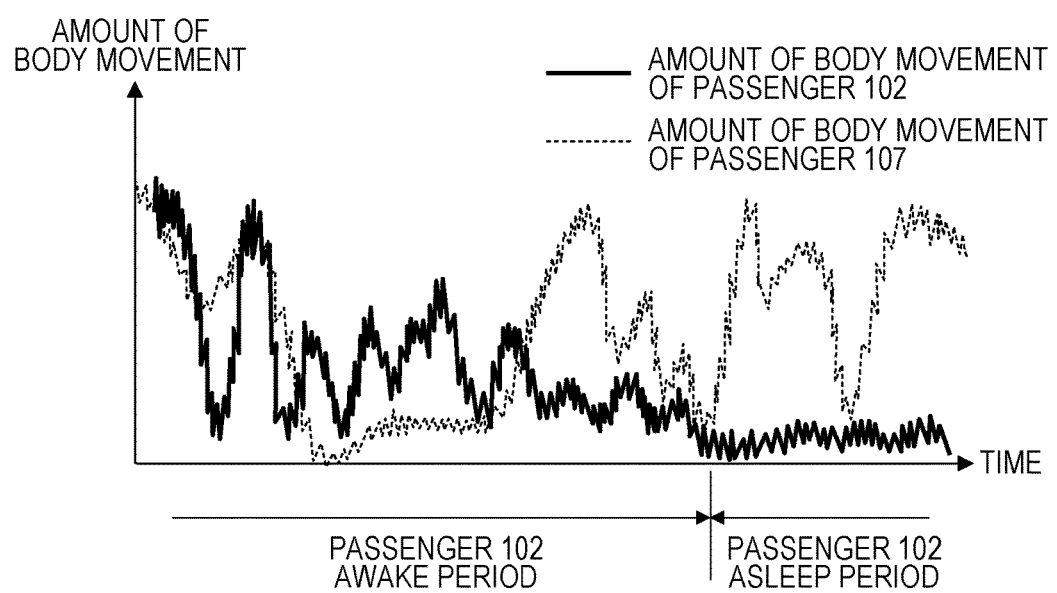
FIG. 6 is a graph illustrating an example of changes in the amount of body movement of passengers over time detected by the detection system according to the first embodiment of the present disclosure.

As described above, by detecting a temporal change in the position of the specified person from the obtained thermal images, the amount of body movement of the person can be detected. For example, by detecting changes in the position of the center of the passenger's head over time, the amount of body movement of the passenger can be detected. FIG. 6 is a graph illustrating an example of changes in the amount of body movement of the passengers over time detected by the detection system 106 according to the first embodiment of the present disclosure. More specifically, FIG. 6 is a graph illustrating an example of variation in the amount of body movement of the passengers 102 and 107 over time. The horizontal axis represents time, and the vertical axis represents the amount of body movement. That is, the amount of body movement represented by the vertical axis is a difference value between a previously obtained image and an image to be processed at a position specified in the thermal images, such as the position of the center of a passenger's head. For example, in FIG. 6, variation in the amount of body movement of the passenger 102 is large at a beginning of measurement, but the amount of body movement gradually decreases. On the other hand, the amount of body movement of the passenger 107 temporarily decreases but does not remain the same, that is, the amount of body movement of the passenger 107 is generally large during the measurement. Therefore, it can be estimated that the passenger 102 had been awake until a certain time, but then got sleepy and fell asleep. On the other hand, it can be estimated that the passenger 107 has stayed awake during the measurement. That is, when the amount of body movement of a person remains smaller than a threshold for a certain period of time as in the case of the passenger 102, the processing apparatus 104 determines that the person is asleep. The determination whether a person is asleep or awake, however, is not limited to this. As described above, when the amount of body movement of a passenger extracted from the obtained thermal images remains small for a certain period of time, it can be estimated that the passenger has fallen asleep.

Figure 7:
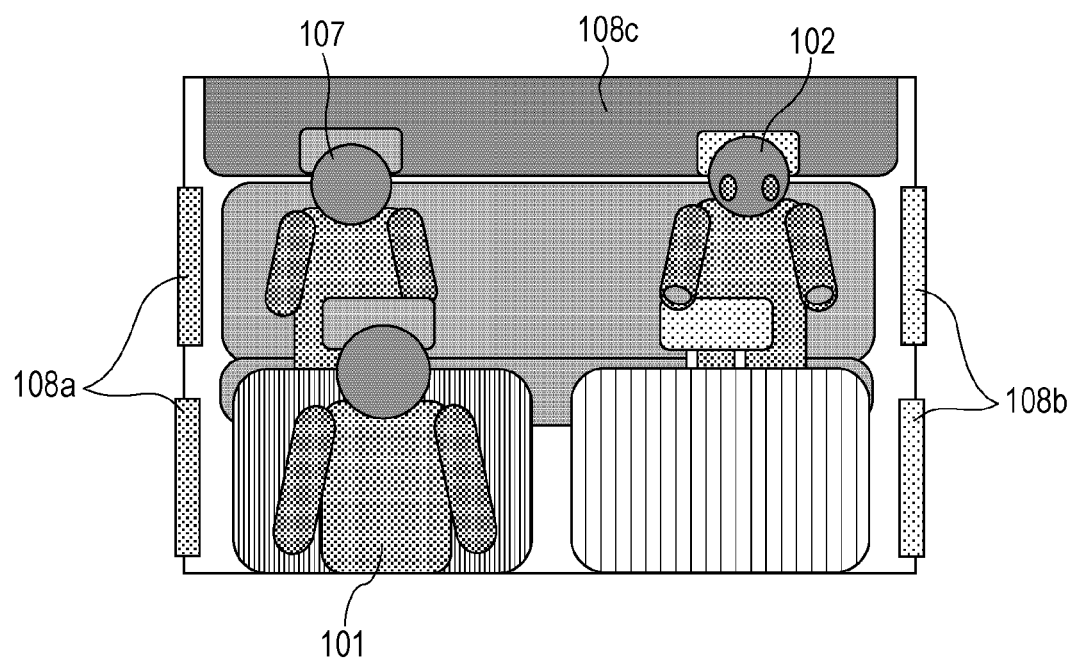
FIG. 7 is a diagram illustrating an example of the thermal image captured by the infrared array sensor.

FIG. 7 is a diagram illustrating an example of the obtained thermal image.

In addition to the amount of body movement, the body temperature variation detection section 1043b of the image analysis unit 104b detects whether each passenger is asleep or awake by analyzing the temperature distribution in the obtained thermal image in detail as illustrated in FIG. 7. Since the metabolic rate of humans decreases during sleep, core body temperature generally decreases during sleep. Therefore, for example, the temperatures of one's hands, feet, cheeks, and the like tend to increase especially at the beginning of sleep so that the core body temperature decreases. As the core body temperature decreases, the temperatures of one's hands, feet, cheeks, and the like gradually decrease. On the basis of this nature, the body temperature variation detection section 1043b can determine whether the passenger 102 is asleep by detecting variation in the temperatures of the hands, the feet, and the cheek of the passenger 102 and the like in FIG. 7. Of course, as described above, variation in the amount of body movement may also be detected.

According to the detection system 106 according to this embodiment, whether each passenger is asleep or awake can be detected from thermal images inside the automobile 100 using the above-described method. In general, whether each passenger is awake or asleep can be determined by detecting whether each passenger's eyes are open using a camera that senses visible light. At night, however, it is difficult for a camera that senses visible light to detect sleep, since the inside of the automobile is dark. On the other hand, in the case of a camera that senses near-infrared radiation, a light source of near-infrared light needs to illuminate the inside of the automobile, thereby undesirably making the system expensive. In addition, in the case of a vibration sensor, vibration caused by the automobile and body movement need to be separated from each other, which is undesirable in terms of cost. In the case of the infrared array sensor 103, which senses far-infrared light, described in this embodiment, however, no illumination is necessary at night and the system can be constructed at low cost. In addition, because it is difficult to identify an individual from obtained thermal images, it is possible to construct the privacy-conscious detection system 106 that can securely obtain necessary information.

In this embodiment, the infrared array sensor 103 is also used as means for detecting the amount of body movement. If a vibration sensor is used for detecting the amount of body movement, vibration caused by the running automobile 100 might be undesirably detected by the vibration sensor as body movement especially when the automobile 100 is running on a rough road since a vehicle such as the automobile 100 normally vibrates during driving. In such a case, another vibration sensor is provided at a different position inside the automobile 100 in order to obtain the amount of body movement of each passenger on the basis of a difference in the amount of vibration obtained by each vibration sensor. In this case, however, the number of components undesirably increases. On the other hand, by fixing the infrared array sensor 103 in the automobile 100 as in this embodiment, vibration of the infrared array sensor 103 and vibration of the passengers inside the automobile 100 are similar to each other even if the automobile 100 vibrates during driving. Therefore, it is possible to obtain the amount of body movement by analyzing thermal images obtained by the infrared array sensor 103 and construct, at low cost, the detection system 106 whose number of components is small as a detection system installed in a vehicle.

Next, in step S1004a, the device control unit 104c extracts an icon indicating that the specified person is asleep from the accumulation unit 104d. In S1004a, the device control unit 104c then transmits, to the information display panel 105, the icon indicating that the specified person is asleep and a control command for displaying the icon at a position corresponding to the position of the person who has been detected as being asleep in the diagram including the seats inside the automobile 100. The information display panel 105 displays the icon indicating the specified person is asleep in accordance with the received control command.

In addition, in step S1004a, the device control unit 104c transmits an icon for controlling a device installed near the person who has been detected as being asleep and a control command for displaying the icon to the information display panel 105. The information display panel 105 displays the icon for controlling the device in accordance with the received control command.

For example, when the process illustrated in the flowchart of FIG. 5 begins, the device control unit 104c has already extracted the diagram including the seats inside the automobile 100 from the accumulation unit 104d and displayed the diagram on the information display panel 105.

On the other hand, in step S1004b, the device control unit 104c extracts an icon indicating that the specified person is awake from the accumulation unit 104d. In step S1004b, the device control unit 104c then transmits, to the information display panel 105, the icon indicating that the specified person is awake and a control command for displaying the icon at a position corresponding to the position of the person detected as being awake in the diagram including the seats inside the automobile 100. The information display panel 105 displays the icon indicating that the specified person is awake in accordance with the received control command.

Next, in step S1005, the image analysis unit 104*b* determines whether all the persons detected by the person position detection section 1041*b* have been subjected to the detection performed by the sleep detection section 1042*b* as to asleep or awake. If the image analysis unit 104*b* has determined in step S1005 that not all the persons detected by the person position detection section 1041*b* have been subjected to the detection performed by the sleep detection section 1042*b* (NO in step S1005), the process proceeds to step S1006. In step S1006, the image analysis unit 104*b* specifies one of the persons detected by the person position detection section 1041*b* who have not been subjected to the determination as to asleep or awake, and the process returns to step S1003.

On the other hand, if the image analysis unit 104*b* has determined in step S1005 that all the persons detected by the person position detection section 1041*b* have been subjected to the detection performed by the sleep detection section 1042*b* (YES in step S1005), the process returns to step S1001.

The flowchart of FIG. 5 is an example, and the process to be performed is not limited to this.

For example, in step S1004*b*, an icon for controlling a device installed near the person detected as being awake may be displayed.

Figure 8:
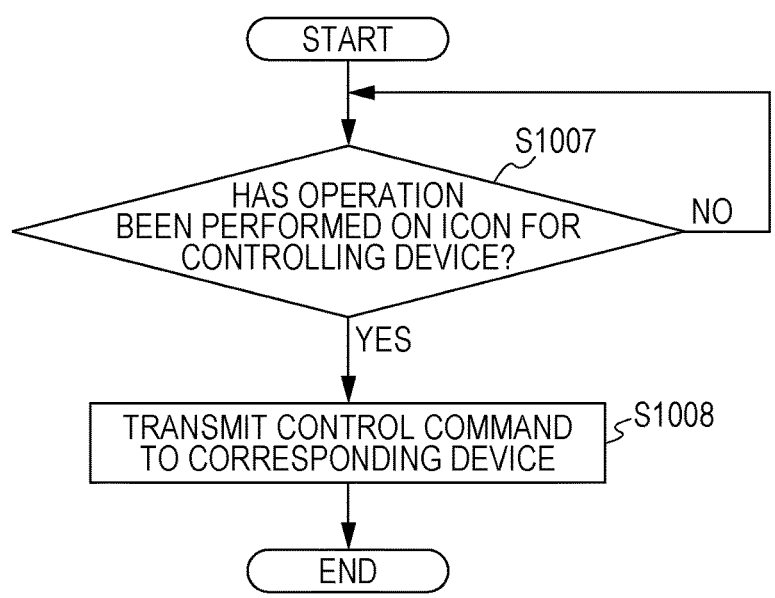
FIG. 8 is a flowchart illustrating an example of a process performed by the detection system according to the first embodiment of the present disclosure.

Next, an example of a process performed when an operation has been performed on the information display panel 105 will be described. For example, assume that in step S1004*b* of the flowchart of FIG. 5 an icon for controlling a device installed near the person detected as being awake is displayed. FIG. 8 is a flowchart illustrating an example of a process performed by the detection system 106 according to the first embodiment of the present disclosure. More specifically, FIG. 8 is a flowchart illustrating an example of a process when an operation has been performed on the information display panel 105. The flowchart of FIG. 8 illustrates an example of a process performed when an operation has been performed on an icon for controlling a device displayed on the information display panel 105 while the process illustrated in the flowchart of FIG. 5 is being executed.

First, in step S1007, the device control unit 104*c* determines whether an operation has been performed on the icon for controlling the device displayed on a display screen of the information display panel 105, which is a touch panel. If the device control unit 104*c* has determined that the operation has not been performed, the process returns to step S1007. On the other hand, if the device control unit 104*c* has determined that the operation has been performed, the process proceeds to step S1008.

The accumulation unit 104*d* accumulates control commands used when operations have been performed on icons for controlling devices displayed on the screen. In step S1008, the device control unit 104*c* extracts a control command corresponding to the performed operation from the accumulation unit 104*d* and transmits the control command to the corresponding device.

Figure 9A:
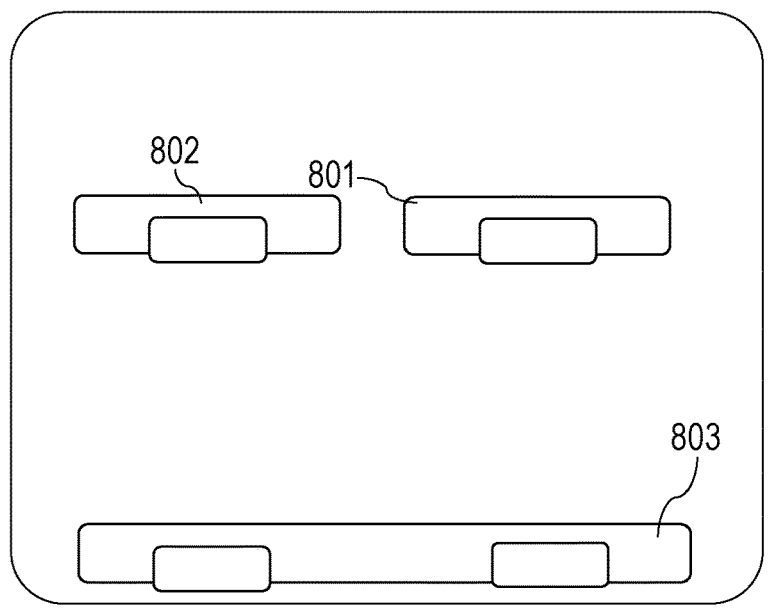
FIG. 9A is a diagram illustrating an example of a display screen of an information display panel in the detection system according to the first embodiment of the present disclosure.

Information regarding sleep of each passenger detected by the processing apparatus 104 on the display screen of the information display panel 105 will be described with reference to FIGS. 9A to 12. FIGS. 9A to 12 illustrate examples of the display screen of the information display panel 105. FIG. 9A is a diagram illustrating an example of the display screen of the information display panel 105 in the detection system 106 according to the first embodiment of the present disclosure. More specifically, FIG. 9A illustrates an example of the display screen at a time when the diagram including the seats is displayed on the information display panel 105. As illustrated in FIG. 9A, an icon 801 corresponding to the driver's seat, an icon 802 corresponding to the seat next to the driver's seat, and an icon 803 corresponding to the backseat are displayed at positions in the display screen corresponding to the positions of the driver's seat, the seat next to the driver's seat (or the front passenger seat), and the back seat in the space including the seats of the automobile 100.

As illustrated in FIGS. 9B to 12, for example, the device control unit 104*c* of the processing apparatus 104 controls (transmits control commands to) the information display panel 105 such that the information display panel 105 displays the icons 801, 802, and 803 of the seats in accordance with the positions of the seats of the automobile 100 and icons of human faces in accordance with the positions of the detected persons. Since the icons are displayed like this, the driver 101 can check where the passengers 102 and 107 are seated and whether the passengers 102 and 107 are asleep by looking at the information display panel 105.

Figure 9B:
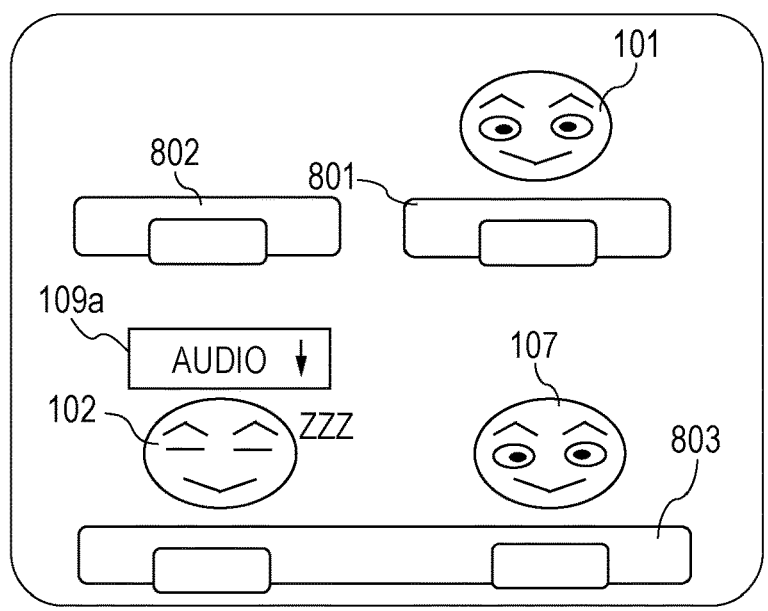
FIG. 9B is a diagram illustrating an example of the display screen of the information display panel in the detection system according to the first embodiment of the present disclosure.

First, if the processing apparatus 104 has detected that the passenger 102 has fallen asleep, an icon, such as "zzz" illustrated in FIG. 9B, indicating that the passenger 102 is asleep is displayed, so that the driver can recognize that the passenger 102 has fallen asleep. At this time, the icon of the passenger 102 may flash, so that the driver 101 can certainly understand the state of the passenger 102. In addition, a tone whose volume is small enough that only the driver 101 can hear the tone may be emitted for the driver 101. In addition, similar auxiliary means may be used for prompting the driver 101 to recognize the state of the passenger 102. In doing so, the driver 101 can recognize the position and state of the passenger 102 in real-time. The driver 101 can recognize the state of each passenger in real-time by checking the information display panel 105 installed in front thereof without looking back at the backseat.

As a result, for example, the driver 101 can manually turn down the volume of a car audio system in order not to disturb the sleeping passenger 102. If an automatic shade or an automatic curtain, which is not illustrated, is provided next to the passenger 102, the driver 101 can activate the automatic shade or the automatic curtain in order not to disturb the sleeping driver 101 by protecting the passenger 102 from outside light. If a light source is provided near the passenger 102, the driver 101 can turn off the light source in order not to disturb the sleeping passenger 102. The driver 101 need not manually control the car audio system, the shade, or the like, but the detection system 106 may automatically transmit a control command to control the car audio system, the share, or the like.

Furthermore, if there are two passengers (passengers 102 and 107 in this embodiment), only the volume of a speaker next to the passenger 102 can be turned down, thereby making it possible to prevent a decrease in volume from affecting a listening experience of the passenger 107. Thus, the comfort of both the passenger 102 and the passenger 107 is not affected, which is advantageous. The same holds, in addition to the car audio system, for the automatic shade, the automatic curtain, and the light source described above. This is true even when the automobile 100 is a vehicle used for customers, such as a taxi. If, for example, the passenger 102 is a customer, the driver 101 can recognize that the passenger 102, who is the customer, has fallen asleep by checking the information display panel 105 installed in front thereof. Therefore, the driver 101 can safely recognize the states of the passengers 102 and 107 without looking back. Furthermore, the driver 101 can refrain from talking to the passenger 102 who has been detected as having fallen asleep, thereby making it possible not to disturb the sleeping passenger 102, who is a customer, and to transport the customer safely and comfortably to a destination.

Furthermore, as illustrated in FIG. 9B, if the processing apparatus 104 has determined that the passenger 102 has fallen asleep, the device control unit 104c of the processing apparatus 104 may perform control (transmit a control command) for displaying an input area 109a on the information display panel 105 having a touch panel function. Here, the input area 109a is, for example, an icon for enabling the driver 101 to turn down the volume of a device installed near the passenger 102, such as the speaker of the car audio system. If the driver 101 has touched the input area 109a, the processing apparatus 104 (device control unit 104c) detects the touch on the input area 109a of the information display panel 105. The accumulation unit 104d accumulates a control command corresponding to the touch operation performed on the input area 109a. The processing apparatus 104 (device control unit 104c) obtains the corresponding control command from the accumulation unit 104d and outputs the control command to the corresponding device. In this example, the processing apparatus 104 outputs a control command for turning down only the volume of the speaker (car audio system) installed near the passenger 102. As a result, only the volume of the speaker (car audio system) installed near the passenger 102 can be turned down. Therefore, the driver 101 can turn down the volume of the speaker installed near the passenger 102 without performing a complicated operation, in order create a comfortable space for the passenger 102 without affecting the driving operation thereof.

In addition, although an example in which only the passenger 102 falls asleep has been described above, an icon for controlling a speaker of the car audio system installed near the passenger 107 may be obviously displayed as well if both the passengers 102 and 107 have fallen asleep. In this case, if a television set is provided in a second row as a rear seat entertainment (RSE) or the like and all the passengers in the second row (the passengers 102 and 107 in this embodiment) have fallen asleep, the processing apparatus 104 may output a control command for turning off the television set in the second row to the television set in the second row in accordance with an operation performed by the driver 101. If a plurality of television sets are provided in the second row, the television sets may be individually controlled as in the above-described case of the speakers of the car audio system, but the mode used is not particularly limited.

Figure 10:
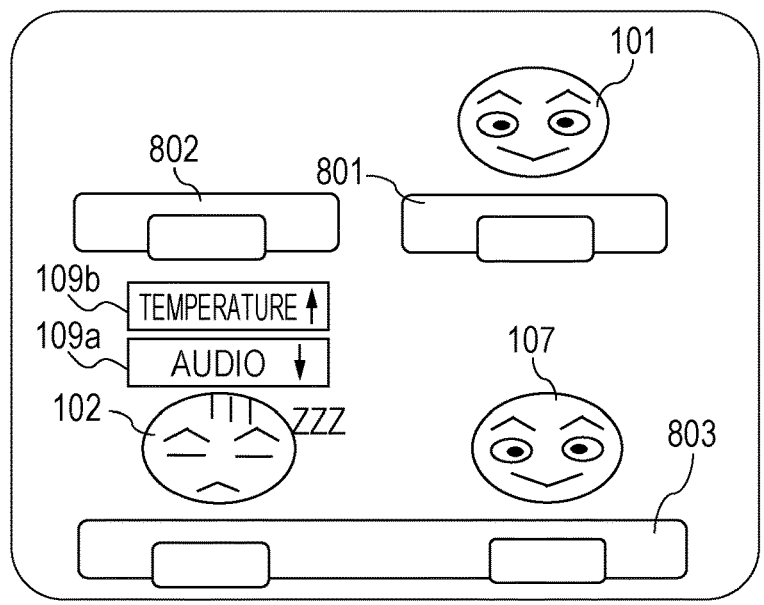
FIG. 10 is a diagram illustrating an example of the display screen of the information display panel in the detection system according to the first embodiment of the present disclosure.

In addition, although the volume of the speakers of the car audio system has been described in the example illustrated in FIG. 9, the target controlled by the processing apparatus 104 on the basis of the sleep states of the passengers is not limited to this. FIG. 10 is a diagram illustrating an example of the display screen of the information display panel 105 in the detection system 106 according to the first embodiment of the present disclosure. More specifically, FIG. 10 is a diagram illustrating an example of the display screen of the information display panel 105 at a time when the passenger 102 is asleep and feeling cold. FIG. 10 illustrates an example in which the processing apparatus 104 has determined that the passenger 102 is feeling cold on the basis of the distribution of the body surface temperature of the passenger 102 measured by the infrared array sensor 103. It is generally known that when a person is feeling cold, the blood flow to the periphery of his/her body is reduced in order to prevent body heat from being dissipated into the air. This is why, for example, the temperatures of our hands and feet decrease when we stay outside in winter. By reducing the blood flow to the periphery such as hands and feet, a decrease in core body temperature at digestive organs, which are crucial in maintaining life, and the like is prevented.

Therefore, if the temperature of the periphery of the passenger 102, such as cheeks or hands, has decreased by a certain value or more, the processing apparatus 104 can determine that the passenger 102 is feeling cold. In this case, as illustrated in FIG. 10, an input area 109b for an automobile air conditioner that increases only the temperature around the passenger 102 may be displayed. The input area 109b is an icon for controlling a device installed near the passenger 102, that is, for example, an automobile air conditioner installed in the back of the seat next to the driver's seat (front passenger seat). When the driver 101 has touched the input area 109b, the processing apparatus 104 (device control unit 104c) detects the touch on the input area 109b of the information display panel 105. The accumulation unit 104d accumulates a control command corresponding to the touch on the input area 109b. The control command is, for example, a control command for controlling set temperature. The control command may be a control command for controlling air volume or wind direction, instead of the control command for controlling the set temperature. The processing apparatus 104 (device control unit 104c) obtains the corresponding control command from the accumulation unit 104d and outputs the control command to the air conditioner, which is the corresponding device. Therefore, the driver 101 can increase the set temperature of the automobile air conditioner installed near the passenger 102 by touching the input area 109b to cause the processing apparatus 104 to output the control command for increasing only the temperature around the passenger 102. In doing so, the driver 101 can increase the temperature around the passenger 102 without performing a complicated operation, thereby safely creating a comfortable space for the passenger 102 without affecting the driving operation thereof. Although a case in which the passenger 102 is feeling cold has been described above, the same holds, in the opposite way, for a case in which the passenger 102 is feeling hot; the temperature of the periphery of the passenger 102, such as cheeks and hands, increases by a certain value or more, and the set temperature of the automobile air conditioner installed near the passenger 102 can be decreased by a similar process. As a result, the driver 101 can decrease the temperature around the passenger 102 without performing a complicated operation, thereby safely creating a comfortable space for the passenger 102 without affecting the driving operation thereof.

Although the passenger 102 is asleep in the example illustrated in FIG. 10, the application of this embodiment is not limited to a case in which the passenger 102 is asleep.

Figure 11:
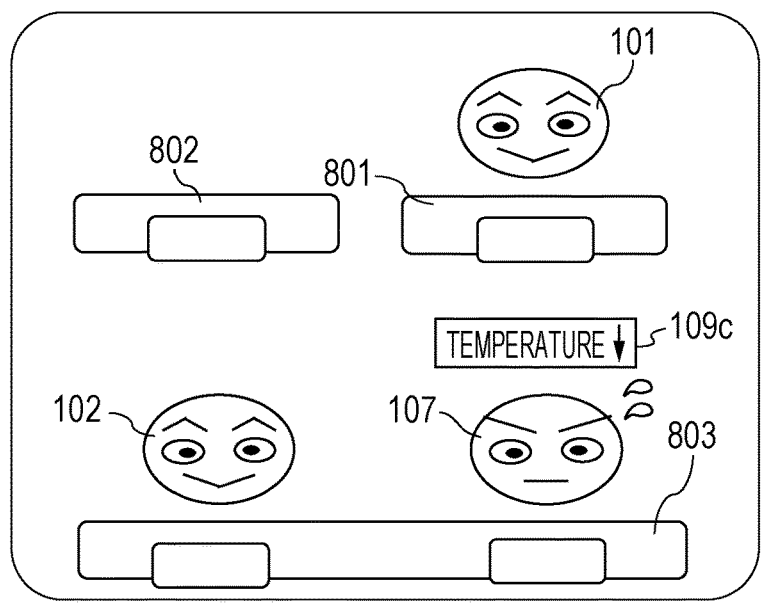
FIG. 11 is a diagram illustrating an example of the display screen of the information display panel in the detection system according to the first embodiment of the present disclosure.

FIG. 11 is a diagram illustrating an example of the display screen of the information display panel 105 in the detection system 106 according to the first embodiment of the present disclosure. More specifically, FIG. 11 is a diagram illustrating an example of the display screen of the information display panel 105 at a time when the passenger 107 is feeling hot. This embodiment may be applied to a case in which the passenger 107 is awake as illustrated in FIG. 11. In FIG. 11, for example, if the temperature of cheeks, hands, or feet of the passenger 107 has increased by a certain value or more, the processing apparatus 104 can determine that the passenger 107 is feeling hot. In this case, an input area 109*c* for an automobile air conditioner that decreases only temperature around the passenger 107 may be displayed as illustrated in FIG. 11. By touching the input area 109*c*, the driver 101 can output a control command for decreasing only the temperature of the automobile air conditioner installed near the passenger 107 to the automobile air conditioner to decrease the set temperature of the automobile air conditioner installed near the passenger 107. In doing so, the driver 101 can decrease the temperature around the passenger 107 without performing a complicated operation, thereby safely creating a comfortable space for the passenger 107 without affecting the driving operation thereof. This operation is also effective in the case of, say, a taxi. For example, if the passenger 107 is a customer and feeling hot, the passenger 107 might not ask the driver 101 to change the set temperature of an automobile air conditioner, trying to tolerate the hotness. Even in this case, the driver 101 can notice how the passenger 107 is feeling by checking the information display panel 105 and decrease the temperature around the passenger 107 without performing a complicated operation. Therefore, the driver 101 can safely create a comfortable space for the passenger 107 without affecting the driving operation thereof while taking the passenger 107 to the destination.

Figure 12:
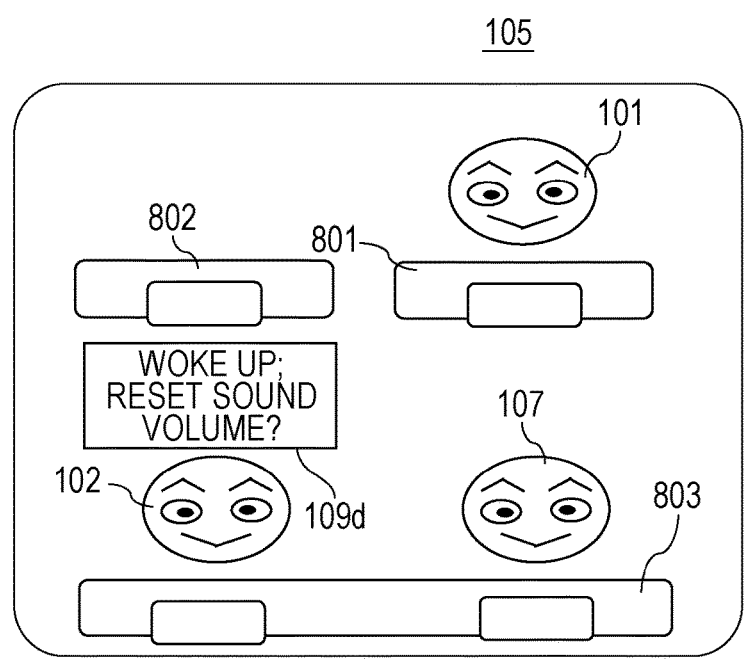
FIG. 12 is a diagram illustrating an example of the display screen of the information display panel in the detection system according to the first embodiment of the present disclosure.

Although an operation when the passenger 102 falls asleep has been described above, the application of this embodiment is not limited to this. FIG. 12 is a diagram illustrating an example of the display screen of the information display panel 105 in the detection system 106 according to the first embodiment of the present disclosure. More specifically, FIG. 12 is a diagram illustrating an example of the display screen of the information display panel 105 at a time when the passenger 102 has woken up.

For example, if the processing apparatus 104 has detected on the basis of the amount of body movement or the temperature of the periphery of the passenger 102 that the passenger 102 has woken up, for example, a message "Woke up; reset sound volume?" may be displayed on the information display panel 105 as indicated by an input area 109*d* illustrated in FIG. 12. In addition, the icon of the passenger 102 may be reset to an awake state to notify the driver 101 that the passenger 102 has woken up. By touching the input area 109*d* (for example, by touching the information display panel 105 with his/her fingertip) in this state, the driver 101 can cause the processing apparatus 104 to reset the volume of the speaker (car audio system) installed near the passenger 102 to a normal volume, thereby enabling the passenger 102 to listen to the car audio system with the normal volume. As a result, the driver 101 can safely create a comfortable space for the passenger 102.

In addition, although a configuration has been described in this embodiment in which an icon for controlling a device displayed on the information display panel 105 is touched to output a control command corresponding to the performed operation to the corresponding device, the operation to be performed is not limited to this. For example, a region of the information display panel 105 in which an icon for controlling a device is displayed may be slided (for example, moving a fingertip in a certain direction while touching the information display panel 105) and a control command according to the direction and length of the sliding may be output to a corresponding device. For example, the accumulation unit 104*d* may accumulate the icon for controlling the device and control commands according to the directions and lengths of sliding in the region in which the icon is displayed while associating the icon and the control commands with each other. The processing apparatus 104 (device control unit 104*c*) may then output a control command according to the direction and length of sliding detected on the information display panel 105 to a corresponding device.

In addition, the processing apparatus 104 may include a sound recognition unit (not illustrated) that recognizes sound. The sound recognition unit recognizes, for example, a sound emitted by the driver 101. The accumulation unit 104*d* accumulates sounds to be recognized and control commands to be output to devices in accordance with the sounds while associating the sounds and the control commands with each other. In the processing apparatus 104, the sound recognition unit may be configured to output a control command according to a recognized sound to a corresponding device.

In addition, the detection system 106 may utilize a speed detection unit (not illustrated) that detects the speed of the automobile 100 during driving. The speed detection unit is installed in the automobile 100. And the processing apparatus 104 may, for example, receive the speed data detected by the speed detection unit. If the processing apparatus 104 has determined that the automobile 100 is stationary based on the received speed data, the processing apparatus 104 may, for example, receive an operation performed on an icon for controlling a device displayed on the information display panel 105.

On the other hand, for example, if the processing apparatus 104 has determined that the automobile 100 is running (or if the detection unit has determined that the automobile 100 is not stationary), the processing apparatus 104 may operate the sound recognition unit (not illustrated). At this time, the processing apparatus 104 may be configured to inhibit reception of an operation performed on an icon for controlling a device displayed on the information display panel 105 or inhibit display of (or not to display) an icon for controlling a device on the information display panel 105.

Although an example in which the processing apparatus 104 is installed inside the automobile 100 has been described in this embodiment, the arrangement of the processing apparatus 104 is not limited to this. For example, a communication apparatus (not illustrated) having a certain communication function may be arranged inside the automobile 100, and a thermal image obtained by the infrared array sensor 103 may be transmitted to a processing apparatus arranged outside the automobile 100 through the communication apparatus having the certain communication function. The processing apparatus arranged outside the automobile 100 may perform image processing and feed necessary control data back to the communication apparatus having the certain communication function.

The processing apparatus arranged outside the automobile 100 may be a cloud server in a data center or may be a personal computer (PC) used at home.

Second Embodiment

A detection system 206 according to a second embodiment will be described with reference to FIGS. 13A to 18B. In this embodiment, an example will be described in which the detection system 206 is adopted in an airplane 200.

Figure 13A:
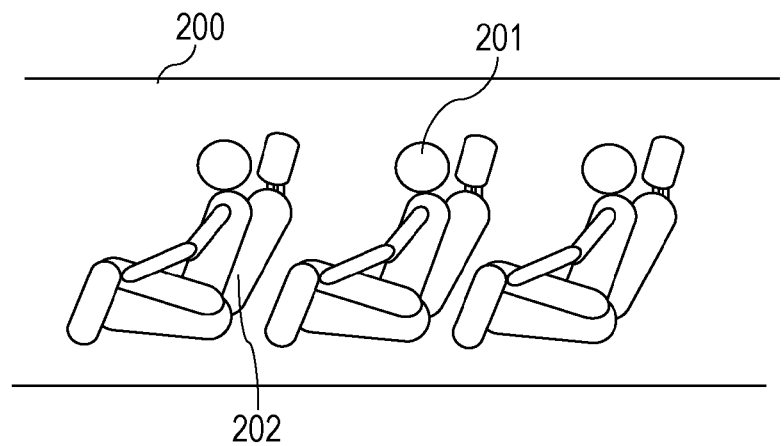
FIG. 13A is a schematic side view of the inside of an airplane in which a detection system according to a second embodiment of the present disclosure is installed.
Figure 13B:
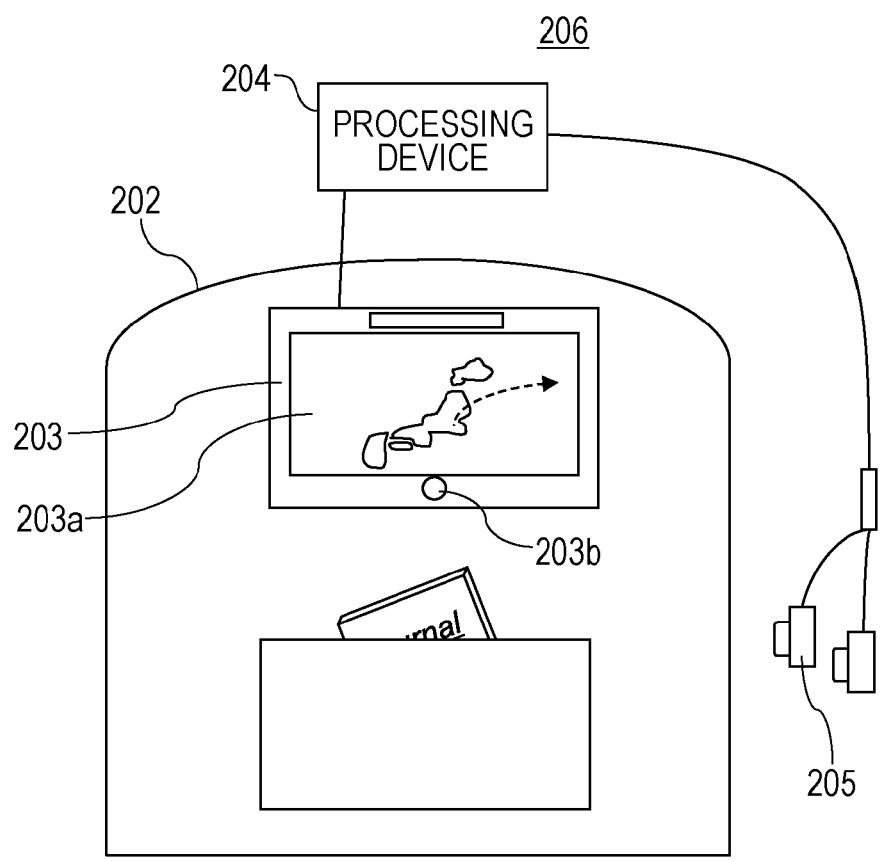
FIG. 13B is a diagram illustrating an example of a display screen of an information display panel in the detection system according to the second embodiment of the present disclosure.

FIG. 13A is a schematic side view of the inside of the airplane 200 in which the detection system 206 according to the second embodiment of the present disclosure is installed. FIG. 13B is a diagram illustrating an example of a display screen of an information display panel in the detection system 206 according to the second embodiment of the present disclosure.

More specifically, FIG. 13A is a diagram schematically illustrating seated passengers and the arrangement of seats in the airplane 200. In front of a passenger 201 is a seat 202 used by another passenger. As illustrated in FIG. 13B, a display apparatus 203 corresponding to an information display panel of a touch panel type is mounted on the seat 202. A touch panel 203a is provided for the display apparatus 203, and an infrared array sensor 203b is arranged at a lower portion of the touch panel 203a. Sound broadcast in synchronization with images displayed on the touch panel 203a is output from earphones, which correspond to a device 205, through a processing apparatus 204. In this embodiment, the detection system 206 includes the infrared array sensor 203b and the processing apparatus 204.

Figure 14:
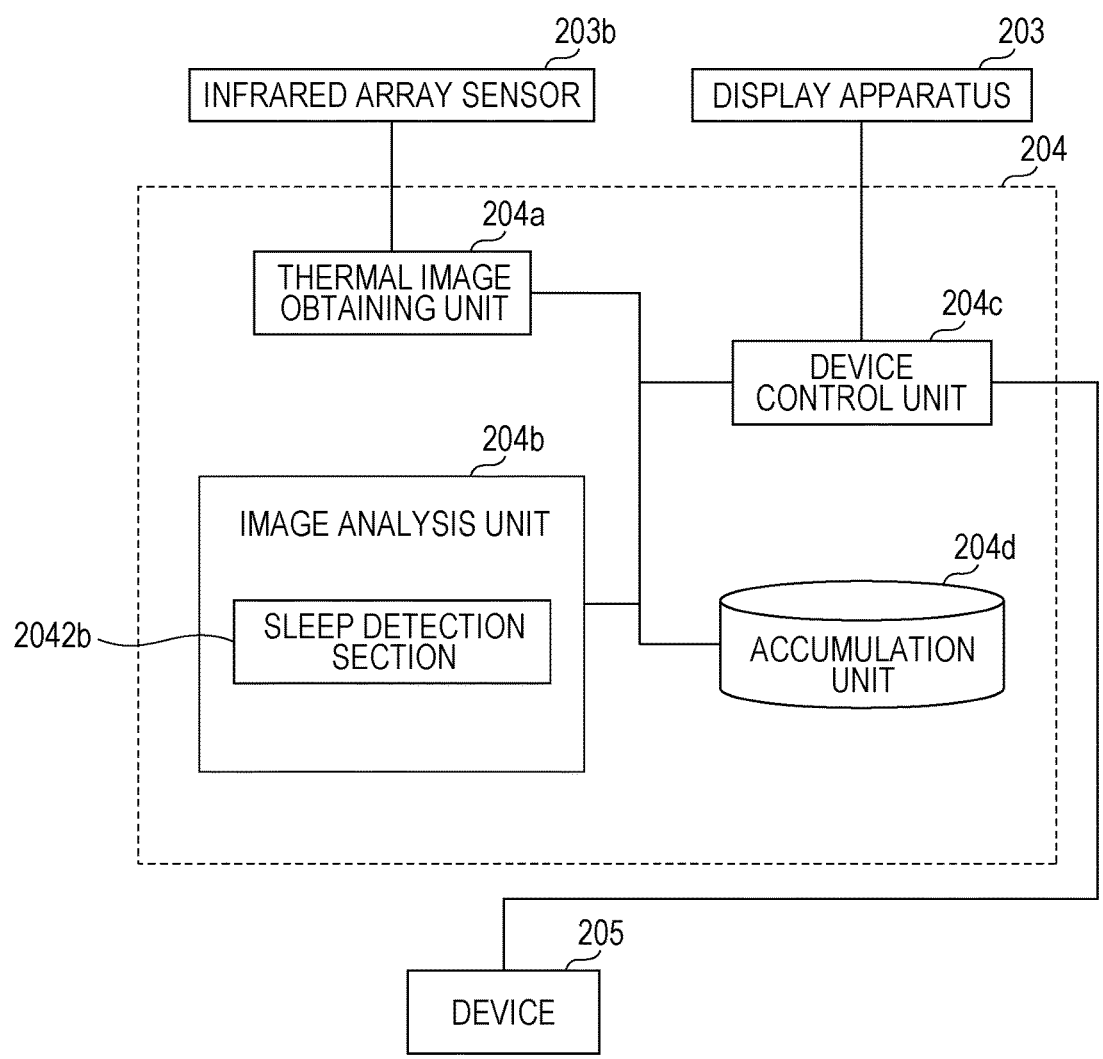
FIG. 14 is a block diagram illustrating an example of the configuration of the detection system according to the second embodiment of the present disclosure.

FIG. 14 is a block diagram illustrating an example of the configuration of the detection system 206 according to the second embodiment of the present disclosure.

As illustrated in FIG. 14, the processing apparatus 204 includes a thermal image obtaining unit 204a, an image analysis unit 204b, a device control unit 204c, and an accumulation unit 204d.

The processing apparatus 204 is configured, for example, using a computer. The computer includes a CPU, a memory, and hardware, which is not illustrated. The accumulation unit 204d corresponds to, for example, the memory. The memory is a storage device such as a ROM or a RAM. The memory accumulates, for example, programs that function as the thermal image obtaining unit 204a, the image analysis unit 204b, and the device control unit 204c, and by reading the programs from the memory and executing the programs using the CPU, the functions of the thermal image obtaining unit 204a, the image analysis unit 204b, and the device control unit 204c are realized. Alternatively, the functions of the thermal image obtaining unit 204a, the image analysis unit 204b, and the device control unit 204c in the processing apparatus 204 may be realized by integrated circuits.

The image analysis unit 204b includes, for example, a sleep detection section 2042b. However, the detection system 206 installed in the airplane 200 is not limited to this. The detection system 206 may include another sensor or the like. Since FIG. 14 schematically illustrates the functional configuration of the processing apparatus 204, the processing apparatus 204 need not necessarily have this functional configuration but may have another functional configuration. That is, a device other than the processing apparatus 204 may include part of the functional configuration illustrated in FIG. 14.

In this embodiment, the thermal image obtaining unit 204a, the image analysis unit 204b, and the device control unit 204c included in the processing apparatus 204 detect whether a passenger is asleep on the basis of a thermal image. This operation is the same as the operation performed by the thermal image obtaining unit 104a, the image analysis unit 104b, and the device control unit 104c to detect whether a passenger is asleep on the basis of a thermal image, and accordingly detailed description thereof is omitted.

Figure 15:
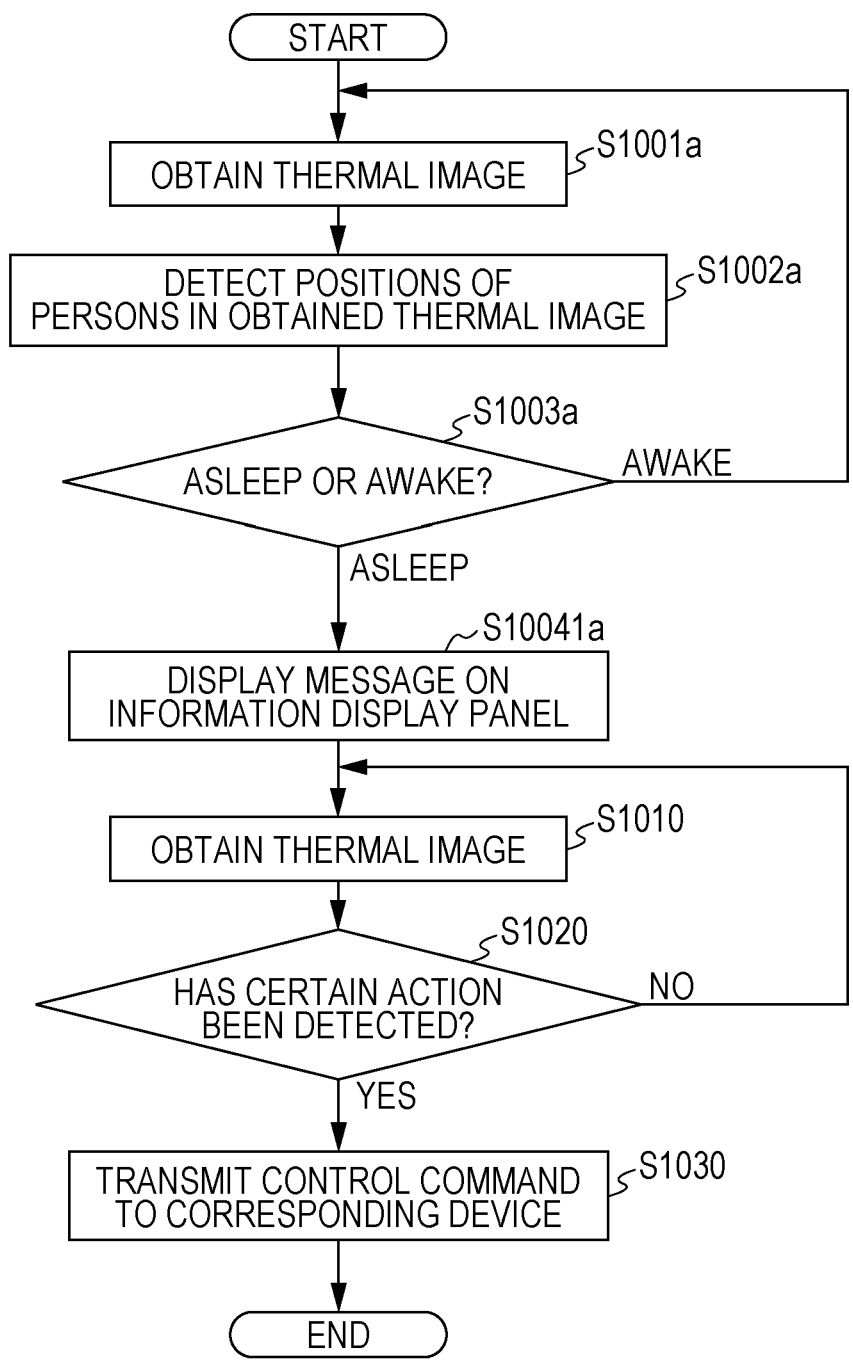
FIG. 15 is a flowchart illustrating an example of a process performed by the detection system according to the second embodiment of the present disclosure.

FIG. 15 is a flowchart illustrating an example of the detection system 206 according to the second embodiment of the present disclosure.

First, in step S1001a, the thermal image obtaining unit 204a obtains a thermal image from the infrared array sensor 203b. Next, in step S1002a, a person position detection section (not illustrated) of the image analysis unit 204b detects the seated passenger 201 in the obtained thermal image through image processing. Next, in step S1003a, the sleep detection section 2042b of the image analysis unit 204b determines whether the detected passenger 201 is asleep or awake on the basis of a change in the thermal image of the passenger 201 detected by the person position detection section. If the sleep detection section 2042b has determined in step S1003a that the passenger 201 is awake, the process returns to step S1001a. On the other hand, if the sleep detection section 2042b has determined in step S1003a that the passenger 201 is asleep, the process proceeds to step S10041a.

In step S10041a, the processing apparatus 204 displays a message on the touch panel 203a. The message may be, for example, a message for prompting the seated passenger 201 to take a certain action.

Next, in step S1010, the thermal image obtaining unit 204a obtains a thermal image from the infrared array sensor 203b.

Next, in step S1020, the image analysis unit 204b determines, on the basis of the obtained thermal image, whether the seated passenger 201 has taken the certain action.

In step S1030, on the basis of a result of the determination whether the certain action has been taken, the image analysis unit 204b outputs a control command for controlling the corresponding device 205.

The process illustrated in FIG. 15 is an example and is not limited to the process described above. For example, the process for displaying a message on the touch panel 203a in step S10041a need not necessarily be performed. If it has been determined in step S1003a that the passenger 201 is asleep, a process for outputting a control command for controlling the device 205 may be performed as necessary.

FIG. 16A is a diagram illustrating an example of a display screen of the display apparatus 203 in the detection system 206 according to the second embodiment of the present disclosure. FIG. 16B is a diagram illustrating another example of the display screen of the display apparatus 203 in the detection system 206 according to the second embodiment of the present disclosure. In the following description, control of the sound volume of the earphones, which is an example of the control of the corresponding device 205 illustrated in the flowchart of FIG. 15, and control of the display screen of the touch panel 203a will be described. In addition, a nod will be taken as an example of the certain action mentioned in the flowchart of FIG. 15. Because the infrared array sensor 203b can measure temperature distribution inside the airplane 200 as in the first embodiment, the infrared array sensor 203b can detect temperature distribution around a body of the passenger 201. As in the first embodiment, the image analysis unit 204b measures the amount of body movement of, say, a head of the passenger 201 over time, in order to enable the processing apparatus 204 to determine whether the passenger 201 is asleep.

If the touch panel 203a showing a movie or the like is suddenly turned off while the passenger 201 is asleep, however, the passenger 201 might be surprised and wake up. In addition, when the passenger 201 is not deeply asleep, the passenger 201 might be surprised and wake up if the display apparatus 203 is suddenly turned off. Therefore, if the image analysis unit 204b of the processing apparatus 204 has determined that the passenger 201 has fallen asleep, the processing apparatus 204 performs control (transmits a control command) to turn down the volume of the sound output from the earphones, which correspond to the device 205. Furthermore, as illustrated in FIG. 16A, the device control unit 204c controls the display apparatus 203 (transmits a control command) such that the touch panel 203a displays a notification 207a (message) indicating, for example, "Please nod if the volume is too low".

The infrared array sensor 203b detects the state of the passenger 201 at this time, and if the processing apparatus 204 has determined that the passenger 201 has nodded, the processing apparatus 204 determines that the passenger 201 has not completely fallen asleep. The device control unit 204c performs control (transmits a control command) to reset the volume to an original level. If the passenger 201 does not nod, the processing apparatus 204 determines that it is likely that the passenger 201 has fallen asleep, and the device control unit 204c performs control (transmits a control command) to turn further down the volume. This operation is repeated, and if the processing apparatus 204 has determined with the volume being minimum that the passenger 201 has not nodded, the processing apparatus 204 determines that the passenger 201 has completely fallen asleep, and the device control unit 204c may perform control (transmit a control command) to turn off the touch panel 203a. In doing so, the space around the passenger 201 becomes dark when the passenger 201 is asleep, thereby enabling the passenger 201 to sleep comfortably and reducing wasteful power consumption, which is advantageous.

Similarly, as illustrated in FIG. 16B, if the image analysis unit 204b has determined that the passenger 201 has fallen asleep, the device control unit 204c transmits a control command for directly displaying a notification 207b (message) indicating, for example, "Please nod if you are still watching" for the passenger 201 to the display apparatus 203, instead of controlling the earphones, which correspond to the device 205. Upon receiving the control command, the display apparatus 203 displays the notification 207b on the touch panel 203a. The infrared array sensor 203b detects the state of the passenger 201 at this time, and if the infrared array sensor 203b has determined that the passenger 201 has nodded, the image analysis unit 204b determines that the passenger 201 is not deeply asleep. The device control unit 204c performs control (transmits a control command) to keep displaying the notification 207b on the touch panel 203a. On the other hand, if the passenger 201 does not nod, the image analysis unit 204b determines that the passenger 201 has fallen asleep, and the image analysis unit 204b may perform control (transmit a control command) to remove the notification 207b on the touch panel 203a. Of course, the volume of the earphones, which correspond to the device 205 and are not illustrated, may be gradually turned down. In doing so, the space around the passenger 201 becomes dark when the passenger 201 is asleep, thereby enabling the passenger 201 to sleep comfortably and reducing wasteful power consumption, which is advantageous.

Although the image analysis unit 204b detects a nod as an action indicating that the passenger 201 is awake, this is an example. Alternatively, for example, moving a hand or shaking head may be detected, and the action to be taken is not particularly limited herein.

In addition, as described in the first embodiment, it is generally known that when a person is feeling cold, the blood flow to the periphery of his/her body is reduced in order to prevent body heat from being dissipated into the air. Therefore, for example, if the temperature of the hands, the feet, or the cheeks of the passenger 201 has decreased by a certain value or more, the processing apparatus 204 may determine that the passenger 201 is feeling cold. Similarly, if the temperature of the hands, the feet, or the cheeks of the passenger 201 has increased by a certain value or more, the processing apparatus 204 may determine that the passenger 201 is feeling hot. Therefore, in order to measure the temperature of hands, the infrared array sensor 203b is provided in a lower part of the touch panel 203a.

Figure 17:
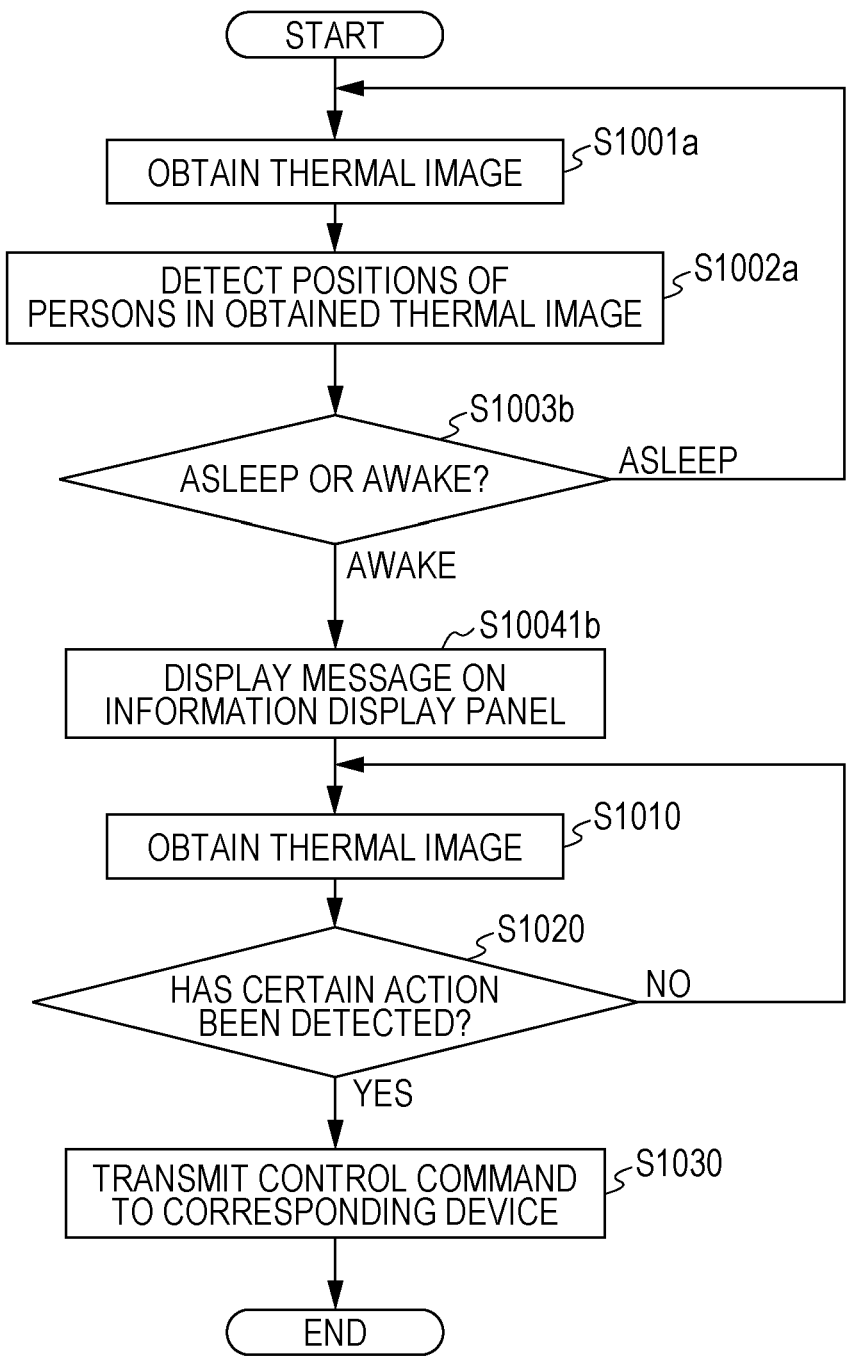
FIG. 17 is a flowchart illustrating an example of a process performed by the detection system according to the second embodiment of the present disclosure.

FIG. 17 is a flowchart illustrating an example of a process performed by the detection system 206 according to the second embodiment of the present disclosure. Steps S1001a and S1002a illustrated in FIG. 17 have already been described with reference to FIG. 15, and accordingly description thereof is omitted.

Next, in step S1003b, the sleep detection section 2042b of the image analysis unit 204b determines whether the detected passenger 201 is asleep or awake on the basis of a change in the thermal image of the passenger 201 detected by the person position detection section. If the sleep detection section 2042b has determined in step S1003b that the passenger 201 is awake, the process proceeds to step S10041b. On the other hand, if the sleep detection section 2042b has determined in step S1003b that the passenger 201 is asleep, the process returns to step S1001a.

In step S10041b, the processing apparatus 204 displays a message on the touch panel 203a. The message may be, for example, a message for prompting the seated passenger 201 to take a certain action.

Steps S1010, S1020, and S1030 illustrated in FIG. 17 have already been described with reference to FIG. 15, and accordingly description thereof is omitted.

The process described with reference to FIG. 17 is an example, and the process to be performed is not limited to this. For example, the process for displaying a message on the touch panel 203a in step S10041b need not necessarily be performed.

Figure 18A:
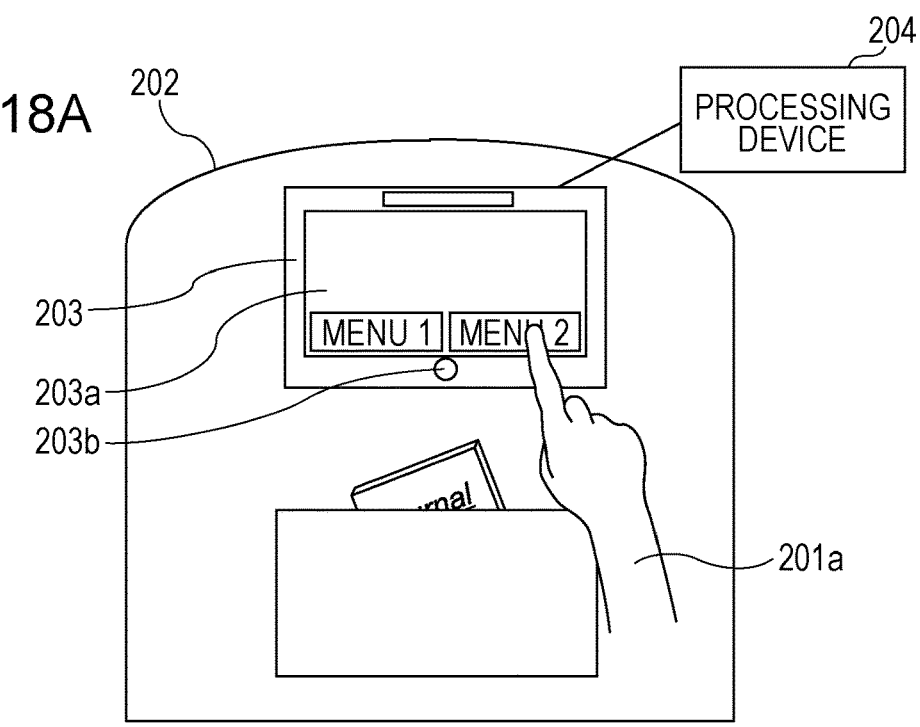
FIG. 18A is a diagram illustrating an example of the display screen of the display apparatus in the detection system according to the second embodiment of the present disclosure.
Figure 18B:
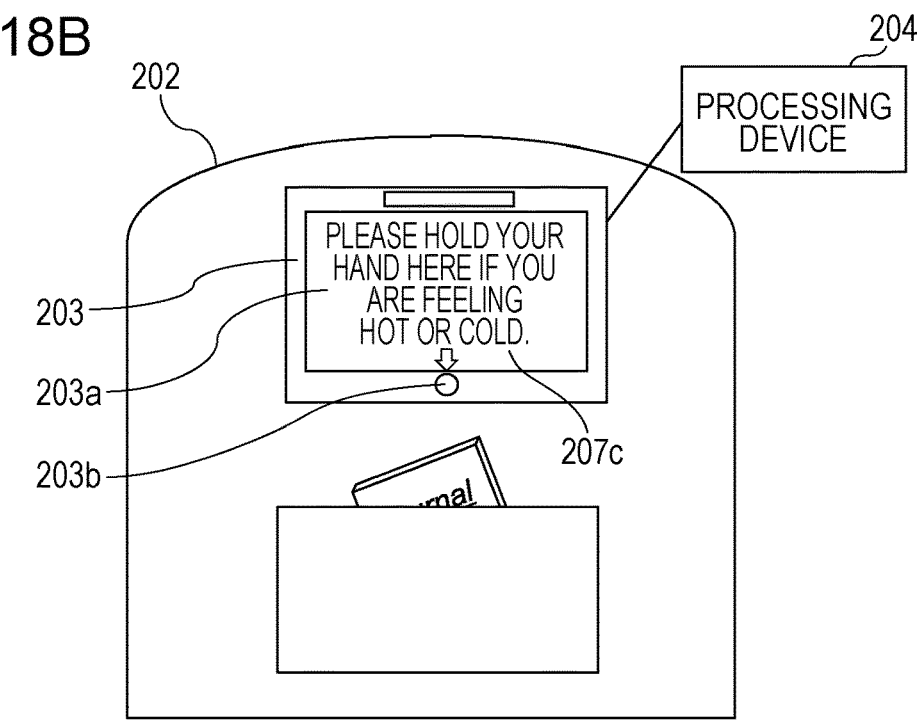
FIG. 18B is a diagram illustrating an example of the display screen of the display apparatus in the detection system according to the second embodiment of the present disclosure.

FIG. 18A is a diagram illustrating an example of the display screen of the display apparatus 203 in the detection system 206 according to the second embodiment of the present disclosure. FIG. 18B is a diagram illustrating another example of the display screen of the display apparatus 203 in the detection system 206 according to the second embodiment of the present disclosure.

In the following description, a process for controlling an air conditioner connected to the processing apparatus 204 will be described as an example of the control of the corresponding device 205 illustrated in the flowchart of FIG. 17. In addition, holding a hand over the infrared array sensor 203b will be taken as an example of the certain action mentioned in the flowchart of FIG. 15. For example, as illustrated in FIG. 18A, if the passenger 201 touches a menu displayed on the touch panel 203a, the infrared array sensor 203b can certainly measure the temperature of a right hand 201a of the passenger 201. For the above-described reason, how the passenger 201 is feeling about temperature can be estimated by processing the measured temperature of the right hand 201a of the passenger 201 using the processing apparatus 204. As a result, the processing apparatus 204 transmits a control command to the air conditioner on the basis of a result of the estimation to control the air conditioner directed toward the passenger 201, who is not illustrated. Therefore, the temperature around the passenger 201 becomes optimal for the passenger 201. Since the temperature of the right hand 201a of the passenger 201 can be measured without the passenger 201 noticing it, it is always possible to provide a comfortable space for the passenger 201 without making the passenger 201 control the air conditioner.

Furthermore, as illustrated in FIG. 18B, a notification 207c (message) indicating, for example, "Please hold your hand here" may be displayed for the infrared array sensor 203b. For example, if the passenger 201 is feeling hot, the infrared array sensor 203b can estimate how the passenger 201 is feeling about temperature by measuring the temperature of the hand of the passenger 201 held thereover. For the above-described reason, how the passenger 201 is feeling about temperature can be estimated by processing the measured temperature of the hand of the passenger 201 using the processing apparatus 204. As a result, a control command is transmitted to the air conditioner on the basis of a result of the estimation to control the air conditioner directed toward the passenger 201, who is not illustrated. Therefore, the temperature around the passenger 201 becomes optimal for the passenger 201. It is possible to provide a comfortable space for the passenger 201 only if the passenger 201 holds his/her hand over the infrared array sensor 203b, instead of changing the set temperature of the air conditioner.

Third Embodiment

A detection system 306 according to a third embodiment will be described with reference to FIGS. 19A to 26B. In this embodiment, as in the first embodiment, an example will be described in which the detection system 306 is adopted in an automobile 300.

Figure 19A:
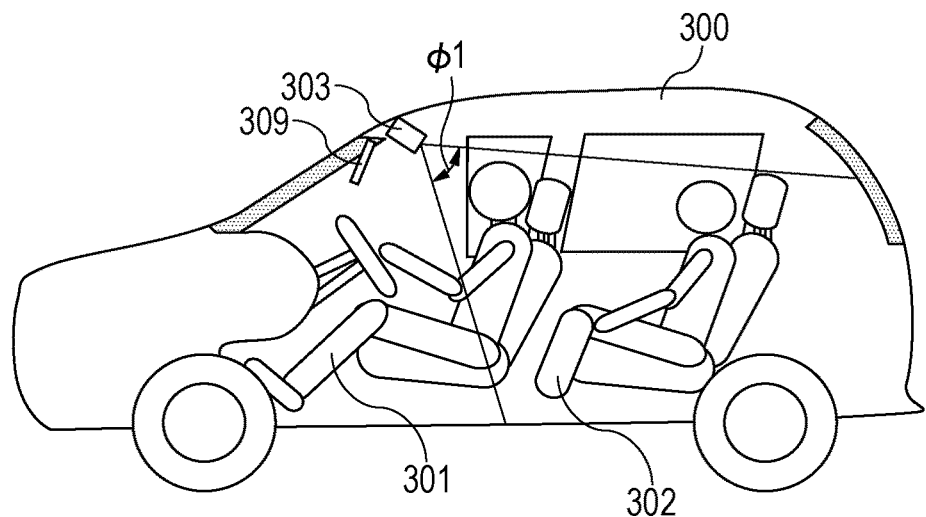
FIG. 19A is a schematic side view of the inside of an automobile in which a detection system according to a third embodiment of the present disclosure is installed.
Figure 19B:
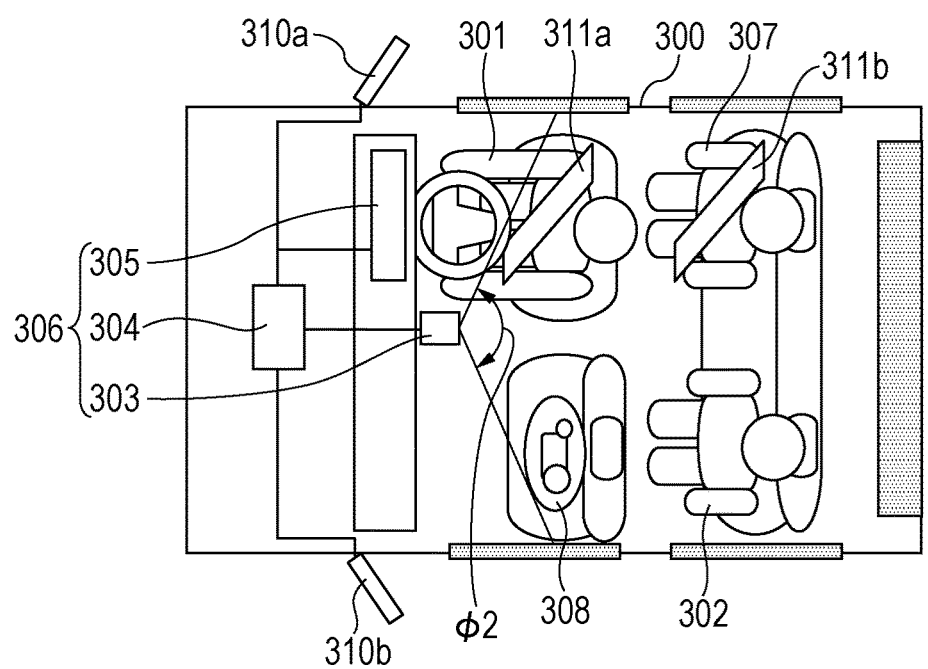
FIG. 19B is a schematic plan view of the inside of the automobile in which the detection system according to the third embodiment of the present disclosure is installed.

FIG. 19A is a schematic side view of the inside of the automobile 300 in which the detection system 306 according to the third embodiment is installed. FIG. 19B is a schematic plan view of the inside of the automobile 300 in which the detection system 306 according to the third embodiment is installed.

As illustrated in FIGS. 19A and 19B, the detection system 306 according to this embodiment is installed inside the automobile 300, as with the detection system 106 according to the first embodiment. The detection system 306 includes an infrared array sensor 303, a processing apparatus 304, and an information display panel 305. Differences between the configuration of the automobile 300 according to the third embodiment and the configuration of the automobile 100 according to the first embodiment include side mirrors 310a and 310b, which are mounted on the automobile 300, connected to the processing apparatus 304 by cables that are not illustrated and a rearview mirror 309, which is mounted on the automobile 300, connected to the processing apparatus 304 by a cable that is not illustrated.

In addition, the automobile 300 illustrated in FIGS. 19A and 19B is different from the automobile 100 illustrated in FIGS. 1A and 1B in that a bag 308 is put on a front passenger seat and a driver 301 and a passenger 307 wear seatbelts 311a and 311b, respectively. Apart from these differences, the inside of the automobile 300 according to the third embodiment is the same as the inside of the automobile 100 according to the first embodiment.

Figure 20:
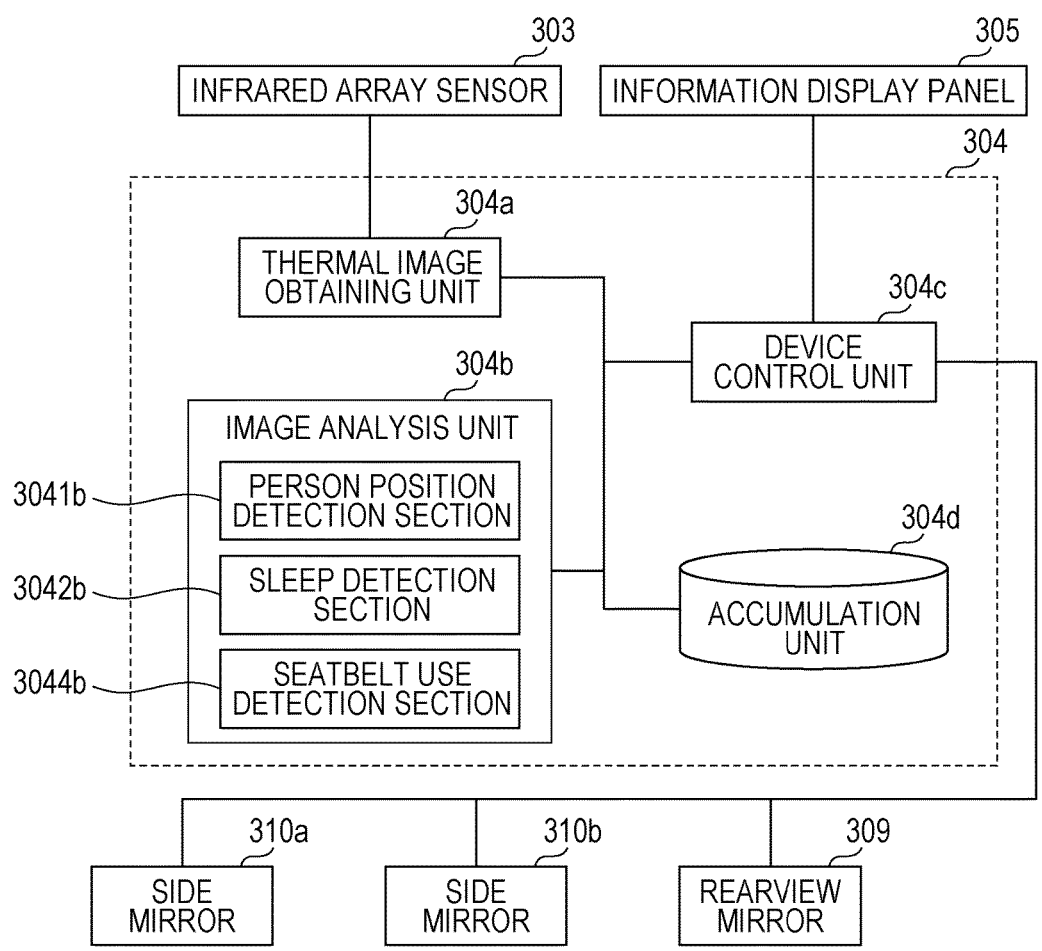
FIG. 20 is a block diagram illustrating an example of the configuration of the detection system according to the third embodiment of the present disclosure.

FIG. 20 is a block diagram illustrating an example of the configuration of the detection system 306 according to the third embodiment of the present disclosure.

As illustrated in FIG. 20, the processing apparatus 304 includes a thermal image obtaining unit 304a, an image analysis unit 304b, a device control unit 304c, and an accumulation unit 304d.

The processing apparatus 304 is configured, for example, using a computer. The computer includes a CPU, a memory, and hardware, which is not illustrated. The accumulation unit 304d corresponds to, for example, the memory. The memory is a storage device such as a hard disk, a ROM, or a RAM. The memory accumulates, for example, programs that function as the thermal image obtaining unit 304a, the image analysis unit 304b, and the device control unit 304c, and by reading the programs from the memory and executing the programs using the CPU, the functions of the thermal image obtaining unit 304a, the image analysis unit 304b, and the device control unit 304c are realized. Alternatively, the functions of the thermal image obtaining unit 304a, the image analysis unit 304b, and the device control unit 304c in the processing apparatus 304 may be realized by integrated circuits.

However, the configuration of the processing apparatus 304 is not limited to this. Another sensor may be included in the processing apparatus 304. The image analysis unit 304b includes, for example, a person position detection section 3041b and a seatbelt use detection section 3044b. Since FIG. 20 schematically illustrates the functional configuration of the processing apparatus 304, the processing apparatus 304 need not necessarily have this functional configuration but may have another functional configuration. That is, a device other than the processing apparatus 304 may have part of the functional configuration of the processing apparatus 304 illustrated in FIG. 20.

Figure 21A:
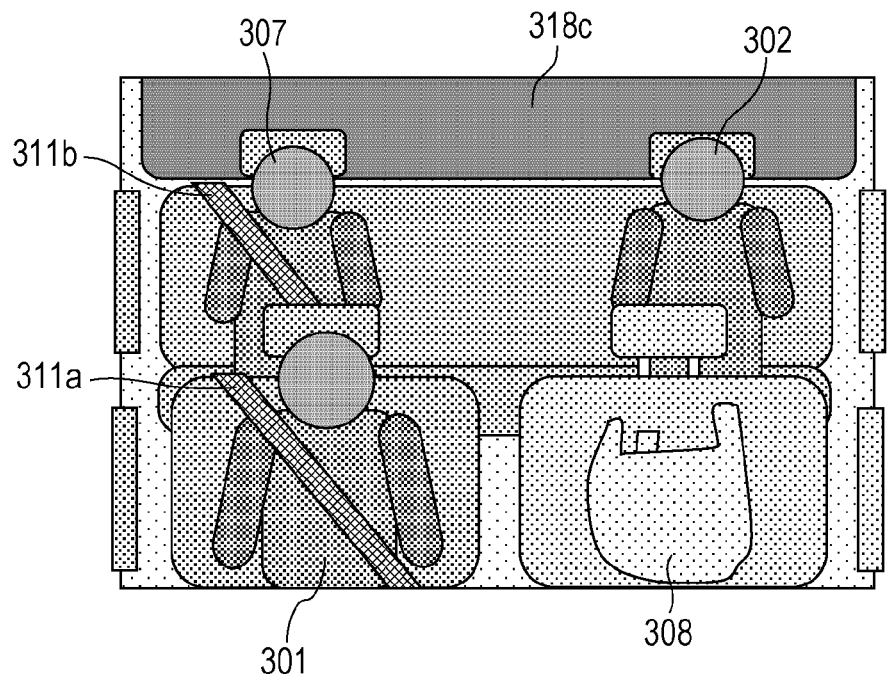
FIG. 21A is a diagram illustrating an example of a thermal image captured by an infrared array sensor in the detection system according to the third embodiment of the present disclosure.
Figure 21B:
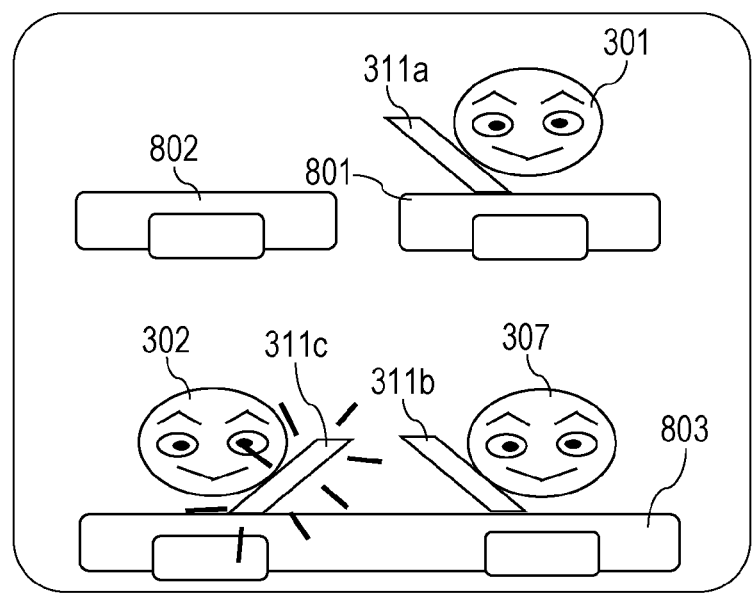
FIG. 21B is a diagram illustrating an example of a display screen of an information display panel in the detection system according to the third embodiment of the present disclosure.

FIG. 21A is a diagram illustrating an example of a thermal image captured by the infrared array sensor 303 in the detection system 306 according to the third embodiment of the present disclosure. FIG. 21B is a diagram illustrating an example of a display screen of the information display panel 305 in the detection system 306 according to the third embodiment of the present disclosure. As in the thermal image in FIG. 3B described in the first embodiment, differences in temperature are schematically indicated by different densities of hatching in the thermal image illustrated in FIG. 21A. In an actual thermal image, the density of hatching becomes higher as the temperature increases, and the density of hatching becomes lower as the temperature decreases.

In the thermal image schematically illustrated in FIG. 21A, the temperatures of faces of the driver 301, a passenger 302, and the passenger 307 are the highest, and the temperature of a rear window 318c is the second highest. The temperatures of arms of the driver 301 and the passengers 302 and 307 are the third highest, and the temperatures of clothes of the driver 301 and the passengers 302 and 307 are the fourth highest. The temperatures of seats used by the driver 301 and the passengers 302 and 307 are the fifth highest.

The captured thermal image is analyzed by the image analysis unit 304b. The person position detection section 3041b of the image analysis unit 304b according to this embodiment measures not only the position of a person but also, for example, the height of the driver 301. Furthermore, the person position detection section 3041b detects the position of eyes on the basis of the measured height and position. The device control unit 304c obtains, on the basis of the position of eyes detected by the person position detection section 3041b, a control command for adjusting the angle of the rearview mirror 309 connected to the processing apparatus 304 and control commands for adjusting the angles of the side mirrors 310a and 310b from the accumulation unit 304d and transmits the control commands to a control apparatus (not illustrated) that adjusts the angle of the rearview mirror 309 and control apparatuses (not illustrated) that adjust the angles of the side mirrors 310a and 310b. Upon receiving the control command, the control apparatus that adjusts the angle of the rearview mirror 309 adjusts the angle of the rearview mirror 309. Upon receiving the control commands, the control apparatuses that adjust the angles of the side mirrors 310a and 310b adjust the angles of the side mirrors 310a and 310b.

As a result, the rearview mirror 309 and the side mirrors 310a and 310b are automatically adjusted (control commands are transmitted) to optimal angles, so that the driver

301 can see rearward without adjusting the rearview mirror 309 and the side mirrors 310*a* and 310*b* manually. The optimal angles of the rearview mirror 309 and the side mirrors 310*a* and 310*b* are calculated in advance in accordance with various positions of eyes. On the basis of results of the calculation, information in which the positions of eyes and control commands for controlling the angles of the rearview mirror 309 and the side mirrors 310*a* and 310*b* are associated with each other is accumulated to the accumulation unit 304*d* of the processing apparatus 304 in advance. Therefore, control commands according to a detected position of eyes are output to the rearview mirror 309 and the side mirrors 310*a* and 310*b* in accordance with the position of eyes detected by the infrared array sensor 303. The angles of the rearview mirror 309 and the side mirrors 310*a* and 310*b* may be adjusted in this manner. In doing so, for example, even when an automobile is used by a plurality of persons in car sharing or the like, the angles of the mirrors are automatically adjusted in accordance with the position of eyes of each person. Therefore, the automobile 300 can be used more safely, without errors in the adjustment of the mirrors.

Next, another example of the detection system 306 according to this embodiment will be described.

A system is known in which an alarm is issued when a passenger on a front passenger seat is not wearing a seatbelt. Such a system is realized, for example, by mounting a weight sensor on the seat and a sensor that detects whether the passenger is wearing the seatbelt. When whether a passenger is seated is detected by a weight sensor or the like, however, a bag 308 having a certain weight or more causes the weight sensor to undesirably determine that a passenger is seated. If the driver starts driving in this state, it is determined that the seatbelt for the seat on which the bag 308 is placed is not used, and accordingly an alarm sound is issued to urge a potential passenger to wear the seatbelt. Therefore, it is problematic to put a heavy bag on the front passenger seat or the like. By using the detection system 306 according to this embodiment, this problem can be solved. Details will be described hereinafter.

The bag 308 on the front passenger seat here is assumed to be a briefcase or the like we usually carry. The temperature of this kind of bag does not become as high as the temperature of a person's skin and remains at room temperature. FIG. 21A is a diagram illustrating an example of a thermal image captured by the infrared array sensor 303 in the detection system 306 according to the third embodiment of the present disclosure. As illustrated in FIG. 21A, the surface temperature of the bag 308 is close to the surface temperature of the front passenger seat. Therefore, whether a passenger is seated can be determined on the basis of the surface temperature of the bag 308. Accordingly, the image analysis unit 304*b* (person position detection section 3041*b*) of the detection system 306 according to this embodiment does not incorrectly detect the bag 308 as a person.

In addition, the image analysis unit 304*b* of the detection system 306 according to this embodiment uses a thermal image to detect whether a seatbelt is used. FIG. 21B is a diagram illustrating an example of the display screen of the information display panel 305 in the detection system 306 according to the third embodiment of the present disclosure. As illustrated in FIG. 21A, the driver 301 and the passengers 302 and 307 are seated. In addition, as illustrated in FIG. 21A, the driver 301 and the passenger 307 are wearing the seatbelts 311*a* and 311*b*, respectively, whereas the passenger 302 is not wearing a seatbelt 311*c*. By analyzing the thermal image using the seatbelt use detection section 3044*b* of the image analysis unit 304*b*, it can be determined that the driver 301 and the passengers 302 and 307 are seated and the driver 301 and the passenger 307 are wearing the seatbelts 311*a* and 311*b*, respectively, whereas the passenger 302 is not wearing the seatbelt 311*c*. This is because the surface temperatures of the seatbelts 311*a* and 311*b* are lower than the temperatures of the clothes of the driver 301 and the passenger 307 since the driver 301 and the passenger 307 are wearing the seatbelts 311*a* and 311*b*, respectively, on their clothes. Therefore, in the thermal image illustrated in FIG. 21A, the densities of hatching in the seatbelts 311*a* and 311*b* are lower than the densities of hatching in the clothes. The seatbelt use detection section 3044*b* holds in advance pattern images for detecting seatbelts included in thermal images. If a pattern image of seatbelt use is included around a portion (for example, clothes) in which the position of a person has been detected, the seatbelt use detection section 3044*b* determines that the detected person is wearing a seatbelt and detects use of a seatbelt. On the other hand, if a pattern image of seatbelt use is not included around a portion (for example, clothes) in which the position of a person has been detected, the seatbelt use detection section 3044*b* determines that the detected person is not wearing a seatbelt and detects nonuse of a seatbelt.

The device control unit 304*c* then performs control (transmits a control command) to reflect the use or nonuse of a seatbelt detected by the image analysis unit 304*b* in the display screen of the information display panel 305 (FIG. 21B). That is, the image analysis unit 304*b* detects the positions of the driver 301 and the passengers 302 and 307 in the automobile 300 from the thermal image illustrated in FIG. 21A. The device control unit 304*c* outputs, to the information display panel 305, control commands for displaying icons corresponding to the states of the driver 301 and the passengers 302 and 307 on the information display panel 305 in accordance with the detected positions. Upon receiving the control commands, the information display panel 305 displays the icons corresponding to the states of the driver 301 and the passengers 302 and 307. Furthermore, as described above, the image analysis unit 304*b* (seatbelt use detection section 3044*b*) detects whether the driver 301 and the passengers 302 and 307 are wearing the seatbelts. The device control unit 304*c* obtains icons indicating whether the seatbelts are used from the accumulation unit 304*d* on the basis of results of the detection as to whether the seatbelts are used. The device control unit 304*c* then transmits, to the information display panel 305, the obtained icons indicating whether the seatbelts are used and control commands for displaying the icons.

Upon receiving the control commands, the information display panel 305 displays the icons indicating whether the seatbelts are used near the positions of the icons indicating the detected persons.

Figure 22:
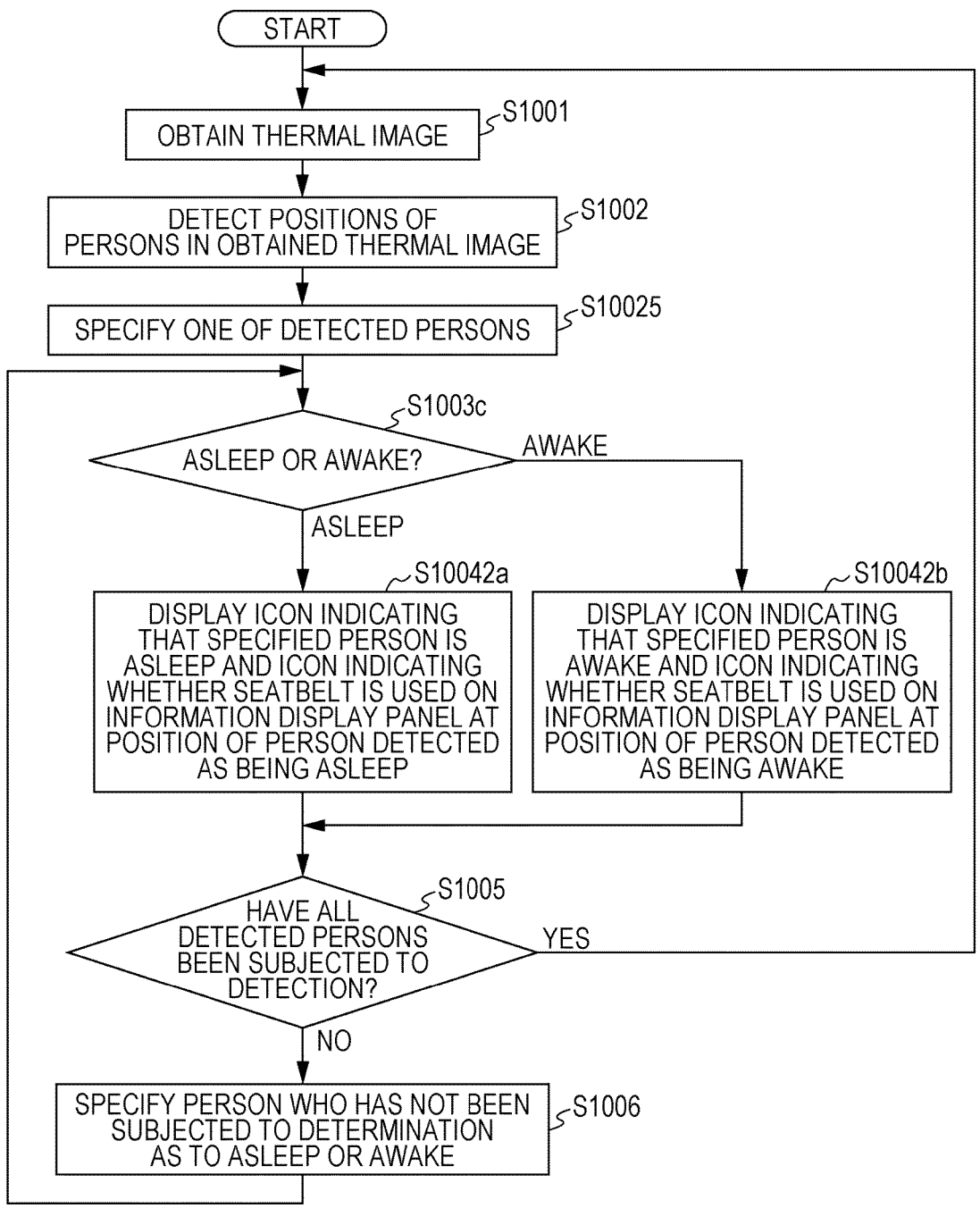
FIG. 22 is a flowchart illustrating an example of a process performed by the detection system according to the third embodiment of the present disclosure.

FIG. 22 is a flowchart illustrating an example of an operation performed by the detection system 306 according to this embodiment.

In FIG. 22, steps S1001, S1002, and S10025 are the same as the corresponding steps illustrated in FIG. 5, and accordingly description thereof is omitted.

In step S1003*c*, a sleep detection section 3042*b* of the image analysis unit 304*b* determines whether the specified person is asleep or awake on the basis of a change in thermal images at a position of the person detected by the person position detection section 3041*b*. In addition, in step S1003*c*, the seatbelt use detection section 3044*b* of the image analysis unit 304*b* determines whether the specified person is wearing a seatbelt.

If the sleep detection section 3042b has determined in step S1003c that the specified person is asleep, the process proceeds to step S10042a. On the other hand, if the sleep detection section 3042b has determined in step S1003c that the specified person is awake, the process proceeds to step S10042b.

In step S10042a, the device control unit 304c extracts an icon indicating that the specified person is asleep from the accumulation unit 304d. In step S10042a, the device control unit 304c then transmits, to the information display panel 305, the icon indicating, in a diagram including the seats inside the automobile 300, that the specified person is asleep and a control command for displaying the icon at a position corresponding to the position of the person detected as being asleep. The information display panel 305 displays the icon indicating that the specified person is asleep in accordance with the received control command. In step S10042a, the device control unit 304c also extracts an icon indicating whether a seatbelt is used from the accumulation unit 304d on the basis of a result of the determination made by the seatbelt use detection section 3044b. The device control unit 304c then transmits, to the information display panel 305, an icon indicating whether the seatbelt is used and a control command for displaying the icon near the icon indicating that the specified person is asleep. The information display panel 305 displays the icon indicating that the seatbelt is used in accordance with the received control command.

In step S10042b, the device control unit 304c transmits, to the information display panel 305, an icon indicating, in the diagram including the seats inside the automobile 300, that the specified person is awake and a control command for displaying the icon at a position corresponding to the position of the person detected as being awake. The information display panel 305 displays the icon indicating that the specified person is awake in accordance with the received control command. In step S10042b, the device control unit 304c also extracts an icon indicating whether the seatbelt is used from the accumulation unit 304d on the basis of the result of the determination made by the seatbelt use detection section 3044b. The device control unit 304c then displays, on the information display panel 305, the icon indicating whether the seatbelt is used near the icon indicating that the specified person is awake.

Steps S1005 and S1006 are the same as the corresponding steps illustrated in FIG. 5, and accordingly description thereof is omitted.

In the information display panel 305 illustrated in FIG. 21B, the seatbelts 311a and 311b are schematically displayed beside the driver 301 and the passenger 307, who are wearing the seatbelts 311a and 311b, respectively. In addition, the seatbelt 311c flashes beside the passenger 302, who is not wearing the seatbelt 311c. In doing so, the driver 301 can recognize, without looking back, who is not wearing a seatbelt by checking the information display panel 305 installed in front thereof. For example, even if a child, who is the passenger 302, has abruptly released his/her seatbelt in the backseat during driving, the driver 301 does not notice it since no alarm sound is issued to urge the child to wear seatbelt. By adopting the configuration according to this embodiment, however, the driver 301 can recognize who has released the seatbelt without looking back by checking the information display panel 305 installed in front thereof. As a result, the driver 301 can safely urge the passenger 302 to wear the seatbelt.

In addition, since the positions of the passengers 302 and 307 can be detected using a single sensor regardless of their weights, no erroneous detection due to weight occurs, and the detection system 306 can be constructed at low cost because of the single sensor.

In addition, if the seatbelt use detection section 3044b has detected use of a seatbelt, the person position detection section 3041b of the image analysis unit 304b may determine whether a distance between the position of the detected seatbelt and the position of a neck of a person who is wearing the seatbelt is equal to or larger than a predetermined value. In addition, the accumulation unit 304d may accumulate an icon showing a troubled look. If the person position detection section 3041b has determined that the distance between the position of the seatbelt and the position of the neck of the person who is wearing the seatbelt is smaller than the predetermined value, the device control unit 304c of the processing apparatus 304 may obtain the icon showing a troubled look from the accumulation unit 304d and display the icon on the information display panel 305, instead of the icon indicating that the person is awake.

Figure 23A:
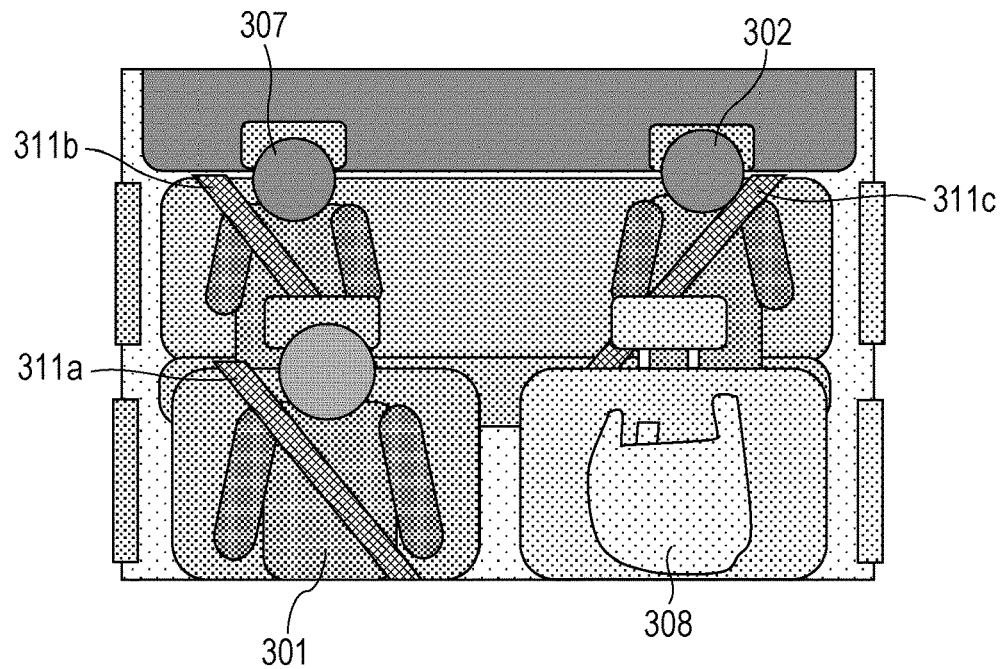
FIG. 23A is a diagram illustrating an example of the thermal image captured by the infrared array sensor in the detection system according to the third embodiment of the present disclosure.
Figure 23B:
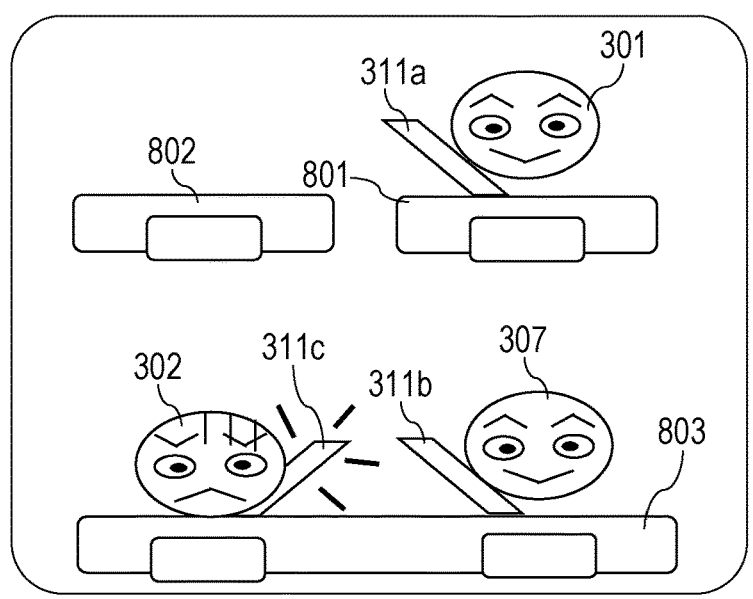
FIG. 23B is a diagram illustrating an example of the display screen of the information display panel.

FIG. 23A is a diagram illustrating an example of a thermal image captured by the infrared array sensor 303 in the detection system 306 according to the third embodiment of the present disclosure. FIG. 23B is a diagram illustrating an example of the display screen of the information display panel 305.

As illustrated in FIG. 23A, the passenger 302 is wearing the seatbelt 311c, but the seatbelt 311c touches the neck of the passenger 302 and the passenger 302 is apparently feeling tight.

The image analysis unit 304b of the processing apparatus 304 detects this state. In this case, as in the information display panel 305 illustrated in FIG. 23B, control is performed (control commands are transmitted) such that an icon indicating the state of the passenger 302 changes to the icon showing a troubled look as alarm information and the icon of the seatbelt 311c flashes. As a result, the driver 301 can always recognize the state of the seatbelt 311c of the passenger 302 safely without looking back by checking the information display panel 305 installed in front thereof. In doing so, for example, if a child moves in the backseat and a seatbelt touches the child's neck, the driver 301 can safely and instantly recognize the situation without looking back. Therefore, for example, the driver 301 can stop the automobile 300 and appropriately change the position of the seatbelt for the child, which is advantageous.

Although an example in which a seatbelt touches a passenger's neck has been described above, this embodiment may obviously be applied to other situations. For example, this embodiment may be applied to any situation that is different from a normal way of using a seatbelt, such as when a passenger's hands are located above a seatbelt.

Figure 24A:
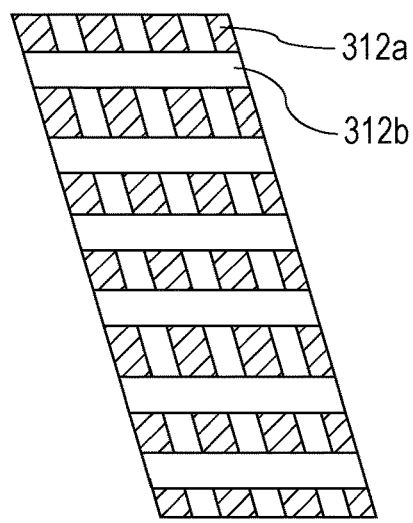
FIG. 24A is a diagram illustrating an example of a seatbelt in the detection system according to the third embodiment of the present disclosure.
Figure 24B:
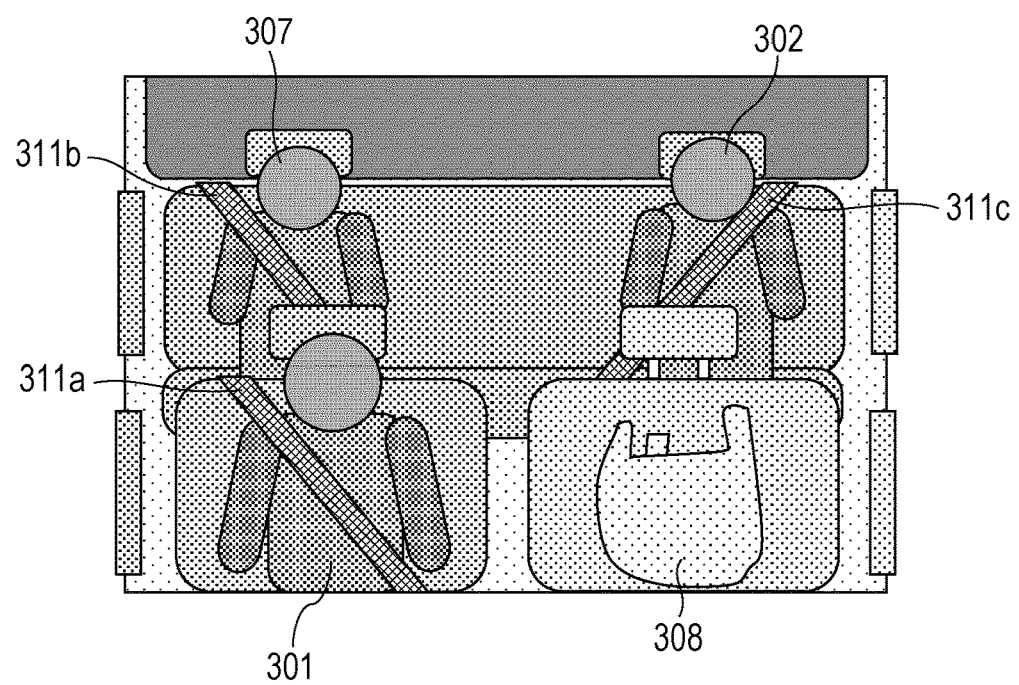
FIG. 24B is a schematic diagram illustrating an example of a thermal image captured by the infrared array sensor when seatbelts are used in the detection system according to the third embodiment of the present disclosure.

FIG. 24A is a schematic diagram illustrating an example of a seatbelt 311 in the detection system 306 according to the third embodiment of the present disclosure. FIG. 24B is a diagram illustrating an example of a thermal image obtained when the driver 301 and the passengers 302 and 307 wear the seatbelts 311.

As illustrated in FIG. 24A, the seatbelt 311 includes two materials 312a and 312b having different values of emissivity. It is generally known that when an infrared sensor that senses far-infrared radiation measures the surface temperatures of two objects whose values of emissivity are different, the infrared sensor detects different temperatures even if the surface temperatures of the two objects are the same. Since the seatbelt 311 illustrated in FIG. 24A includes the two materials 312a and 312b having different values of emissivity, geometric patterns are obtained only in portions corresponding to the seatbelts 311a, 311b, and 311c as illustrated in FIG. 24B when the infrared sensor that senses far-infrared radiation detects far-infrared radiation. Therefore, the positions of the seatbelts 311a, 311b, and 311c can be more accurately detected, which is advantageous. At this time, the materials 312a and 312b need not have different colors in a visual range, insofar as the values of emissivity are different.

Figure 25A:
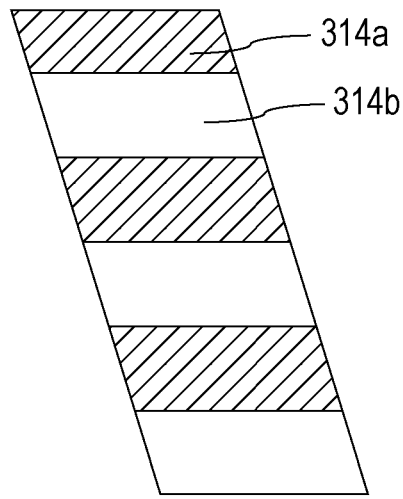
FIG. 25A is a schematic diagram illustrating an example of a seat in the detection system according to the third embodiment of the present disclosure.
Figure 25B:
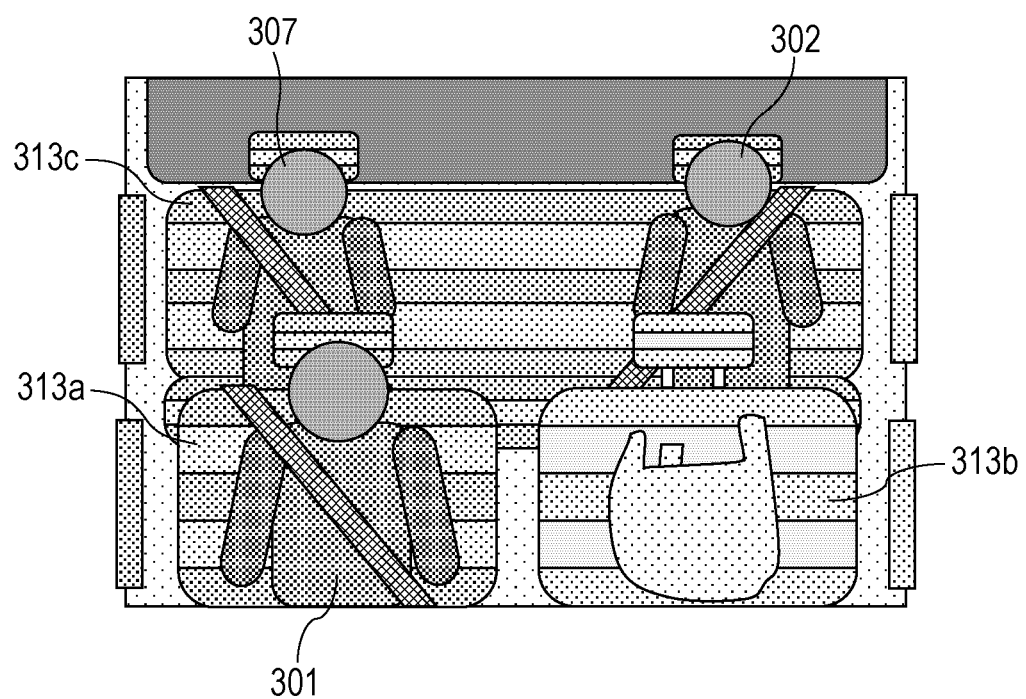
FIG. 25B is a diagram illustrating an example of the thermal image obtained in the detection system according to the third embodiment of the present disclosure.

Although the seatbelt 311 has been described with reference to FIGS. 24A and 24B, the same operation may be performed for a seat 313 as illustrated in FIGS. 25A and 25B.

FIG. 25A is a schematic diagram illustrating an example of the seat 313 in the detection system 306 according to the third embodiment of the present disclosure. FIG. 25B is a diagram illustrating an example of a thermal image obtained in the detection system 306 according to the third embodiment of the present disclosure. FIG. 25A illustrates a part of the seat 313, which includes materials 314a and 314b whose values of emissivity are different. By configuring the seat 311 in this manner, geometric patterns are obtained from seats 313a and 313c behind the driver 301 and the passengers 302 and 307 in the automobile 300. Therefore, the positions of the driver 301 and the passengers 302 and 307 can be more accurately detected.

In addition, a geometric pattern can be obtained from a seat 313b, on which the bag 308 is placed. Therefore, the position of the bag 308 can be more accurately detected.

Figure 26A:
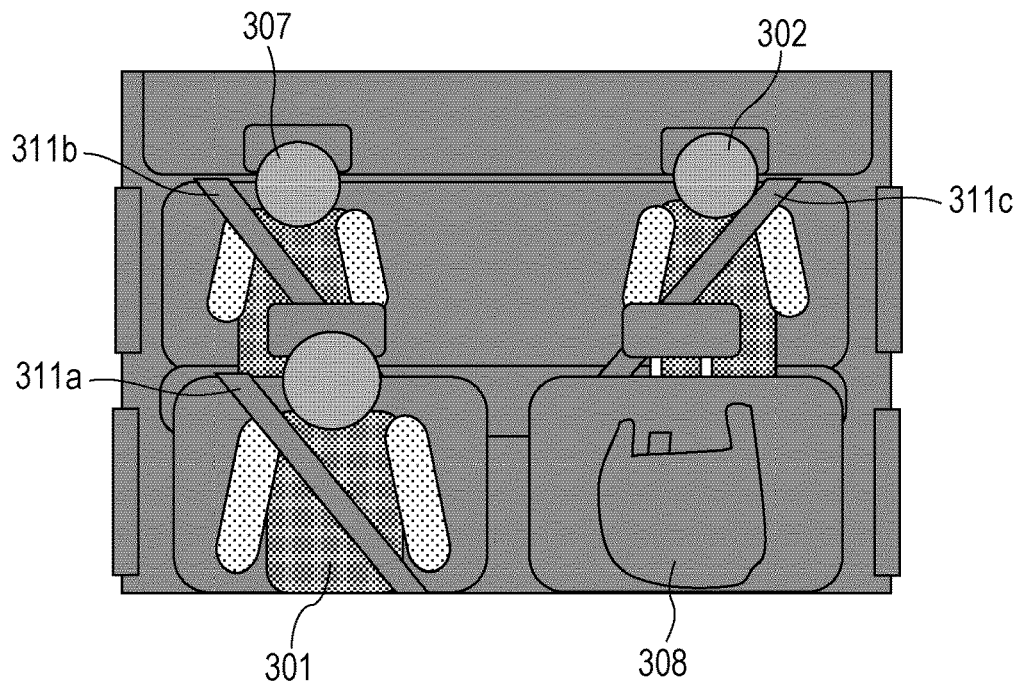
FIG. 26A is a diagram illustrating an example of the thermal image obtained in the detection system according to the third embodiment of the present disclosure.
Figure 26B:
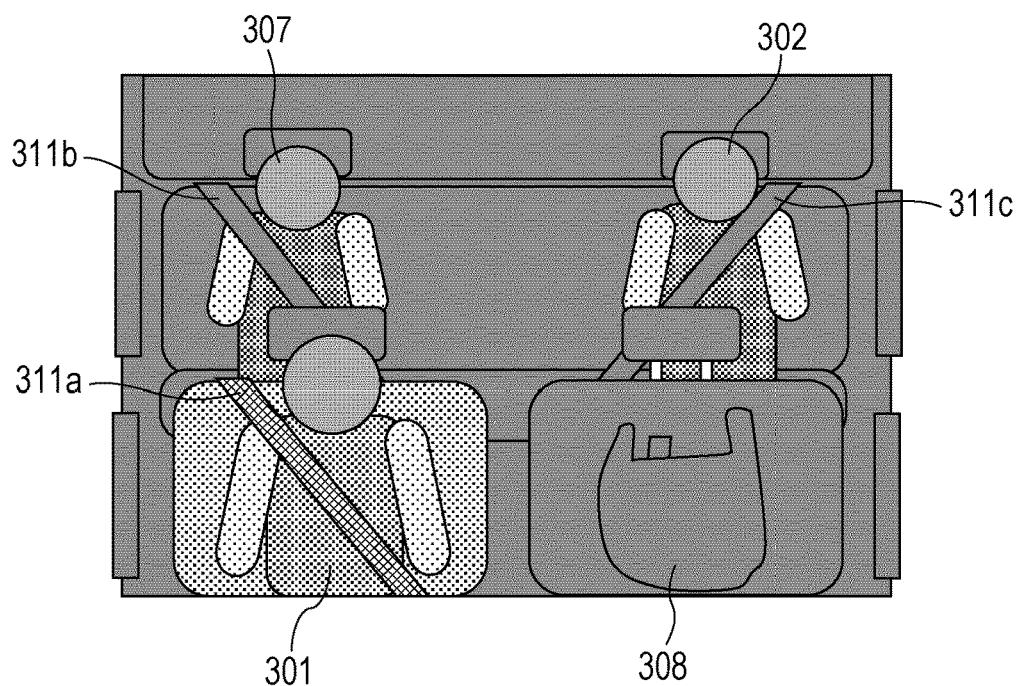
FIG. 26B is a diagram illustrating an example of the thermal image obtained in the detection system according to the third embodiment of the present disclosure.

FIG. 26A is a diagram illustrating an example of the thermal image obtained in the detection system 306 according to the third embodiment of the present disclosure. More specifically, FIG. 26A is a diagram illustrating a thermal image at a time when the inside of the automobile 300 is hot. FIG. 26B is a diagram illustrating another example of the thermal image obtained in the detection system 306 according to the third embodiment of the present disclosure. FIG. 26B is a diagram illustrating an example of a thermal image at a time when temperature has been lowered.

For example, if the temperature inside the automobile 300 has gradually increased and become close to the surface temperature of a person's body (normally about 33° C.), differences between the surface temperatures of bodies of the driver 301 and the passengers 302 and 307 and surrounding temperature become small, thereby making it difficult to detect the positions and sizes of the driver 301 and the passengers 302 and 307. For example, as illustrated in FIG. 26A, differences between the temperatures of persons included in the captured thermal image and the temperatures of objects (seats, windows, seatbelts, and the like) are small. Boundaries between the persons and the objects are blurred, and it is difficult to distinguish the persons and the objects. In this case, for example, as illustrated in FIG. 26B, the device control unit 304c controls an air conditioner, which is not illustrated, directed toward the driver 301 to lower the surrounding temperature of the driver 301. As a result, the surface temperatures of the seat 313a, the seatbelt 311a, and the driver 301 decrease, but it is known that the amount of change in the surface temperature of the driver 301 is smaller than the amount of change in the surface temperatures of the seat 313a and the seatbelt 311a. This is because the surface temperature of a person's body does not decrease much due to the body temperature of the person. Therefore, a difference is generated between the driver 301 and the surroundings, that is, the seat 313a and the seatbelt 311a, thereby making it easier to detect the driver 301, which is advantageous.

Although the driver 301 has been described with reference to FIGS. 26A and 26B, this embodiment may obviously be applied to other persons. The same advantageous effect can be produced by applying this embodiment to the front passenger seat or the backseat.

In this embodiment, whether the seatbelt 311 is used is determined by performing, using the image analysis unit 304b of the processing apparatus 304, image processing on a thermal image captured by the infrared array sensor 303. However, whether the seatbelt 311 is used may be determined using a sensor (not illustrated) mounted on a buckle of the seatbelt 311. Means for determining whether the seatbelt 311 is used is not particularly limited herein.

In addition, with respect to the display screen of the information display panel 305, when an abnormality has been detected or a state has changed, such as when a seatbelt is not used as illustrated in FIG. 21B or when a seatbelt touches a passenger's neck as illustrated in FIG. 23B, a sound or the like may be emitted to inform the driver 301 of the abnormality or the change in the state. At the same time, a sound or the like may be emitted to inform the driver 301 of the type of abnormality or the type of change in the state. In doing so, it becomes possible to enable the driver 301 to more easily recognize the states of the passengers 302 and 307 without affecting the operation performed by the driver 301 to drive the automobile 300.

Fourth Embodiment

A detection system 406 according to a fourth embodiment will be described with reference to FIGS. 27 to 32. In this embodiment, an example in which the detection system 406 is adopted in an automobile 400 will be described.

Figure 27:
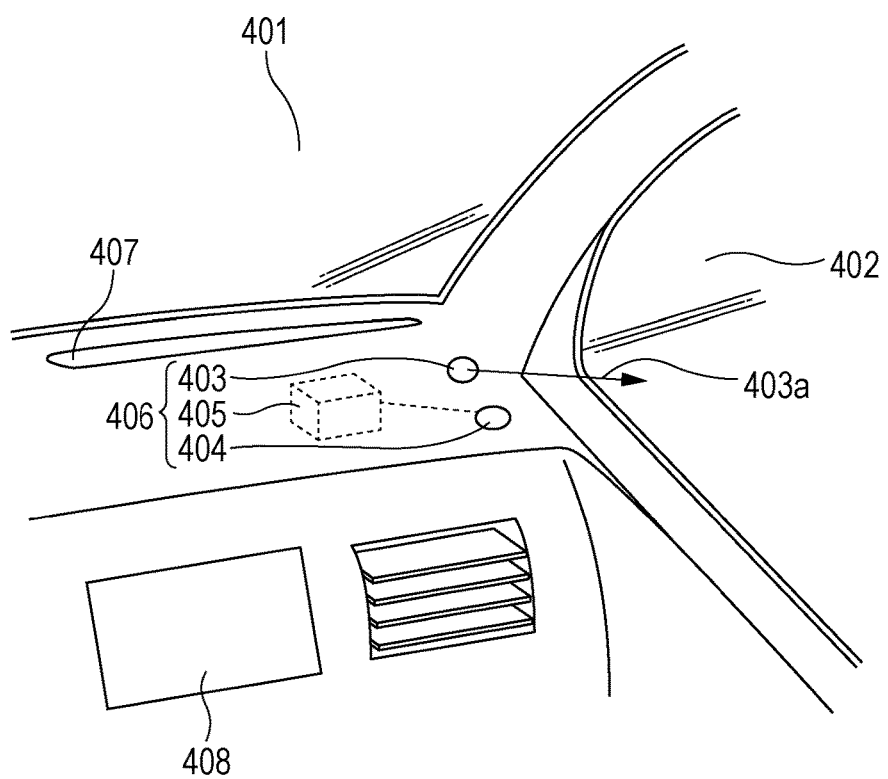
FIG. 27 is a schematic diagram illustrating an example of an automobile in which a detection system according to a fourth embodiment of the present disclosure is installed.

FIG. 27 is a schematic diagram illustrating an example of the automobile 400 in which the detection system 406 according to the fourth embodiment of the present disclosure is installed. More specifically, FIG. 27 is a schematic diagram illustrating a portion of the automobile 400 around a driver's seat. As illustrated in FIG. 27, the automobile 400 includes a windshield 401, a side window 402, an infrared light source 403 that emits an infrared beam 403a, an infrared detector 404 that detects infrared radiation, a processing apparatus 405 that processes a signal obtained by the infrared detector 404, and an air outlet 407 that discharges air.

Figure 28:
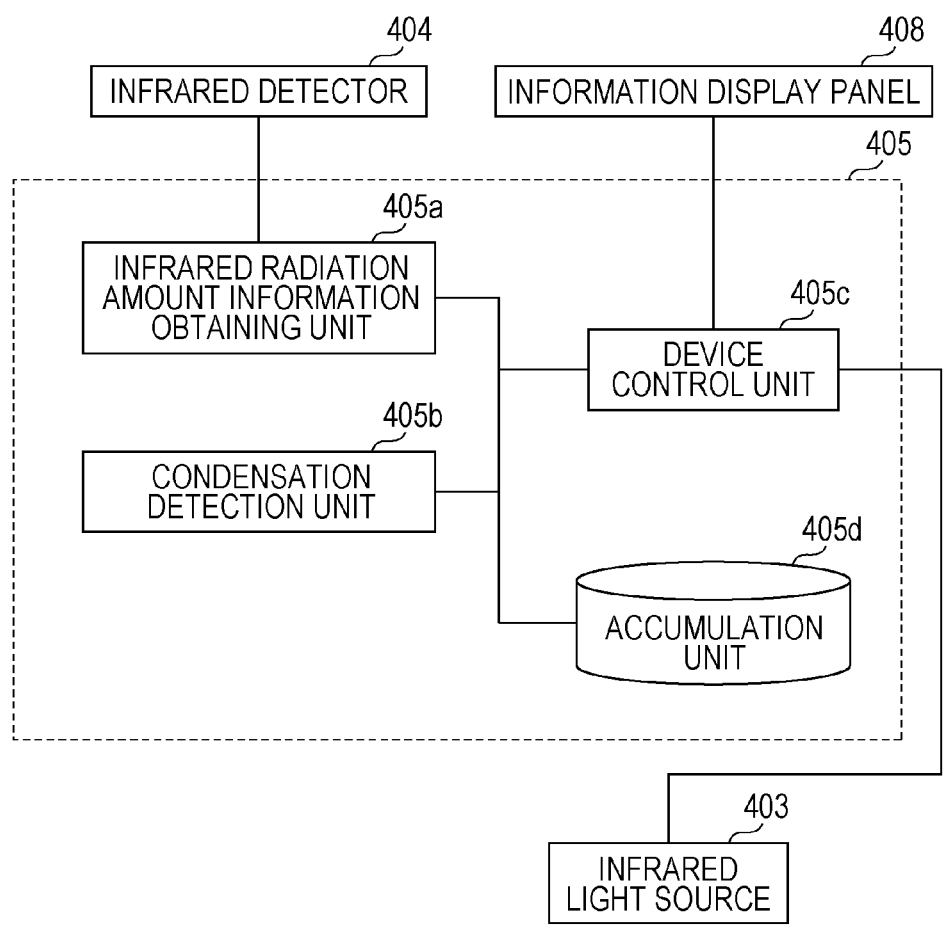
FIG. 28 is a diagram illustrating an example of the configuration of the detection system according to the fourth embodiment of the present disclosure.

In addition, an information display panel 408 is installed in order to display information for a driver 301. FIG. 28 is a diagram illustrating an example of the configuration of the detection system 406 according to the fourth embodiment of the present disclosure. The detection system 406 according to this embodiment includes, for example, the infrared light source 403, the infrared detector 404, the processing apparatus 405, and the information display panel 408. The processing apparatus 405 includes an infrared radiation amount information obtaining unit 405a, a condensation detection unit 405b, a device control unit 405c, and an accumulation unit 405d.

The processing apparatus 405 is configured, for example, using a computer. The computer includes a CPU, memory, and hardware, which is not illustrated. The accumulation unit 405d corresponds to, for example, the memory. The memory is a storage device such as a ROM or a RAM. The memory accumulates, for example, programs that function as the infrared radiation amount information obtaining unit 405a, the condensation detection unit 405b, and the device control unit 405c, and by reading the programs from the memory and executing the programs using the CPU, the functions of the infrared radiation amount information obtaining unit 405a, the condensation detection unit 405b and the device control unit 405c are realized. Alternatively, the functions of the infrared radiation amount information obtaining unit 405a, the condensation detection unit 405b, and the device control unit 405c in the processing apparatus 405 may be realized by integrated circuits.

The configuration of the processing apparatus 405 is not limited to this. Since FIG. 28 schematically illustrates the functional configuration of the processing apparatus 405, the processing apparatus 405 need not necessarily have this functional configuration but may have another functional configuration. That is, a device other than the processing apparatus 405 may have part of the functional configuration of the processing apparatus 405 illustrated in FIG. 28.

Figure 29A:
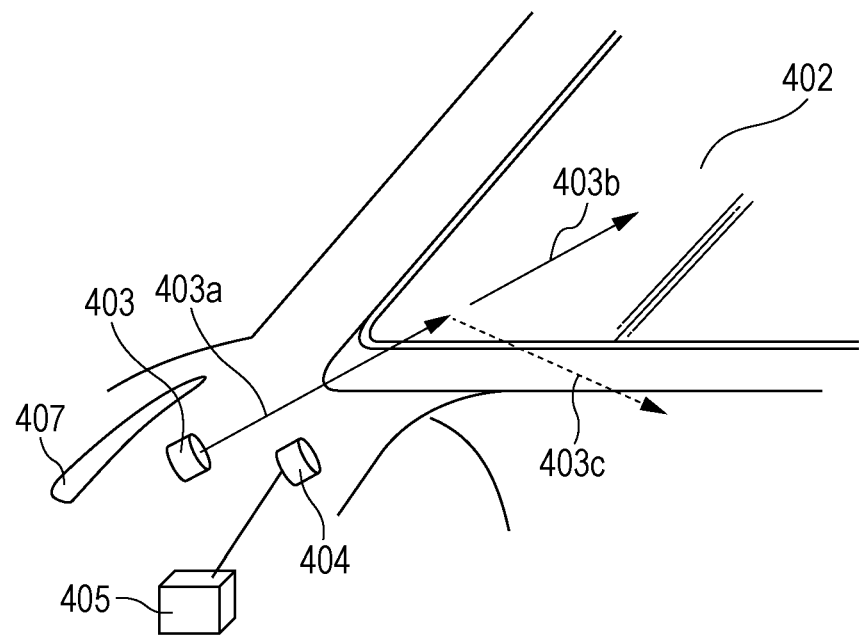
FIG. 29A is a diagram illustrating an example of a state at a time when the detection system operates without condensation forming on a side window.
Figure 29B:
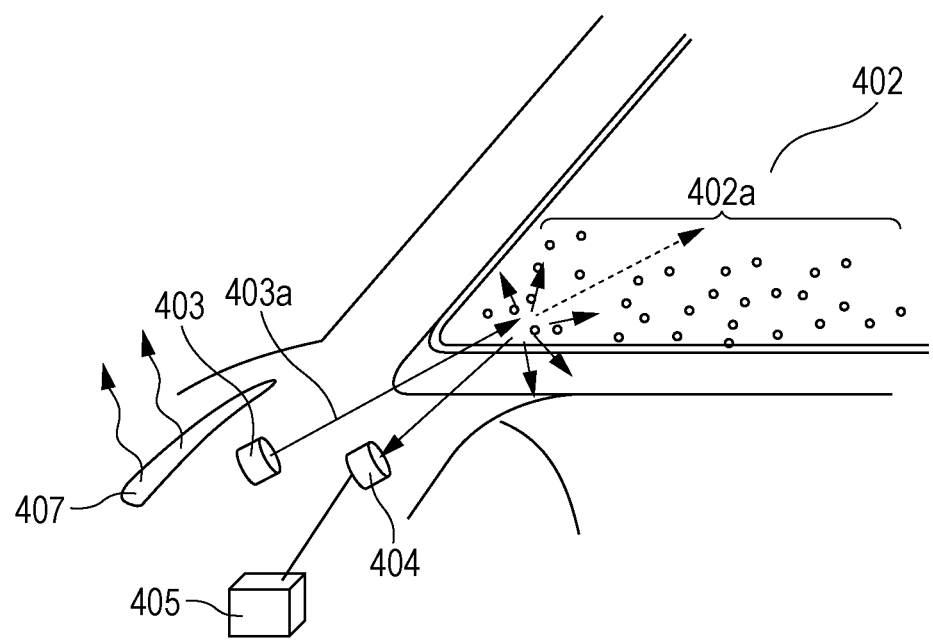
FIG. 29B is a diagram illustrating an example of a state at a time when the detection system operates with condensation forming on the side window.

An operation performed by the detection system 406 according to this embodiment will be described. FIG. 29A is a diagram illustrating an example of a state at a time when the detection system 406 operates without condensation forming on the side window 402. FIG. 29B is a diagram illustrating an example of a state at a time when the detection system 406 operates with condensation forming on the side window 402. The infrared beam 403a output from the infrared light source 403 is near-infrared light having a wavelength of 0.7 to 2.5 micrometers and emitted toward the side window 402.

The infrared detector 404 is sensitive to the wavelengths of the infrared beam 403a.

As illustrated in FIG. 29A, most of the emitted infrared beam 403a passes through the side window 402 and goes out of the automobile 400 as an infrared beam 403b. The rest of the infrared beam 403a that does not go out of the automobile 400 is reflected from a surface of the side window 402 as an infrared beam 403c and goes through the inside of the automobile 400. Therefore, normally the infrared detector 404 detects nothing.

When condensation 402a has formed on the side window 402 as illustrated in FIG. 29B, however, the infrared beam 403a is scattered by surfaces of dews. Therefore, part of the infrared beam 403a incident on the side window 402 enters the infrared detector 404. The infrared radiation amount information obtaining unit 405a periodically obtains (monitors) the amount of infrared radiation incident on the infrared detector 404 and outputs the obtained amount of infrared radiation to the condensation detection unit 405b. If the received amount of infrared radiation exceeds a certain threshold, the condensation detection unit 405b determines that condensation has formed on the side window 402. On the other hand, if the received amount of infrared radiation does not exceed the certain threshold, the condensation detection unit 405b determines that condensation has not formed on the side window 402.

If the condensation detection unit 405b has determined that condensation has not formed on the side window 402, the device control unit 405c of the processing apparatus 405 transmits a control command for controlling the flow of air toward a control apparatus, which is not illustrated. Upon receiving the control command, for example, the control apparatus takes in dry air from the outside of the automobile 400 and discharges the dry air from the air outlet 407 to dry the windshield 401. As a result, it becomes possible to prevent condensation from forming on the windshield 401.

Figure 30:
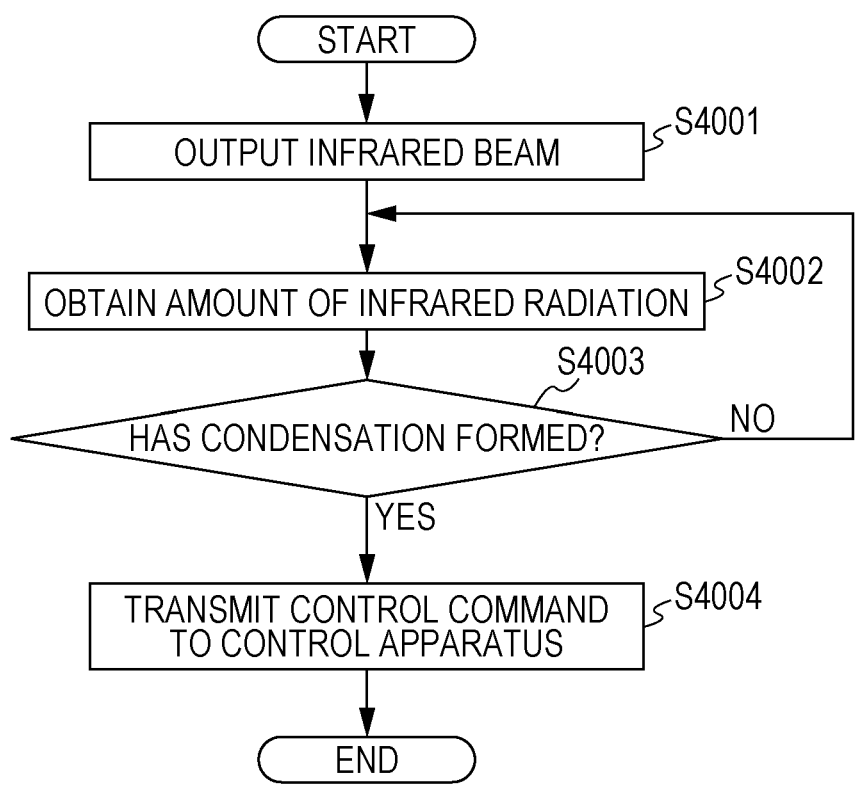
FIG. 30 is a flowchart illustrating an example of a process performed by the detection system according to the fourth embodiment of the present disclosure.

FIG. 30 is a flowchart illustrating an example of a process performed by the detection system 406 according to the fourth embodiment of the present disclosure. First, in step S4001, the infrared light source 403 begins to operate and outputs the infrared beam 403a toward the side window 402. The infrared detector 404 detects the amount of infrared radiation incident thereon.

Next, in step S4002, the infrared radiation amount information obtaining unit 405a of the processing apparatus 405 periodically obtains the amount of infrared radiation detected by the infrared detector 404. The infrared radiation amount information obtaining unit 405a then outputs the obtained amount of infrared radiation to the condensation detection unit 405b.

Next, in step S4003, the condensation detection unit 405b of the processing apparatus 405 determines whether condensation has formed on the side window 402. For example, the condensation detection unit 405b determines whether the obtained amount of infrared radiation is larger than a threshold. If the condensation detection unit 405b has determined that the obtained amount of infrared radiation is larger than the threshold, the condensation detection unit 405b determines that condensation has formed on the side window 402, and the process proceeds to step S4004. On the other hand, if the condensation detection unit 405b has determined that the obtained amount of infrared radiation is not larger than the threshold, the condensation detection unit 405b determines that condensation has not formed on the side window 402, and the process returns to step S4002.

Next, in step S4004, a control command for suppressing the condensation on the side window 402 is transmitted to the control apparatus, which is not illustrated.

The detection system 406 according to this embodiment monitors condensation on not the windshield 401 but the side window 402, in order to prevent condensation from forming on the windshield 401. In general, different types of glass are used for a windshield and side windows of an automobile. For the windshield, a sheet of glass obtained by sandwiching an intermediate film between two sheets of glass is usually used, so that the windshield does not shatter in case the windshield is broken and a flying object does not penetrate the windshield. On the other hand, for the side windows, sheets of toughened glass that break into harmless dice-shaped pieces are used. Therefore, thermal conductivity from one surface of the sheet of glass to another is higher in the side windows than in the windshield, which means that the side windows are more sensitive to outside temperature. Accordingly, condensation begins earlier on the side windows than on the windshield. This is why it is desirable to constantly monitor condensation on the side window 402. When condensation has been detected on the side window 402, the control command for suppressing condensation on the windshield 401 may be transmitted to the control apparatus, which is not illustrated. As a result, it becomes possible to prevent condensation on the windshield 401 from blocking the driver's view. Since the driver's view can be ensured, the driver can operate the automobile 400 more safely.

Although an infrared beam scattered by condensation is detected as means for detecting the condensation on the side window 402 here, the means for detecting condensation is not limited insofar as the condensation on the side window 402 can be detected. For example, one of the infrared array sensors described in the first to third embodiments may detect the temperature distribution on the surface of the side window 402, and a humidity sensor (not illustrated) may be provided inside the automobile 400 in order to calculate the humidity of the surface of the side window 402 on the basis of a value of humidity measured by the humidity sensor. Another method may be used, instead. Furthermore, although the air outlet 407 discharges dry air in order to reduce the humidity of the surface of the windshield 401 here, the method used is not particularly limited insofar as humidity around the surface of the windshield 401 can be reduced. For example, the air outlet 407 may discharge hot air, or another method may be used, instead.

Alternatively, when the processing apparatus 405 has detected condensation on the side window 402, the processing apparatus 405 may control (transmit a control command to) the information display panel 408 to inform the driver that air conditioning for suppressing condensation begins.

Figure 31A:
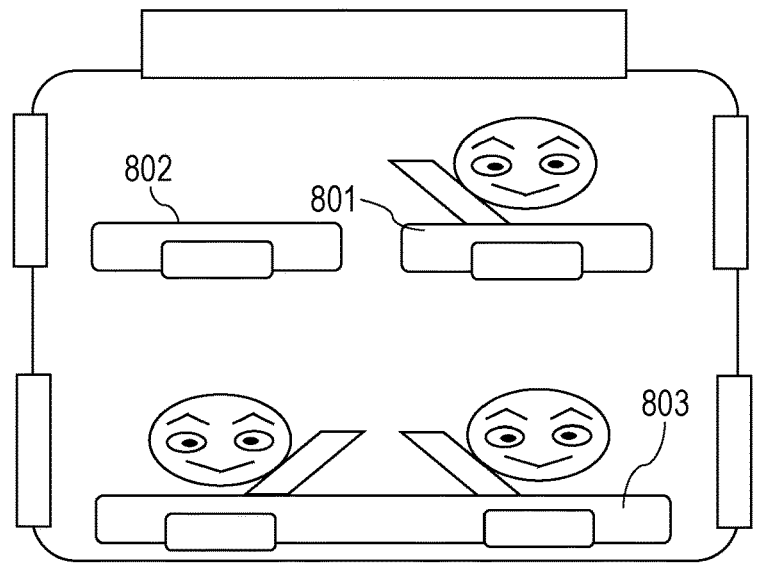
FIG. 31A is a diagram illustrating an example of a display screen of an information display panel in the detection system according to the fourth embodiment of the present disclosure.

FIG. 31A is a diagram illustrating an example of a display screen of the information display panel 408 in the detection system 406 according to the fourth embodiment of the present disclosure. More specifically, FIG. 31A is a diagram illustrating an example of the display screen of the information display panel 408 at a time when condensation is not detected on the side window 402.

Figure 31B:
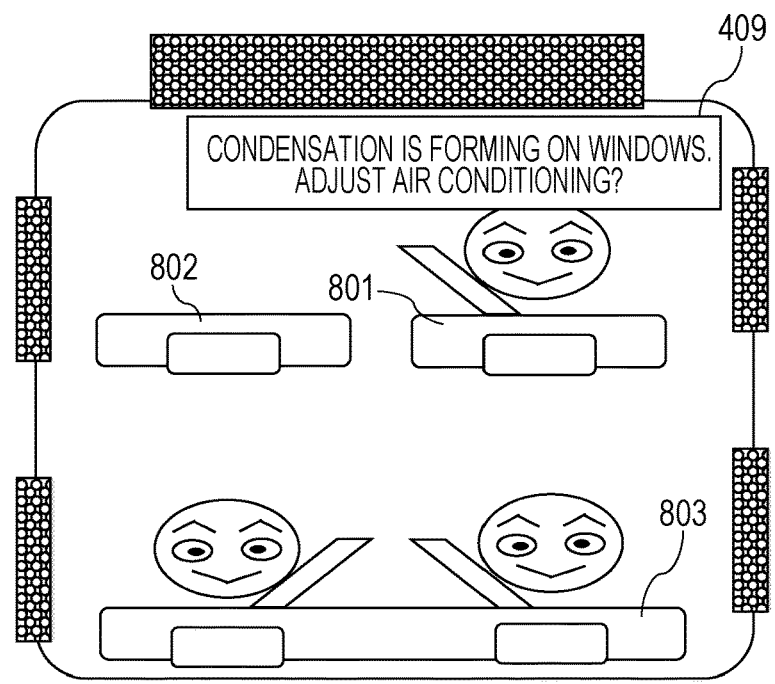
FIG. 31B is a diagram illustrating another example of the display screen of the information display panel in the detection system according to the fourth embodiment of the present disclosure.

FIG. 31B is a diagram illustrating another example of the display screen of the information display panel 408 in the detection system 406 according to the fourth embodiment of the present disclosure. More specifically, FIG. 31B is a diagram illustrating an example of the display screen of the information display panel 408 at a time when condensation is detected on the side window 402.

For example, when condensation is not detected on the side window 402, only the positions of the driver and passengers and whether the driver and the passengers are wearing seatbelts, as in the third embodiment, are indicated as illustrated in FIG. 31A. On the other hand, as illustrated in FIG. 31B, when condensation has been detected on the side window 402, the device control unit 405c displays, on the information display panel 408, graphics data indicating that condensation has formed on the windshield and the side windows. The graphics data indicating that condensation has formed on the side windows is accumulated in, for example, the accumulation unit 405d. By configuring the detection system 406 in this manner, for example, the graphics data indicating that condensation has formed on the windshield and the side windows is displayed on the information display panel 408 as illustrated in FIG. 31B.

Alternatively, for example, control may be performed (a control command may be transmitted) in such a way as to display an input area 409 for adjusting air conditioning to suppress condensation on the windshield and the side windows. By touching the input area 409, the driver can drive the air outlet 407 through the control apparatus, which is not illustrated, and discharge dry air from the air outlet 407. Since the air outlet 407 does not abruptly begin to discharge air, the driver is not surprised by the operation of the air outlet 407. It is possible to safely prevent condensation from forming on the windshield 401.

Figure 32:
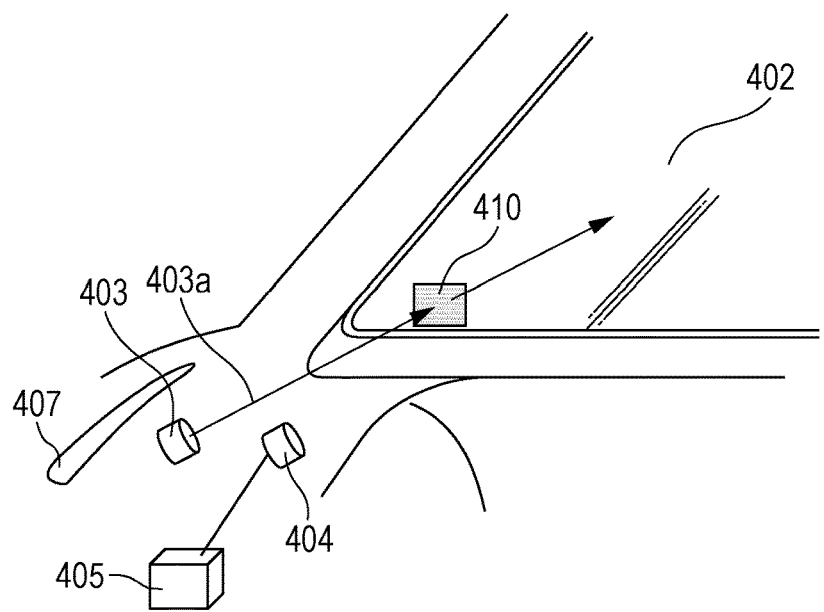
FIG. 32 is a diagram illustrating another example of the configuration of the detection system according to the fourth embodiment of the present disclosure.

FIG. 32 is a diagram illustrating another example of the configuration of the detection system 406 according to the fourth embodiment of the present disclosure.

As illustrated in FIG. 32, an anti-reflective (AR) coating 410 that transmits the infrared beam 403a may be applied to a portion of the side window 402 on which the infrared beam 403a is incident. In doing so, the amount of infrared radiation reflected to the inside of the automobile 400 can be reduced, thereby reducing the possibility that the infrared detector 404 undesirably detects stray light, which is the infrared radiation reflected to the inside of the automobile 400. Therefore, a detection system that offers higher detection accuracy can be configured.

Although the AR coating 410 is provided only in the portion through which the infrared beam 403a passes in FIG. 32, the AR coating 410 may be applied to the entirety of the side window 402. In doing so, the amount of infrared radiation incident on the infrared detector 404 after being reflected on the surface of the side window 402 other than the portion of the side window 402 in which the infrared beam 403a is incident can be reduced. Therefore, condensation can be detected more accurately.

Fifth Embodiment

A detection system 509 according to a fifth embodiment will be described with reference to FIGS. 33A to 38B. In this embodiment, an example in which the detection system 509 is adopted in an automobile 500 and a tunnel 501 will be described.

Figure 33A:
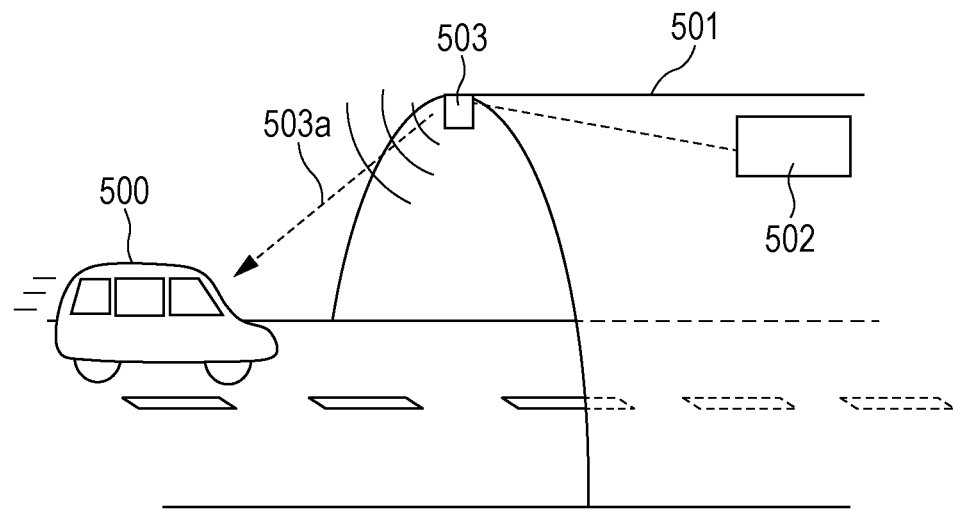
FIG. 33A is a diagram illustrating an example of the configuration of a detection system according to a fifth embodiment of the present disclosure.
Figure 33B:
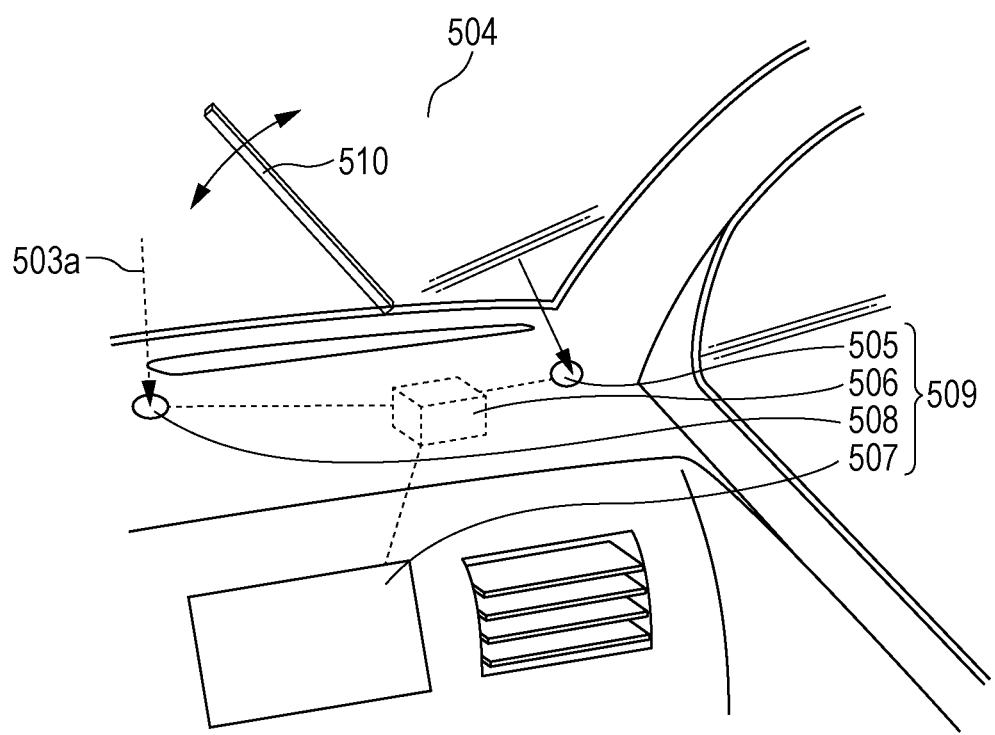
FIG. 33B is a schematic diagram illustrating an example of a portion of an automobile around a driver's seat in the detection system according to the fifth embodiment of the present disclosure.

FIG. 33A is a diagram illustrating an example of the configuration of the detection system 509 according to the fifth embodiment of the present disclosure. FIG. 33B is a schematic diagram illustrating an example of a portion of the automobile 500 around a driver's seat in the detection system 509 according to the fifth embodiment of the present disclosure.

As illustrated in FIG. 33A, a measurement unit 502 is provided inside the tunnel 501. The measurement unit 502 measures temperature and humidity inside the tunnel 501 in real-time. In addition, a transmitter 503 is provided around an entrance of the tunnel 501 into which the automobile 500 goes. The transmitter 503 is connected to the measurement unit 502. The transmitter 503 transmits information regarding the inside of the tunnel 501 toward the outside of the tunnel 501 using an electromagnetic wave 503a. FIG. 33A schematically illustrates the automobile 500 that is about to pass through the entrance of the tunnel 501 at which the electromagnetic wave 503a is radiated.

FIG. 33B schematically illustrates a portion of the automobile 500 around a windshield 504. The automobile 500 includes a receiver 508 that receives the electromagnetic wave 503a, a radiation thermometer 505 capable of detecting the temperature of a surface of the windshield 504 in a non-contact manner, a processing apparatus 506, an information display panel 507 that displays a result of processing performed by the processing apparatus 506, and wipers 510 that wipe dews off an outer surface of the windshield 504.

The processing apparatus 506 processes, for example, a value obtained by the radiation thermometer 505 and data received by the receiver 508.

Figure 34:
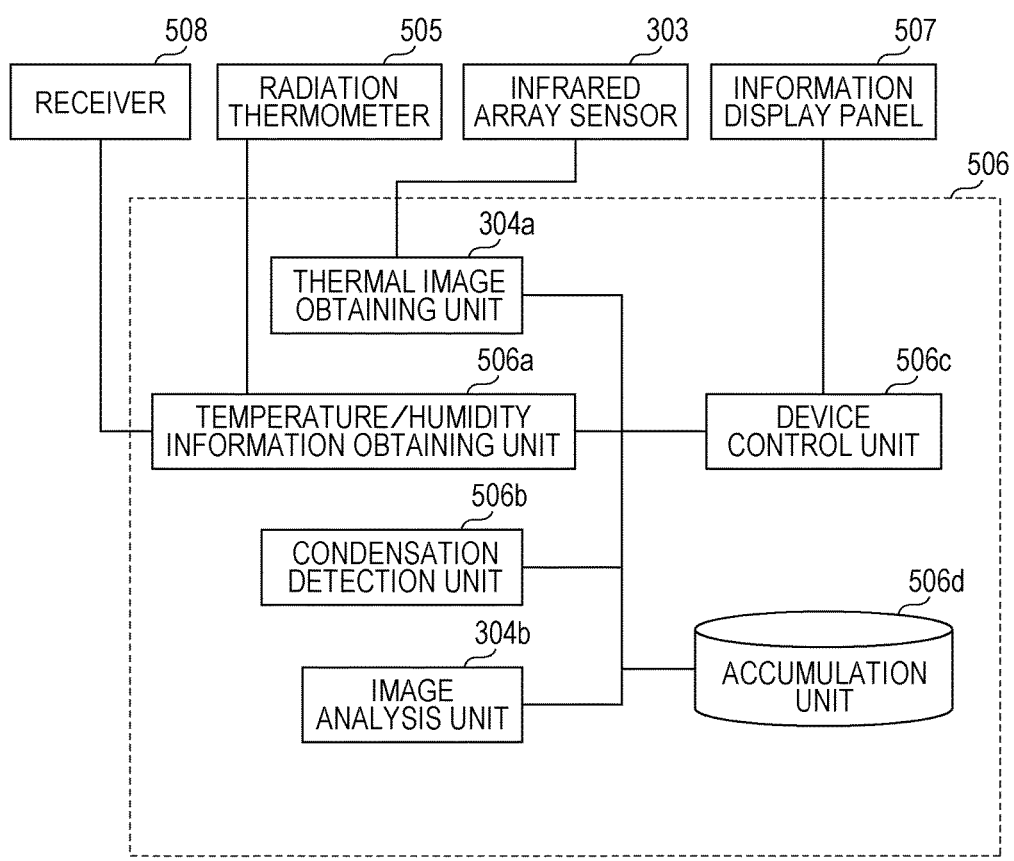
FIG. 34 is a diagram illustrating an example of the configuration of the detection system according to the fifth embodiment of the present disclosure.

FIG. 34 is a diagram illustrating an example of the configuration of the detection system 509 according to the fifth embodiment of the present disclosure. The detection system 509 includes, for example, the radiation thermometer 505, the receiver 508, the processing apparatus 506, and the information display panel 507. The processing apparatus 506 includes, for example, a temperature/humidity information obtaining unit 506a, a condensation detection unit 506b, a device control unit 506c, and an accumulation unit 506d. The processing apparatus 506 also includes, for example, the thermal image obtaining unit 304a and the image analysis unit 304b described in the third embodiment.

The processing apparatus 506 is configured, for example, using a computer. The computer includes a CPU, a memory, and hardware, which is not illustrated. The accumulation unit 506d corresponds to, for example, the memory. The memory is a storage device such as a hard disk, a ROM, or a RAM. The memory accumulates, for example, programs that function as the thermal image obtaining unit 304a, the image analysis unit 304b, the temperature/humidity information obtaining unit 506a, the condensation detection unit 506b, and the device control unit 506c. When the processing apparatus 506 has read the programs from the memory and executed the programs using the CPU, the functions of the thermal image obtaining unit 304a, the image analysis unit 304b, the temperature/humidity information obtaining unit 506a, the condensation detection unit 506b, and the device control unit 506c are realized. Alternatively, the functions of the thermal image obtaining unit 304a, the image analysis unit 304b, the temperature/humidity information obtaining unit 506a, the condensation detection unit 506b, and the device control unit 506c in the processing apparatus 506 may be realized by integrated circuits.

Since FIG. 34 schematically illustrates the functional configuration of the processing apparatus 506, the processing apparatus 506 need not necessarily have this functional configuration but may have another functional configuration. That is, a device other than the processing apparatus 506 may have part of the functional configuration illustrated in FIG. 34.

An operation performed by the detection system 509 according to this embodiment will be described. As described above, the temperature and the humidity inside the tunnel 501 are measured by the measurement unit 502 in real-time and transmitted to the transmitter 503. The transmitter 503 then transmits data regarding the temperature and the humidity received from the measurement unit 502 forward from the tunnel 501 (to the side from which the automobile 500 enters the tunnel 501) using the electromagnetic wave 503a. When the automobile 500 passes through a region in which the electromagnetic wave 503a is radiated, the receiver 508 arranged inside the automobile 500 receives the electromagnetic wave 503a. The receiver 508 then outputs the data regarding the temperature and the humidity included in the received electromagnetic wave 503a to the temperature/humidity information obtaining unit 506a. Thus, the data regarding the temperature and the humidity inside the tunnel 501 is input to the temperature/humidity information obtaining unit 506a of the processing apparatus 506.

In addition, the radiation thermometer 505 measures the surface temperature of the windshield 504 in real-time and outputs data regarding the measured surface temperature to the temperature/humidity information obtaining unit 506a. As a result, the measured temperature of the windshield 504 is input to the temperature/humidity information obtaining unit 506a of the processing apparatus 506.

Thus, the data regarding the temperature and the humidity inside the tunnel 501 and the data regarding the surface temperature of the windshield 504 are input to the temperature/humidity information obtaining unit 506a of the processing apparatus 506. The temperature/humidity information obtaining unit 506a outputs the obtained data regarding the temperature and the humidity inside the tunnel 501 and data regarding the surface temperature of the windshield 504 to the condensation detection unit 506b. The condensation detection unit 506b of the processing apparatus 506 determines whether condensation will form on the outer surface of the windshield 504 on the basis of the obtained temperature and humidity inside the tunnel 501 and surface temperature of the windshield 504. As a result, before the automobile 500 enters the tunnel 501, the condensation detection unit 506b can determine whether condensation will form on the outer surface of the windshield 504 of the automobile 500 after the automobile 500 enters the tunnel 501.

An example in which the condensation detection unit 506b determines whether condensation will form will be described hereinafter. In order to determine whether condensation will form, the temperature of a target object and the amount of water vapor around the target object are necessary. In the detection system 509 according to this embodiment, the radiation thermometer 505 measures the surface temperature of the target object (here, the windshield 504), and the condensation detection unit 506b calculates the amount of water vapor inside the tunnel 501 on the basis of the temperature and the humidity inside the tunnel 501 received from the transmitter 503. The accumulation unit 506d accumulates a relationship between the temperature and the amount of saturated vapor in advance. Here, the relationship between the temperature and the amount of saturated vapor is obtained by, for example, associating temperatures set in advance with corresponding values of the amount of saturated vapor. Alternatively, the relationship between the temperature and the amount of saturated vapor may be, for example, obtained by associating continuous changes in the temperature with continuous changes in the amount of saturated vapor. The condensation detection unit 506b obtains, from the accumulation unit 506d, the amount of saturated vapor corresponding to the temperature of the windshield 504 measured by the radiation thermometer 505. By determining whether the amount of water vapor inside the tunnel 501 obtained as a result of the calculation exceeds the amount of saturated vapor corresponding to the temperature measured by the radiation thermometer 505, the condensation detection unit 506b can determine, before the automobile 500 enters the tunnel 501, whether condensation will form on the outer surface of the windshield 504.

The device control unit 506c then performs control to suppress condensation on the windshield 504 on the basis of a result of the determination made by the condensation detection unit 506b. For example, assume that the processing apparatus 506 is connected to, for example, the wipers 510 provided for the automobile 500. For example, if the condensation detection unit 506b has determined that condensation will form on the outer surface of the windshield 504, the device control unit 506c outputs a control command for operating the wipers 510 to a control apparatus (not illustrated) that controls the operation of the wipers 510.

Thus, if it is known before the automobile 500 enters the tunnel 501 that condensation will form on the outer surface of the windshield 504 after the automobile 500 enters the tunnel 501, the wipers 510 can be automatically driven by transmitting a control command from the device control unit 506c of the processing apparatus 506. As a result, it becomes possible to prevent condensation on the windshield 504 from blocking the driver's view after the automobile 500 enters the tunnel 501. Since the driver's view after the automobile 500 enters the tunnel 501 can be ensured, the driver, who is not illustrated, can operate the automobile 500 safely in the tunnel 501.

In general, condensation forms on an outer surface of an automobile when, in the case of a tunnel, temperature inside the tunnel is higher than outside temperature and humidity inside the tunnel is high. That is, for example, condensation is likely to form on a rainy day or in a morning after a rainy day. In addition, because generally the amount of water vapor inside an automobile does not sharply change, condensation that has formed inside the automobile can be easily removed and a sufficient view can be ensured by simply adjusting air conditioning inside the automobile or directly wiping an inner surface of a windshield as necessary. As described above, however, condensation on an outer surface of the windshield often forms because of a sharp change in surrounding temperature and humidity that can occur when, for example, the automobile enters a tunnel. In this case, the driver's view is suddenly blocked. A driver with little experience might not understand what has happened, and it might become difficult for the driver to keep driving safely. If the driver does not immediately understand that condensation has formed on the outer surface of the windshield, the driver might not operate wipers. Therefore, by automatically operating the wipers 510 assuming that condensation will form on the outer surface of the windshield 504 of the automobile 500 as described above, condensation that has suddenly formed can be immediately removed and the driver's view can be ensured, thereby making it possible to drive safely.

Figure 35:
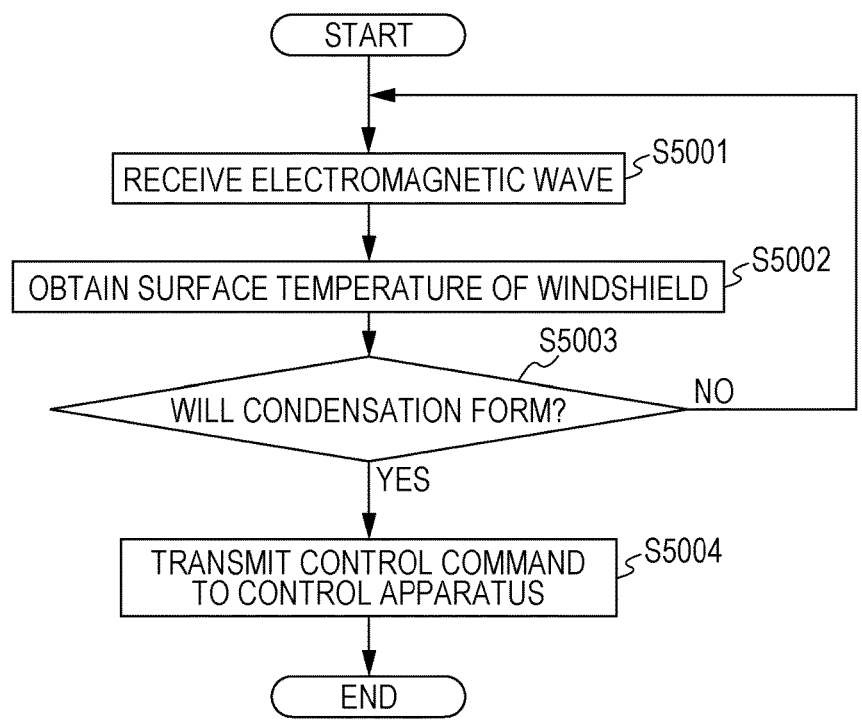
FIG. 35 is a flowchart illustrating an example of a process performed by the detection system according to the fifth embodiment of the present disclosure.

FIG. 35 is a flowchart illustrating an example of a process performed by the detection system 509 according to this embodiment. First, in step S5001, the temperature/humidity information obtaining unit 506a outputs data regarding the temperature and humidity inside the tunnel 501 received from the receiver 508 to the condensation detection unit 506b.

In step S5002, the temperature/humidity information obtaining unit 506a outputs data regarding the surface temperature of the windshield 504 measured by the radiation thermometer 505 to the condensation detection unit 506b.

In step S5003, the condensation detection unit 506b determines whether condensation will form on the outer surface of the windshield 504 of the automobile 500. This determination is made in the above-described manner.

If the condensation detection unit 506b has determined in step S5003 that condensation will form on the outer surface of the windshield 504 of the automobile 500, the process proceeds to step S5004. If the condensation detection unit 506b has determined in step S5003 that condensation will not form on the outer surface of the windshield 504 of the automobile 500, the process returns to step S5001.

Alternatively, if the condensation detection unit 506b has determined in step S5003 that condensation will not form on the outer surface of the windshield 504 of the automobile 500, the process illustrated in FIG. 35 may end.

Next, in step S5004, a control command is transmitted to a control apparatus that suppresses condensation on the outer surface of the windshield 504 (in this case, the control apparatus that controls the operation of the wipers 510). The control command may be, for example, a control command for driving the wipers 510.

The flowchart of FIG. 35 is an example, and the process is not limited to this.

For example, a step of outputting information based on a result of the determination made by the device control unit 506c to the information display panel 507 if the condensation detection unit 506b has determined that condensation will form on the outer surface of the windshield 504 of the automobile 500 may be added.

In addition, the accumulation unit 506d may accumulate information regarding a message for notifying the driver that the wipers 510 begin to operate.

Figure 36A:
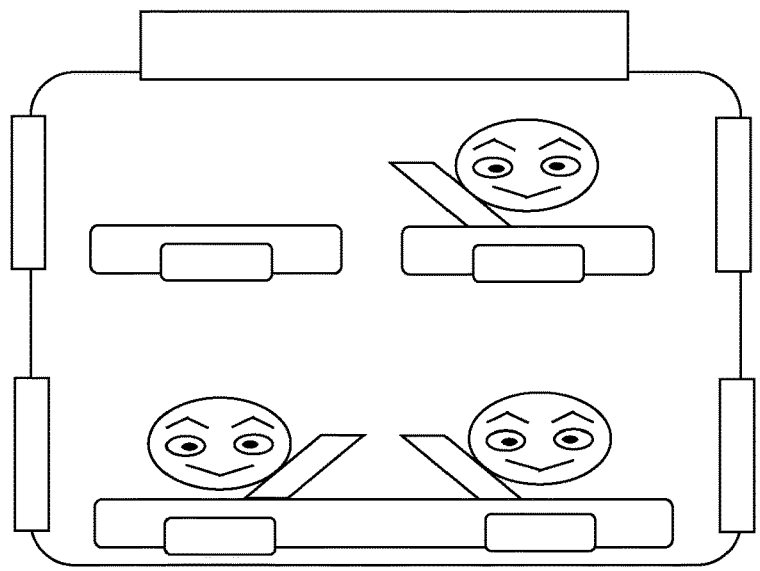
FIG. 36A is a diagram illustrating an example of a display screen of an information display panel in the detection system according to the fifth embodiment of the present disclosure.

FIG. 36A is a diagram illustrating a display screen of the information display panel 507 in the detection system 509 according to the fifth embodiment of the present disclosure. More specifically, FIG. 36A is a diagram illustrating an example of the display screen of the information display panel 507 at a time when condensation has not been detected in the detection system 509.

Figure 36B:
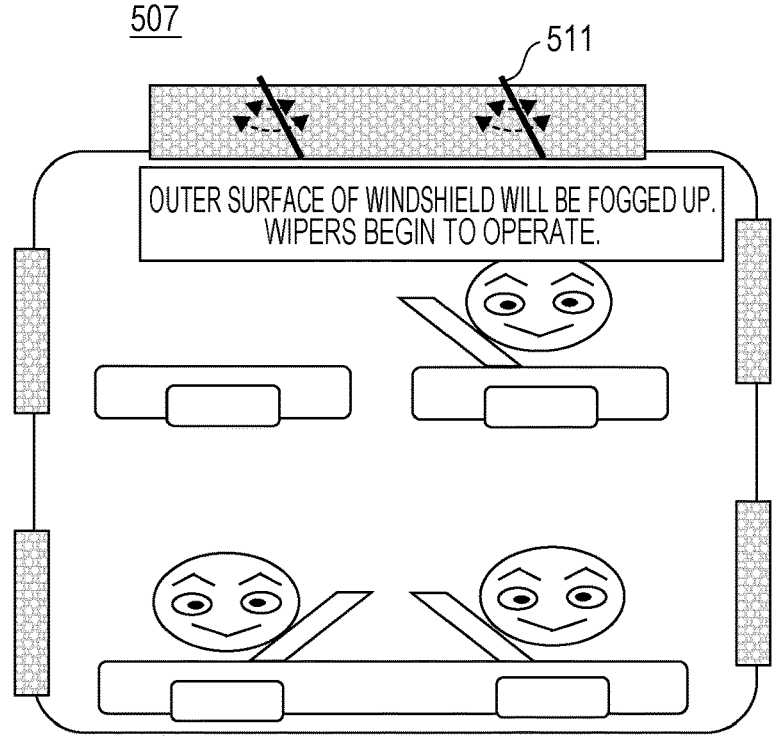
FIG. 36B is a diagram illustrating another example of the display screen of the information display panel in the detection system according to the fifth embodiment of the present disclosure.

FIG. 36B is a diagram illustrating another example of the display screen of the information display panel 507 in the detection system 509 according to the fifth embodiment of the present disclosure. More specifically, FIG. 36B is a diagram illustrating an example of the display screen of the information display panel 507 at a time when condensation has been detected in the detection system 509.

For example, as illustrated in FIG. 36B, the device control unit 506c may perform control (transmit a control command) to notify the driver that the wipers 510 begin to operate through the information display panel 507 before operating the wipers 510. For example, the device control unit 506c obtains data regarding the notification from the accumulation unit 506d and transmits a control command for outputting the obtained data to the information display panel 507. As a result, a message, "Outer surface of windshield will be fogged up. Wipers begin to operate", is displayed on the information display panel 507 near an icon indicating the state of the driver.

In addition, for example, the accumulation unit 506d may accumulate graphics data indicating that condensation will form on the windshield.

As with FIG. 31A, FIG. 36A illustrates a normal state, in which the positions of the driver and passengers and whether seatbelts are used are indicated as in the third embodiment. If it is predicted in front of a tunnel or the like that condensation will form on the windshield 504 as described above, graphics data corresponding to each window is replaced by graphics data indicating that condensation will form on each window as illustrated in FIG. 36B. By checking the information display panel 507, the driver can recognize that condensation will form on each window.

Furthermore, for example, the accumulation unit 506b may accumulate an input area 511 indicating whether to operate the wipers 510 and a control command to be transmitted when the input area 511 has been touched while associating the input area 511 and the control command with each other. The input area 511 is, for example, an icon on which an operation can be performed on the information display panel 507 of a touch panel type. For example, if it is predicted that condensation will form on the outer surface of the windshield 504, the device control unit 506c may transmit a control command for displaying the input area 511 indicating whether to operate the wipers 510 to the information display panel 507. As a result, control is performed such that the input area 511 is displayed on the information display panel 507.

Upon detecting a touch operation by the driver on the input area 511 on the input area 511, the device control unit 506c transmits the control command corresponding to the touch operation accumulated in the accumulation unit 506d to the control apparatus.

In such a configuration, the driver can operate the wipers 510 by operating the input area 511 on the information display panel 507. Therefore, the driver is not surprised by a sudden operation of the wipers 510, and condensation on the outer surface of the windshield 504 can be safely prevented.

Although the driver is notified of the operation of the wipers 510 through the input area 511 here, the driver may be obviously notified that condensation will form on the outer surface of the windshield 504 of the automobile 500 through a sound, in order to prompt the driver to operate the wipers 510 manually.

Although the radiation thermometer 505 is used for measuring the temperature of the windshield 504 here, the means for measuring the temperature of the windshield 504 is not limited to the radiation thermometer 505. The infrared array sensor 103 according to the first embodiment or a contact thermometer such as a thermistor may be used, instead, insofar as the temperature of the windshield 504 can be measured. The means for measuring the temperature of the windshield 504 is not particularly limited.

Although the temperature of the windshield 504 is measured here, the temperature of a side window may be measured as in the fourth embodiment. As described in the fourth embodiment, since condensation usually forms on the side windows earlier than on the windshield, whether condensation will form on the windshield can be determined at an earlier point of time.

Figure 37:
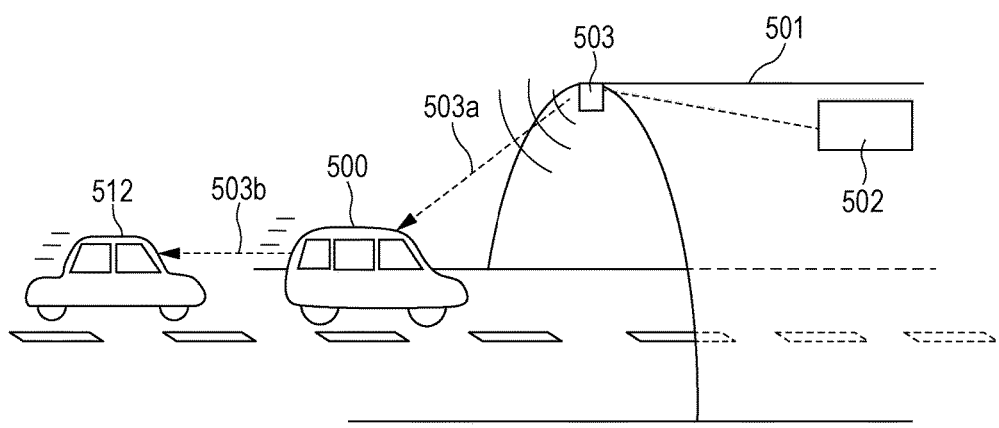
FIG. 37 is a diagram illustrating another example of the configuration of the detection system according to the fifth embodiment of the present disclosure.

FIG. 37 is a diagram illustrating another example of the configuration of the detection system 509 according to the fifth embodiment of the present disclosure.

As illustrated in FIG. 37, the data received by the automobile 500 using the electromagnetic wave 503a may be transmitted to an automobile 512 behind the automobile 500 using an electromagnetic wave 503b through inter-vehicle communication. In doing so, even if an area covered by the transmitter 503 is small, information regarding the inside of the tunnel 501 can be transmitted over a wide range, thereby saving the power of the transmitter 503.

Although the measurement unit 502 arranged inside the tunnel 501 is used for detecting temperature and humidity, the method for detecting temperature and humidity is not limited to this.

Figure 38A:
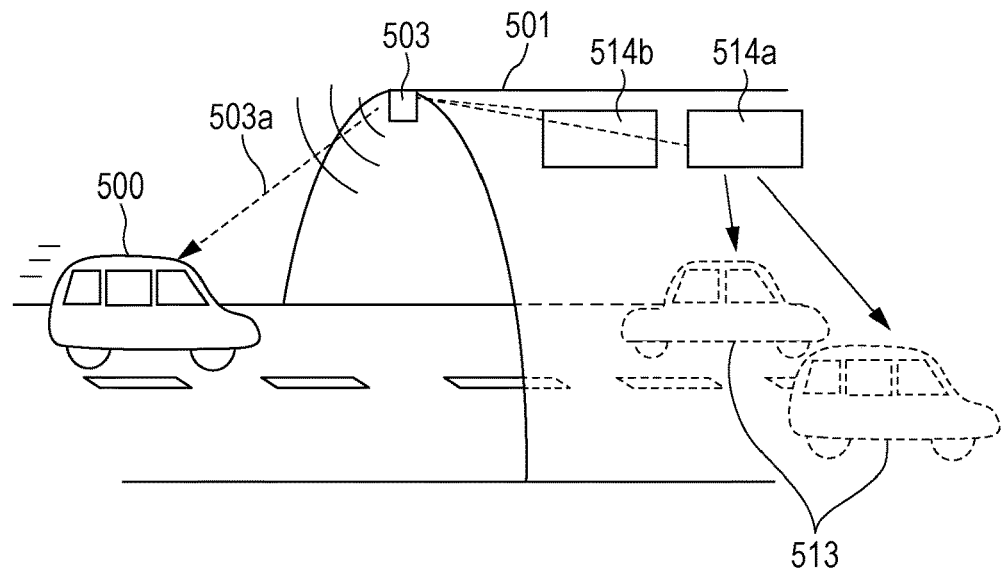
FIG. 38A is a diagram illustrating another example of the configuration of the detection system according to the fifth embodiment of the present disclosure.
Figure 38B:
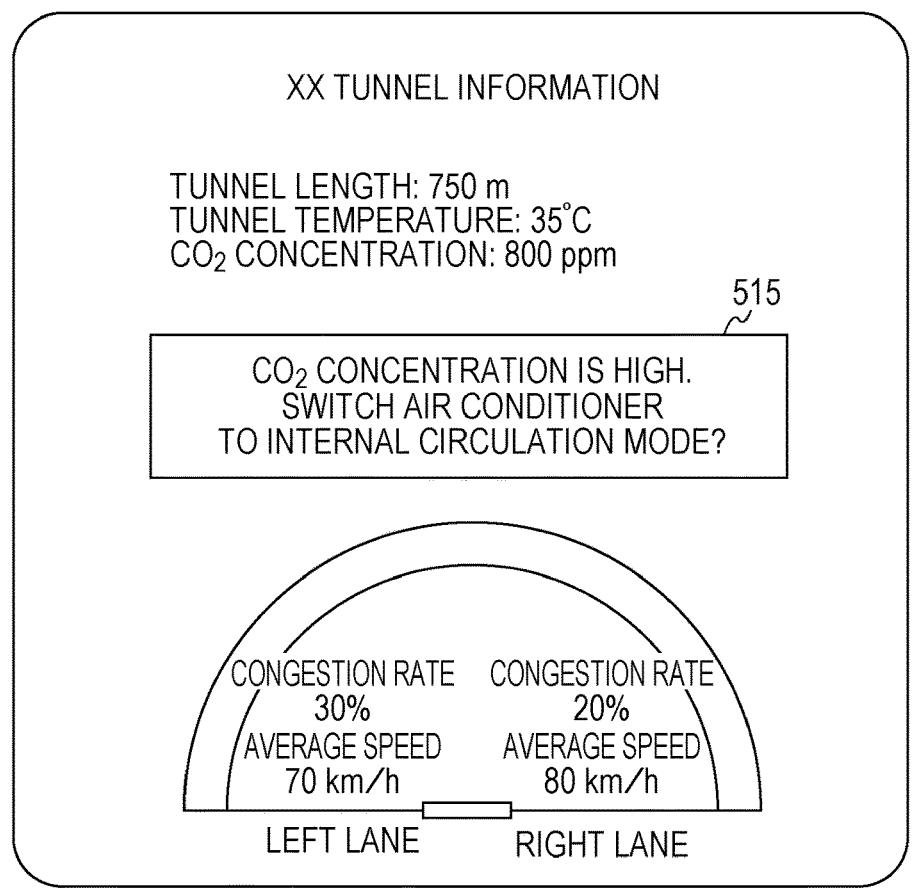
FIG. 38B is a diagram illustrating another example of the display screen of the information display panel in the detection system according to the fifth embodiment of the present disclosure.

FIG. 38A is a diagram illustrating another example of the configuration of the detection system 509 according to the fifth embodiment of the present disclosure. FIG. 38B is a diagram illustrating another example of the display screen of the information display panel 507 in the detection system 509 according to the fifth embodiment of the present disclosure.

For example, as illustrated in FIG. 38A, a camera 514a and a $CO_2$ sensor 514b are provided inside the tunnel 501 and connected to the transmitter 503. The configurations of the other devices arranged inside the tunnel 501 are basically the same as those illustrated in FIG. 33A, and the automobile 500 has basically the same configuration as that illustrated in FIG. 33B.

First, when the camera 514a is arranged inside the tunnel 501 as illustrated in FIG. 38A, a congestion rate and an average speed in each lane are calculated by capturing images of automobiles 513 and the like passing through the tunnel 501 over time and, if there are two lanes inside the tunnel 501 as in this embodiment, processing the captured images using a processing apparatus, which is not illustrated, provided inside the tunnel 501. The $CO_2$ sensor 514b arranged inside the tunnel 501 detects a $CO_2$ concentration in the tunnel 501 in real-time. Data regarding the congestion rate and the average speed in each lane calculated by the processing apparatus, which is not illustrated, and data detected by the $CO_2$ sensor 514b are transmitted to the transmitter 503. The transmitter 503 transmits the electromagnetic wave 503a including the received data forward from the tunnel 501 (to the side from which the automobile 500 enters the tunnel 501).

When the automobile 500 passes through a range in which the automobile 500 can receive the electromagnetic wave 503a transmitted from the transmitter 503, the receiver 508 inside the automobile 500 receives the electromagnetic wave 503a and outputs the data included in the electromagnetic wave 503a to the processing apparatus 506. As a result, the processing apparatus 506 processes the data received from the receiver 508 and displays a state inside the tunnel 501 on the information display panel 507.

FIG. 38B illustrates an example of the state inside the tunnel 501 displayed on the information display panel 507. By displaying the congestion rate and the average speed obtained from the camera 514a as illustrated in FIG. 38B, the driver can recognize the traffic inside the tunnel 501 before the automobile 500 enters the tunnel 501.

If the driver can recognize the traffic in each lane inside the tunnel 501 before the automobile 500 enters the tunnel 501, the driver can select one of the lanes he/she likes before the automobile 500 enters the tunnel 501. This is effective in reducing stress caused by running into a traffic jam inside the tunnel 501, since generally no passing is permitted in tunnels.

The $CO_2$ concentration is usually about 400 ppm, but the $CO_2$ concentration inside tunnels is likely to be higher because of $CO_2$ included in exhaust gas of automobiles. If an automobile passing through a tunnel takes in air from the outside in this state, the $CO_2$ concentration inside the automobile undesirably increases, thereby causing a headache or drowsiness depending on the $CO_2$ concentration.

For example, the accumulation unit 506d of the processing apparatus 506 may accumulate an input area 515 for operating a control apparatus (not illustrated) for controlling air conditioning and a control command to be output when the input area 515 has been operated while associating the input area 515 and the control command with each other. The control apparatus for controlling air conditioning is, for example, an air conditioner, which is not illustrated. The input area 515 is, for example, an icon displayed on the information display panel 507. The control command to be output when the input area 515 has been operated is, for example, a command for switching an air circulation mode of the air conditioner to an internal circulation mode. For example, if a $CO_2$ concentration determination unit (not illustrated) included in the processing apparatus 506 has determined that the $CO_2$ concentration measured by the $CO_2$ sensor 514b is higher than the $CO_2$ concentration inside the automobile 500, the device control unit 506c outputs the control command for displaying the input area 515 to the information display panel 507. A certain value may be set in advance as the $CO_2$ concentration inside the automobile 500, or a $CO_2$ sensor (not illustrated) that measures the $CO_2$ concentration inside the automobile 500 may be provided and data detected by the $CO_2$ sensor may be used.

If the information display panel 507 has detected a touch on the input area 515, the device control unit 506c extracts a control command corresponding to the touch operation from the accumulation unit 506d and outputs the control command to the control apparatus (air conditioner).

FIG. 38B illustrates an example of the display screen of the information display panel 507. For example, if the $CO_2$ concentration measured by the $CO_2$ sensor 514b is 800 ppm as illustrated in FIG. 38B, it is likely that the $CO_2$ concentration inside the tunnel 501 is higher than the $CO_2$ concentration inside the automobile 500. If air inside the tunnel 501 is taken into the automobile 500 for air conditioning in this state, the $CO_2$ concentration inside the automobile 500 is likely to increase.

For example, assume that the circulation mode of the air conditioner of the automobile 500 is an outside air circulation mode when the $CO_2$ concentration and the like are displayed on the information display panel 507. At this time, the input area 515 showing a message asking whether to switch the air conditioner to the internal circulation mode because the outside $CO_2$ concentration is high is displayed. By touching the displayed input area 515, the driver can switch the air conditioner to the internal circulation mode.

This is an example, and the operation performed is not limited to this. For example, if it has been determined that the $CO_2$ concentration inside the tunnel 501 is high, the device control unit 506c may transmit a control command for switching the air circulation mode to the internal circulation mode to the air conditioner, without displaying the input area 515 on the information display panel 507.

In general, when the air circulation mode is switched between the internal circulation mode and the outside air circulation mode, the tone of air conditioning noise changes. By performing the above-described operation, however, the driver can easily switch the air circulation mode to the internal circulation mode. Accordingly, the driver is not surprised by an abrupt change in the tone of air conditioning noise.

Alternatively, the transmitter 503 may transmit the length of the tunnel 501 and the temperature inside the tunnel 501 measured by a thermometer, which is not illustrated, provided inside the tunnel 501, and the information display panel 507 may display the length of the tunnel 501 and the temperature inside the tunnel 501 as illustrated in FIG. 38B. Another piece of information may also be received and displayed.

Although the transmitter 503 directly transmits the information regarding the inside of the tunnel 501 to the receiver 508 of the automobile 500 in this embodiment, this method is obviously an example. For example, information obtained by each sensor arranged inside the tunnel 501 may be uploaded to a server through the Internet, and the automobile 500 may download the information through a mobile phone line such as the third generation of mobile telecommunications technology (3G) or long-term evolution (LTE). The communication method is not particularly limited herein. In this case, whether the automobile 500 is approaching the tunnel 501 can be detected by detecting the position of the automobile 500 using the global positioning system (GPS), and accordingly only an automobile 500 that is approaching the tunnel 501 can selectively obtain data. If it has been detected that condensation will form on the windshield 504 of the automobile 500, a location in which the detection has been performed can be uploaded to the server through the Internet. Therefore, other drivers can recognize locations in which condensation is likely to form and locations in which the $CO_2$ concentration is high, which is advantageous.

Although the tunnel 501 has been taken as an example of a location in which condensation is likely to form on the outer surface of the windshield 504 and in which the $CO_2$ concentration is high in this embodiment, of course the location in which condensation is likely to form and in which the $CO_2$ concentration is high is not limited to the tunnel 501. For example, locations in which the $CO_2$ concentration is high may include busy streets and clogged roads, and locations in which condensation is likely to form may include bridges. Such locations are not particularly limited herein.

Sixth Embodiment

A detection system 609 according to this embodiment will be described with reference to FIGS. 39A to 42B. In this embodiment, an example in which the detection system 609 is adopted in an automobile 600 will be described.

Figure 39A:
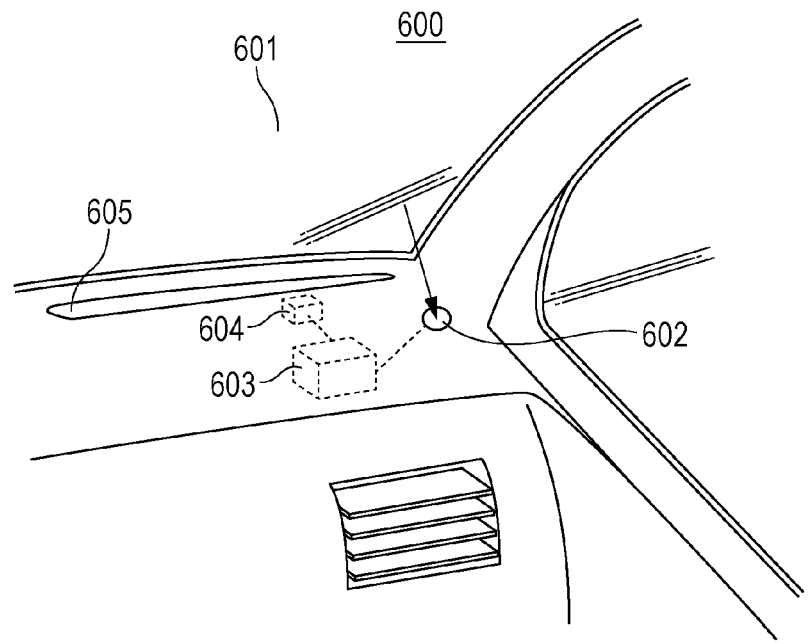
FIG. 39A is a diagram illustrating an example of an automobile in which a detection system according to a sixth embodiment of the present disclosure is installed.
Figure 39B:
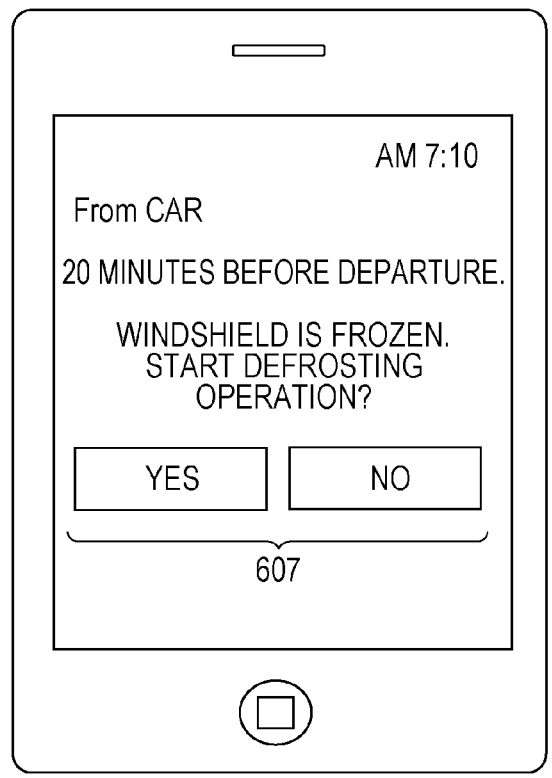
FIG. 39B is a diagram illustrating an example of a display screen of an information display panel in the detection system according to the sixth embodiment of the present disclosure.

FIG. 39A is a diagram illustrating an example of the automobile 600 in which the detection system 609 according to the sixth embodiment of the present disclosure is installed. FIG. 39B is a diagram illustrating an example of a display screen of a mobile terminal 606, which corresponds to an information display panel, in the detection system 609 according to the sixth embodiment of the present disclosure.

More specifically, FIG. 39A is a schematic diagram illustrating a portion of the automobile 600 around a driver's seat. As illustrated in FIG. 39A, the automobile 600 includes a windshield 601, a radiation thermometer 602 that detects the temperature of the windshield 601, a processing apparatus 603 that processes the temperature of the windshield 601 obtained by the radiation thermometer 602 and the like, a communication device 604 that performs communication, and an air outlet 605 that discharges air.

Figure 40:
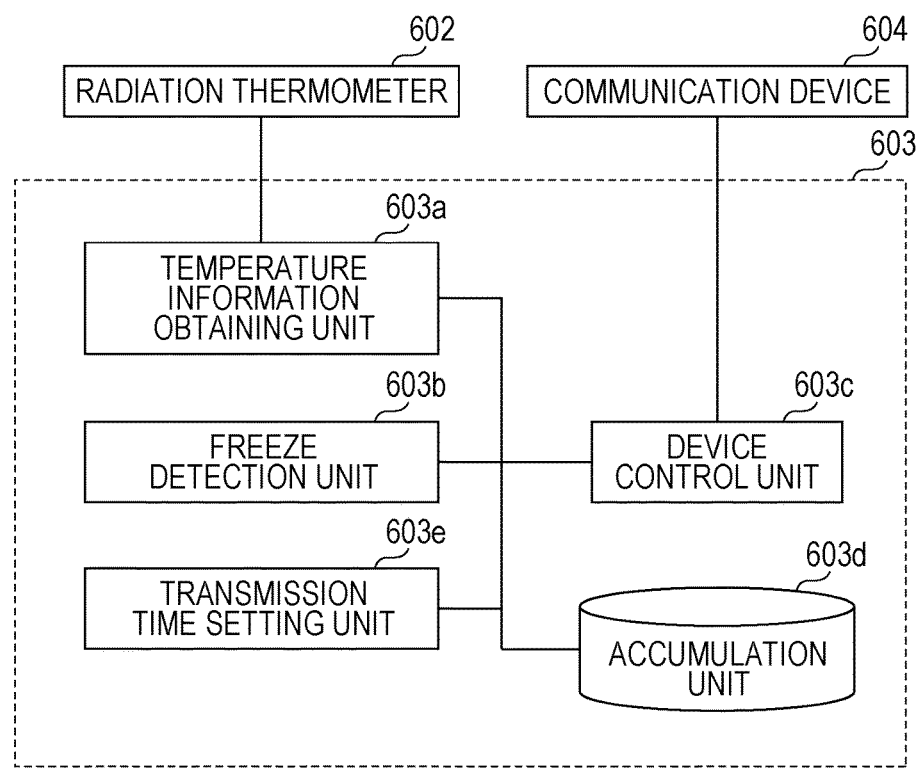
FIG. 40 is a diagram illustrating an example of the configuration of the detection system according to the sixth embodiment of the present disclosure.

FIG. 40 is a diagram illustrating an example of the configuration of the detection system 609 according to the sixth embodiment of the present disclosure. The detection system 609 includes, for example, the radiation thermometer 602, the processing apparatus 603, and the communication device 604.

The processing apparatus 603 includes, for example, a temperature information obtaining unit 603a, a freeze detection unit 603b, a device control unit 603c, an accumulation unit 603d, and a transmission time setting unit 603e.

The processing apparatus 603 is configured, for example, using a computer. The computer includes a CPU, a memory, and hardware, which is not illustrated. The accumulation unit 603d corresponds to, for example, the memory. The memory is a storage device such as a hard disk, a ROM, or a RAM. The memory accumulates, for example, programs that function as the temperature information obtaining unit 603a, the freeze detection unit 603b, the device control unit 603c, and the transmission time setting unit 603e. By executing the programs from the memory and executing the programs using the CPU, the processing apparatus 603 realizes the functions of the temperature information obtaining unit 603a, the freeze detection unit 603b, the device control unit 603c, and the transmission time setting unit 603e.

Alternatively, the functions of the temperature information obtaining unit 603a, the freeze detection unit 603b, the device control unit 603c, and the transmission time setting unit 603e in the processing apparatus 603 may be realized by integrated circuits.

Since FIG. 40 schematically illustrates the functional configuration of the processing apparatus 603, the processing apparatus 603 need not necessarily have this functional configuration but may have another functional configuration. That is, a device other than the processing apparatus 603 may have part of the functional configuration of the processing apparatus 603 illustrated in FIG. 40.

The communication device 604 is communicably connected to the mobile terminal 606, which will be described later. Communication between the communication device 604 and the mobile terminal 606 may be wireless communication or may be wired communication.

Next, an operation performed by the detection system 609 according to this embodiment will be described. The radiation thermometer 602 detects the temperature of the windshield 601, and data regarding the detected temperature of the windshield 601 is transmitted to the temperature information obtaining unit 603a of the processing apparatus 603. For example, if the temperature of the windshield 601 is below the freezing point while the automobile 600 is stationary, it is possible that the windshield 601 is frozen. In this case, since it is difficult for the driver to see forward clearly during driving of the automobile 600, for example, the driver usually begins to drive after starting an engine of the automobile 600 and discharging hot air from the air outlet 605 to defrost the windshield 601. In this case, however, the driver cannot start the automobile 600 until the windshield 601 is defrosted, which is a waste of time.

In this embodiment, the freeze detection unit 603b of the processing apparatus 603 determines whether the windshield 601 is frozen on the basis of the temperature of the windshield 601 measured by the radiation thermometer 602. If the freeze detection unit 603b has determined that the windshield 601 is frozen, the device control unit 603c transmits a control command for displaying a message indicating that the windshield 601 is frozen to a touch panel display of the mobile terminal 606 using the communication device 604. FIG. 39B is a diagram illustrating an example of the display screen of the mobile terminal 606. The communication device 604 is communicably connected to the mobile terminal 606 by connecting to the Internet through a mobile telephone line such as the 3G or LTE. The mobile terminal 606 displays the information transmitted from the device control unit 603c through the communication device 604.

Here, a timing at which the communication device 604 transmits the information may be set in advance by the driver using the transmission time setting unit 603e of the processing apparatus 603. For example, if the driver uses the automobile 600 for work at 7:30 every day, whether the windshield 601 is frozen may be checked at 7:10.

In this embodiment, the detection system 609 includes the radiation thermometer 602, the processing apparatus 603, and the communication device 604, and if the windshield 601 is frozen, a control command for displaying a corresponding message on the display screen of the mobile terminal 606 is transmitted to the mobile terminal 606. In doing so, for example, as illustrated in FIG. 39B, if the windshield 601 is frozen 20 minutes before the automobile 600 is used, a message indicating that the windshield 601 is frozen and asking whether to defrost the windshield 601 is displayed on the mobile terminal 606 owned by the driver as input areas 607 including "YES" and "NO". If the mobile terminal 606 has detected that the driver has touched "YES", the mobile terminal 606 transmits data regarding the touch operation to the automobile 600. Upon receiving the data transmitted from the mobile terminal 606, the communication device 604 of the automobile 600 outputs the received data to the device control unit 603c of the processing apparatus 603.

The accumulation unit 603d accumulates, for example, information regarding control commands to be transmitted when "YES" has been touched on the display screen of the mobile terminal 606. The control commands to be transmitted include, for example, a control command for starting the engine of the automobile 600 and a control command for discharging hot air from the air outlet 605.

The device control unit 603c checks the data received from the mobile terminal 606. If the received data is a positive response to the start of the defrosting operation (that is, a touch operation performed on "YES"), the device control unit 603c obtains the corresponding control commands from the accumulation unit 603d and outputs the corresponding control commands to the corresponding devices. More specifically, the device control unit 603c outputs the control command for starting the engine of the mobile terminal 606 to a control apparatus (not illustrated) that controls the start of the engine. Upon receiving the control command, the control apparatus (not illustrated) starts the engine. The device control unit 603c also outputs the control command for discharging hot air from the air outlet 605 to an air conditioner. Upon receiving the control command, the air conditioner discharges hot air from the air outlet 605 in accordance with the control command to automatically defrost the windshield 601. By configuring the detection system 609 in this manner, the driver need not wait in the automobile 600 until the windshield 601 is defrosted, and accordingly will not be late for work, which is advantageous.

Figure 41:
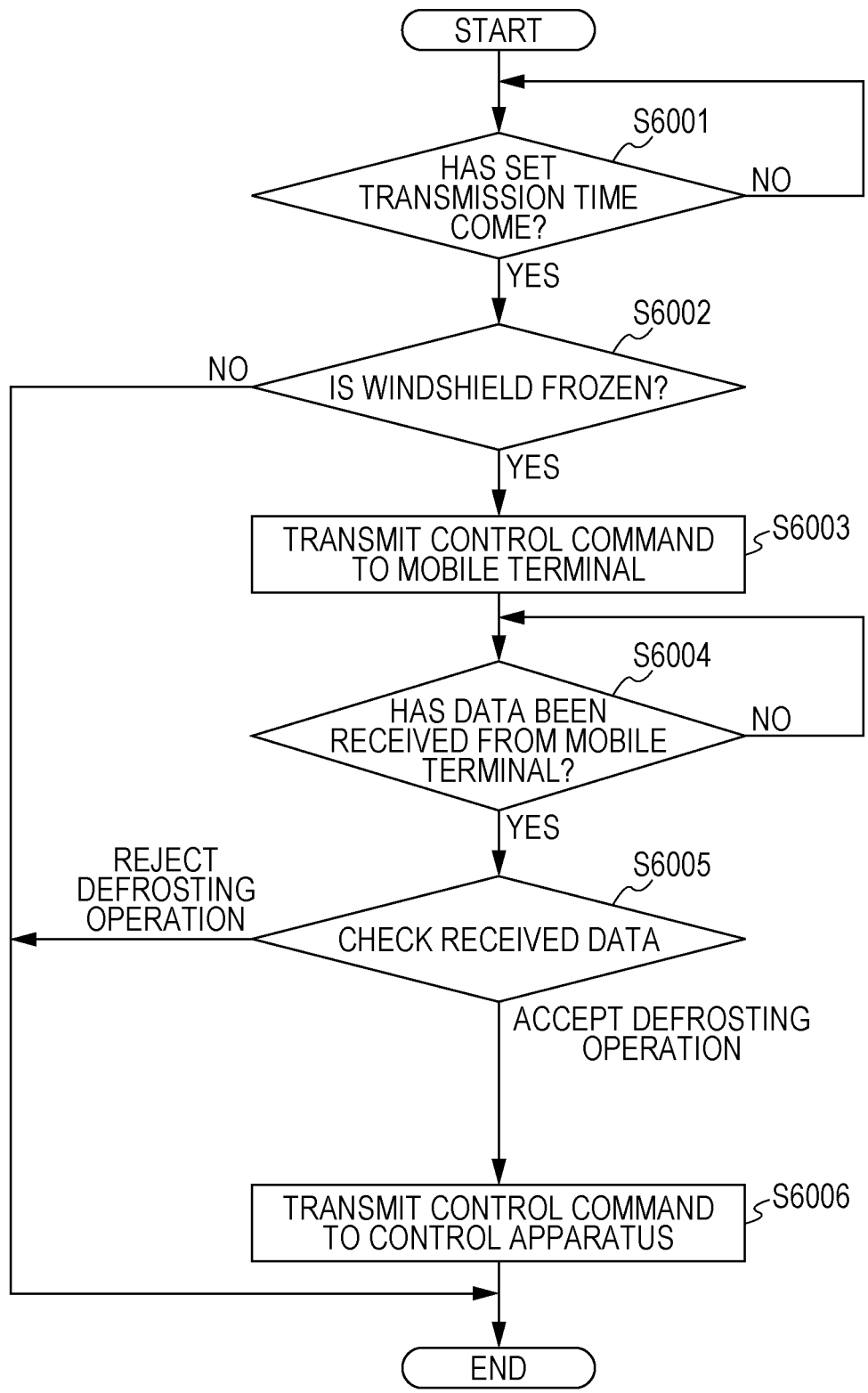
FIG. 41 is a flowchart illustrating an example of a process performed by the detection system according to the sixth embodiment of the present disclosure.

FIG. 41 is a flowchart illustrating an example of a process performed by the detection system 609 according to the sixth embodiment of the present disclosure. First, in step S6001, the processing apparatus 603 obtains time from a timer (not illustrated) and determines whether the obtained time is a time set by the transmission time setting unit 603e. If the processing apparatus 603 has determined in step S6001 that the time set by the transmission time setting unit 603e has come, the process proceeds to step S6002. If the processing apparatus 603 has determined in step S6001 that the time set by the transmission time setting unit 603e has not come, the processing in step S6001 is performed again.

In step S6002, the temperature information obtaining unit 603a of the processing apparatus 603 obtains data regarding the temperature of the windshield 601 measured by the radiation thermometer 602. In step S6002, the freeze detection unit 603b of the processing apparatus 603 then determines whether the windshield 601 is frozen on the basis of the data regarding the temperature of the windshield 601 obtained by the temperature information obtaining unit 603a. If the freeze detection unit 603b has determined in step S6002 that the windshield 601 is not frozen, the process ends. On the other hand, if the freeze detection unit 603b has determined in step S6002 that the windshield 601 is frozen, the process proceeds to step S6003.

Next, in step S6003, the device control unit 603c of the processing apparatus 603 transmits a control command for displaying a message indicating that the windshield 601 is frozen on the display screen of the mobile terminal 606 to the mobile terminal 606 using the communication device 604.

Next, in step S6004, the device control unit 603c of the processing apparatus 603 determines whether data has been received from the mobile terminal 606 through the communication device 604. If the device control unit 603c has determined in step S6003 that data has not been received from the mobile terminal 606, the processing in step S6004 is performed again. On the other hand, if the device control unit 603c has determined in step S6004 that data has been received from the mobile terminal 606, the process proceeds to step S6005.

Next, in step S6005, the device control unit 603c of the processing apparatus 603 checks the received data. If the device control unit 603c has determined in step S6005 that the received data is data indicating that the start of the defrosting operation is not accepted, the processing apparatus 603 ends the process. The data indicating that the start of the defrosting operation is not accepted is, for example, data indicating that an icon showing "NO" has been touched between the input areas 607 displayed on the display screen of the mobile terminal 606 illustrated in FIG. 39B. On the other hand, if the device control unit 603c has determined in step S6005 that the received data is data indicating that the start of the defrosting operation is accepted, the process proceeds to step S6006. The data indicating that the start of the defrosting operation is accepted is, for example, data indicating that an icon showing "YES" has been touched between the input areas 607 displayed on the display screen of the mobile terminal 606 illustrated in FIG. 39B.

Next, in step S6006, the device control unit 603c of the processing apparatus 603 obtains the corresponding control commands from the accumulation unit 603d and transmits the corresponding control commands to the corresponding devices. In this embodiment, the device control unit 603c transmits the control command for starting the engine of the automobile 600 to the control apparatus (not illustrated) that controls the start of the engine. The device control unit 603c also transmits the control command for discharging hot air from the air outlet 605 to the air conditioner.

The flowchart of FIG. 41 is merely an example, and the process to be performed is not limited to that described therein.

If the automobile 600 is an electric automobile, the processing apparatus 603 may receive the amount of charge remaining in a battery from a battery charge remaining amount measurement unit (not illustrated) that measures the amount of charge remaining in the battery installed in the automobile 600. Alternatively, for example, the processing apparatus 603 may calculate the amount of charge to be consumed until the frozen windshield 601 is defrosted and compare the calculated amount of charge and the amount of charge remaining in the battery. Alternatively, the processing apparatus 603 may calculate a distance that can be covered by the amount of charge remaining in the battery obtained from the battery charge remaining amount measurement unit (not illustrated). The device control unit 603c may transmit a control command for displaying the calculated data to the mobile terminal 606, in addition to the control command for displaying the data illustrated in FIG. 39B.

Figure 42A:
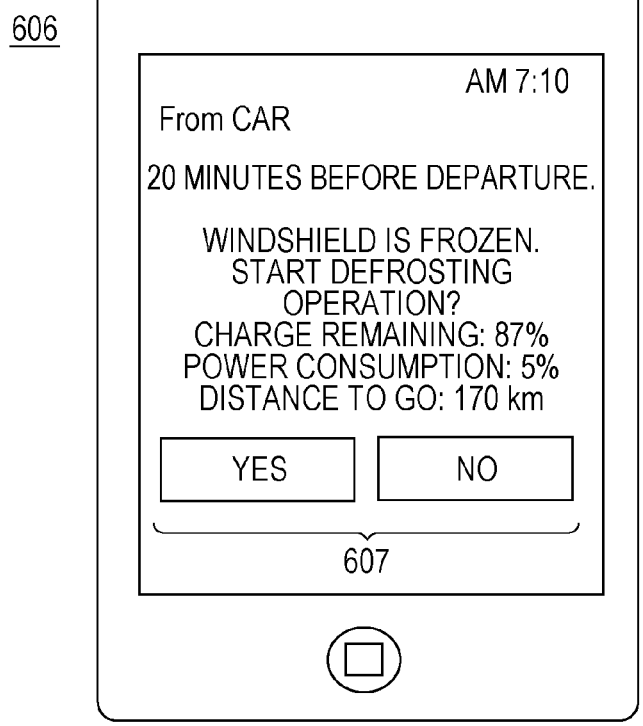
FIG. 42A is a diagram illustrating an example of the display screen of the information display panel in the detection system according to the sixth embodiment of the present disclosure.
Figure 42B:
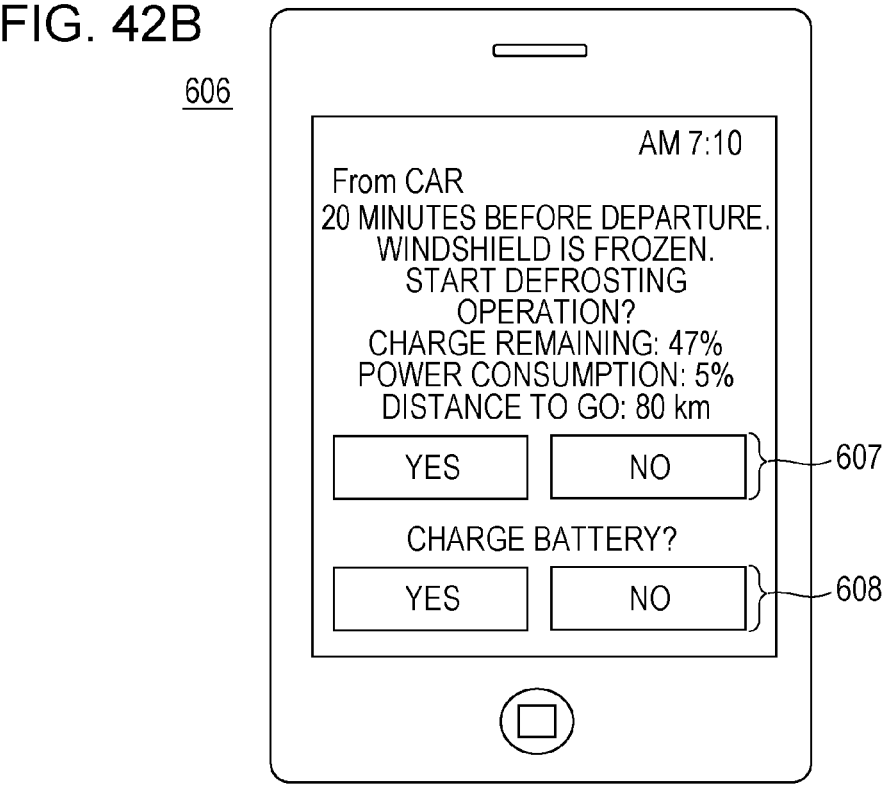
FIG. 42B is a diagram illustrating another example of the display screen of the information display panel in the detection system according to the sixth embodiment of the present disclosure.

FIG. 42A is a diagram illustrating an example of the display screen of the information display panel in the detection system 609 according to the sixth embodiment of the present disclosure. FIG. 42B is a diagram illustrating another example of the display screen of the information display panel in the detection system 609 according to the sixth embodiment of the present disclosure.

For example, by adopting the above configuration, power consumption is displayed on the display screen of the mobile terminal 606 along with the amount of charge remaining in the battery and the distance that can be covered as illustrated in FIG. 42A.

"YES" and "NO" are displayed on the display screen of the mobile terminal 606 as the input areas 607. If the driver touches a region of the display screen in which "YES" is displayed, the mobile terminal 606 detects the touch operation performed on an icon corresponding to "YES". The mobile terminal 606 transmits data indicating that the touch operation has been performed on the icon corresponding to "YES" to the automobile 600. The data received from the mobile terminal 606 is input to the processing apparatus 603 through the communication device 604. If the received data is data indicating that the touch operation has been performed on the icon corresponding to "YES", the device control unit 603c transmits the control command for discharging hot air from the air outlet 605 to the air conditioner. As a result, control is performed (the control command is transmitted) such that hot air is discharged from the air outlet 605 using the charge remaining in the battery, thereby beginning to defrost the windshield 601. Since the process according to this embodiment is performed using the charge remaining in the battery, the defrosting operation should not begin unless there is a sufficient amount of charge in the battery. Because the driver can determine whether to begin the defrosting operation after checking the amount of charge remaining in the battery, the driver can defrost the windshield 601 without fear that the battery will run out, if there is a sufficient amount of charge in the battery. Furthermore, the driver need not wait in the automobile 600 until the windshield 601 is defrosted, and accordingly will not be late for work.

Furthermore, as illustrated in FIG. 42B, not only the input areas 607 for determining whether to begin the defrosting operation on the basis of the amount of charge remaining in the battery, the power consumption, and the distance that can be covered but also input areas 608 for determining whether to begin to charge the battery of the automobile 600 may be provided. In doing so, for example, even if the amount of charge remaining in the battery is small, the windshield 601 is defrosted using power supplied from the outside by touching "YES" included in the input areas 608, and accordingly the amount of charge remaining in the battery does not decrease. Furthermore, since the battery is charged, the amount of charge remaining in the battery increases, and therefore the driver can defrost the windshield 601 without fear that the battery will run out. The driver need not wait in the automobile 600 until the windshield 601 is defrosted, and accordingly will not be late for work, which is advantageous. Of course, even if the amount of charge remaining in the battery is large, the driver can increase the amount of charge remaining in the battery at the time of departure by touching "YES" included in the input areas 608. Therefore, even after the windshield 601 is defrosted, the automobile 600 can cover a long distance.

Although the radiation thermometer 602 is used for measuring the temperature of the windshield 601, the means for measuring the temperature of the windshield 601 is not limited to the radiation thermometer 602. The infrared array sensor 103 according to the first embodiment or a contact thermometer such as a thermistor may be used insofar as the temperature of the windshield 601 can be measured. The means for measuring the temperature of the windshield 601 is not particularly limited herein.

Furthermore, although an example in which a mobile telephone line such as the 3G or LTE is used as the communication means used between the automobile 600 and the mobile terminal 606 has been described above, another method may be used. For example, Bluetooth (registered trademark) or the like may be used. The communication means used between the automobile 600 and the mobile terminal 606 is not particularly limited herein.

Seventh Embodiment

In a seventh embodiment, a detection system 709 that detects a failure in a solar panel module 701a provided over an automobile 700 will be described with reference to FIGS. 43A to 48C.

In FIGS. 49A to 52B, the detection system 709 for a solar panel module 701c provided over a roof of a house will be described.

Figure 43A:
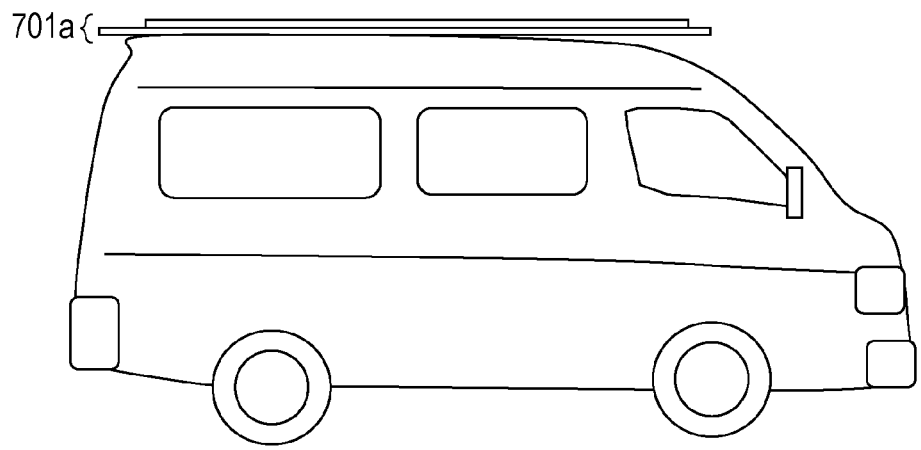
FIG. 43A is a diagram illustrating an example of an automobile in which a detection system according to a seventh embodiment of the present disclosure is installed.
Figure 43B:
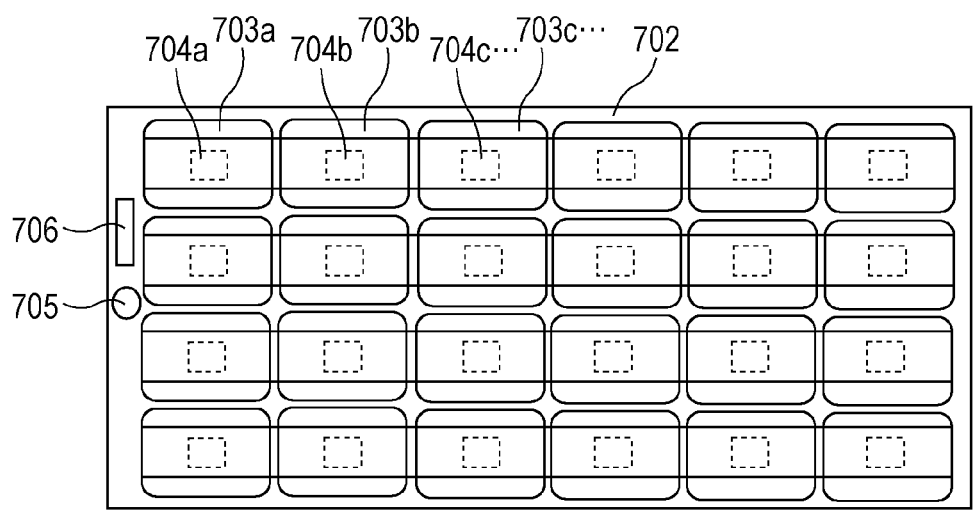
FIG. 43B is a diagram illustrating an example of the configuration of a solar panel module according to the seventh embodiment of the present disclosure.

FIG. 43A is a diagram illustrating an example of the automobile 700 in which the detection system 709 according to the seventh embodiment of the present disclosure is installed. FIG. 43B is a diagram illustrating an example of the configuration of the solar panel module 701a according to the seventh embodiment of the present disclosure.

FIG. 43A is a side view of the automobile 700 and the solar panel module 701a provided over a roof of the automobile 700. Power generated by the solar panel module 701a is supplied to a battery, which is not illustrated, of the automobile 700 through a cable, which is not illustrated. As illustrated in FIG. 43B, the solar panel module 701a includes a base plate 702 and cells 703a, 703b, 703c, and so on that are provided on the base plate 702 and that convert light into power. The solar panel module 701a also includes temperature sensors 704a, 704b, 704c, and so on. The solar panel module 701a also includes an illumination sensor 705 that is connected to the temperature sensors 704a, 704b, 704c, and so on through wires, which are not illustrated, and that measures the illuminance of a surrounding environment. The solar panel module 701a also includes a processing apparatus 706 that processes the detected values of illuminance and temperature.

In FIG. 43B, the cells 703a, 703b, 703c, and so on and the temperature sensors 704a, 704b, 704c, and so on are arranged in this order from left to right.

Figure 44:
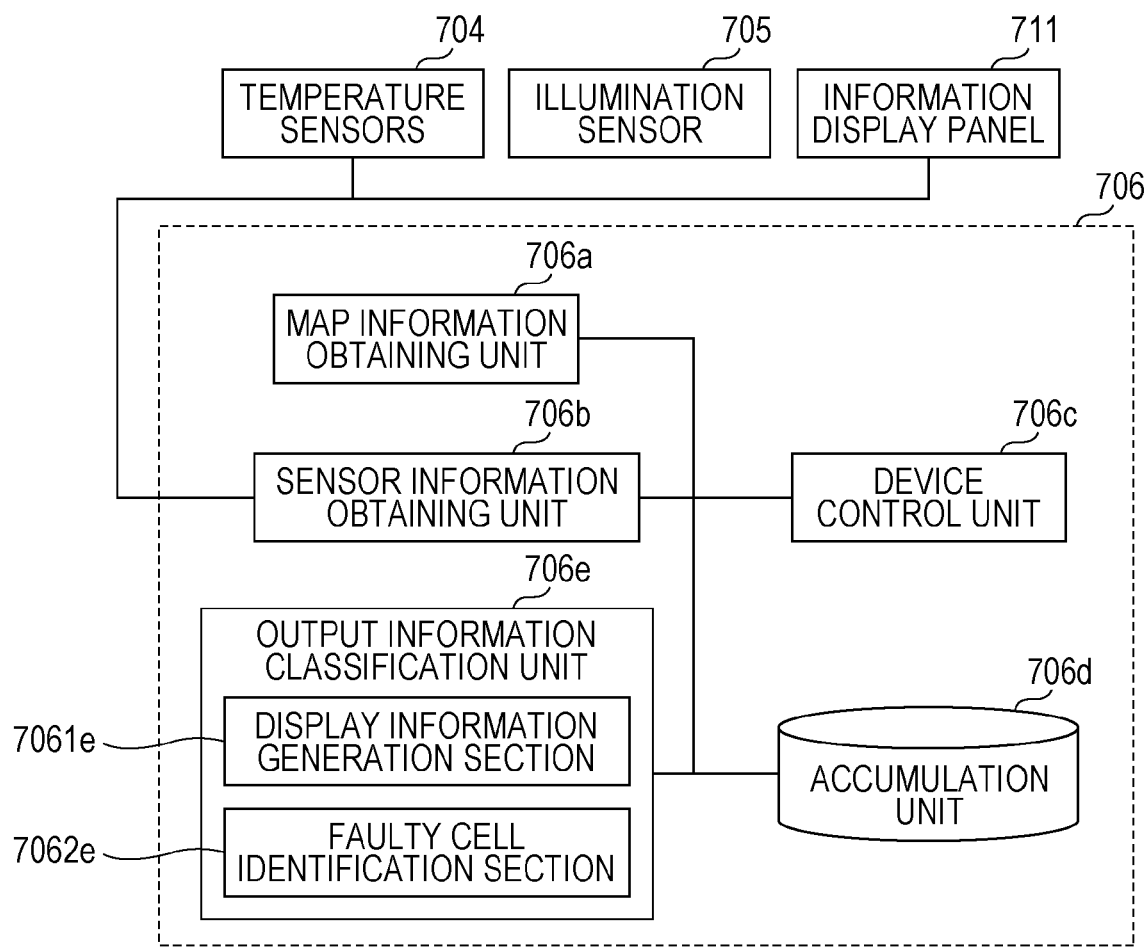
FIG. 44 is a diagram illustrating an example of the configuration of the detection system according to the seventh embodiment of the present disclosure.

FIG. 44 is a diagram illustrating an example of the configuration of the detection system 709 according to this embodiment. In FIG. 44, the detection system 709 includes, for example, the temperature sensors 704, the illumination sensor 705, the processing apparatus 706, and an information display panel 711. The detection system 709 also includes an automotive navigation system, which is not illustrated.

The temperature sensors 704 includes the temperature sensors 704a, 704b, 704c, and so on arranged on the solar panel module 701a illustrated in FIG. 43B.

The processing apparatus 706 includes, for example, a map information obtaining unit 706a, a sensor information obtaining unit 706b, a device control unit 706c, an accumulation unit 706d, and an output information classification unit 706e. The output information classification unit 706e includes, for example, a display information generation section 7061e and a faulty cell identification section 7062e.

The processing apparatus 706 is configured, for example, using a computer. The computer includes a CPU, a memory, and hardware, which is not illustrated. The accumulation unit 706d corresponds to, for example, the memory. The memory is a storage device such as a hard disk, a ROM, or a RAM. The memory accumulates, for example, programs that function as the map information obtaining unit 706a, the sensor information obtaining unit 706b, the device control unit 706c, and the output information classification unit 706e. The processing apparatus 706 realizes the functions of the map information obtaining unit 706a, the sensor information obtaining unit 706b, the device control unit 706c, and the output information classification unit 706e by, for example, reading the programs from the memory and executing the programs using the CPU. Alternatively, the functions of the map information obtaining unit 706a, the sensor information obtaining unit 706b, the device control unit 706c, and the output information classification unit 706e in the processing apparatus 706 may be realized by integrated circuits.

Since FIG. 44 schematically illustrates the functional configuration of the processing apparatus 706, the processing apparatus 706 need not necessarily have this functional configuration but, for example, may have another functional configuration. That is, a device other than the processing apparatus 706 may have part of the functional configuration of the processing apparatus 706 illustrated in FIG. 44.

Next, an operation performed by the detection system 709 according to this embodiment will be described. Normally cells included in a solar panel module are connected in series in order to obtain large electromotive force. If a cell or a plurality of cells in the solar panel module can no longer generate power for some reason, however, such cells interrupt the flow of current. Therefore, current is usually bypassed by connecting a bypass diode to each cell in parallel in order to suppress a decrease in generated voltage in total. Because a certain decrease (normally about 1 V) in voltage inevitably occurs, however, loss is caused in such cells and heat is generated. Therefore, by detecting the temperature of each cell during power generation, whether each cell is becoming faulty can be determined. At this time, if sunlight is not evenly falling on the cells or if a shadow of a building, a plant, or the like falls on the cells, a difference is caused in the amount of power generated by each cell and accordingly the amount of heat generated becomes different, thereby making it difficult to detect a failure in each cell. Therefore, the temperature of each cell needs to be measured when sunlight is evenly falling on the solar panel module.

Figure 45A:
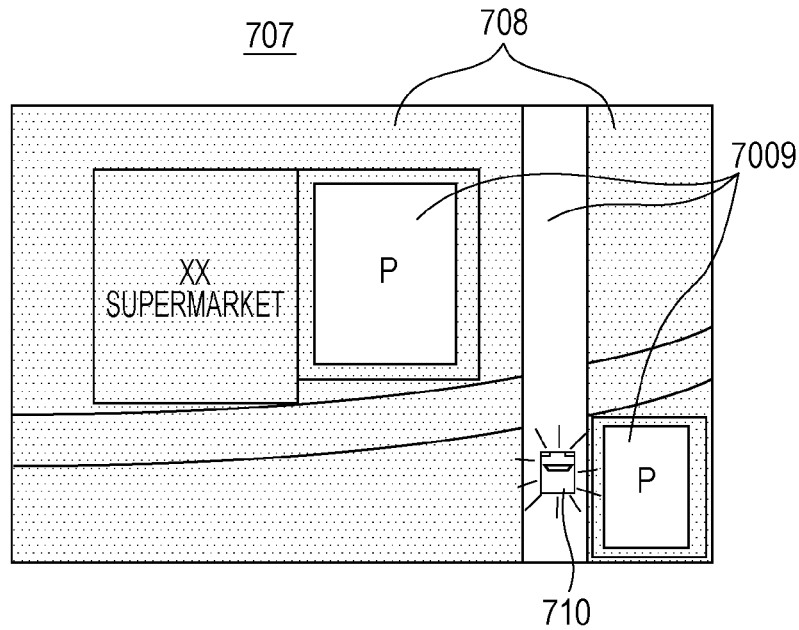
FIG. 45A is a diagram illustrating an example of a display screen of an automotive navigation system according to the seventh embodiment of the present disclosure.
Figure 45B:
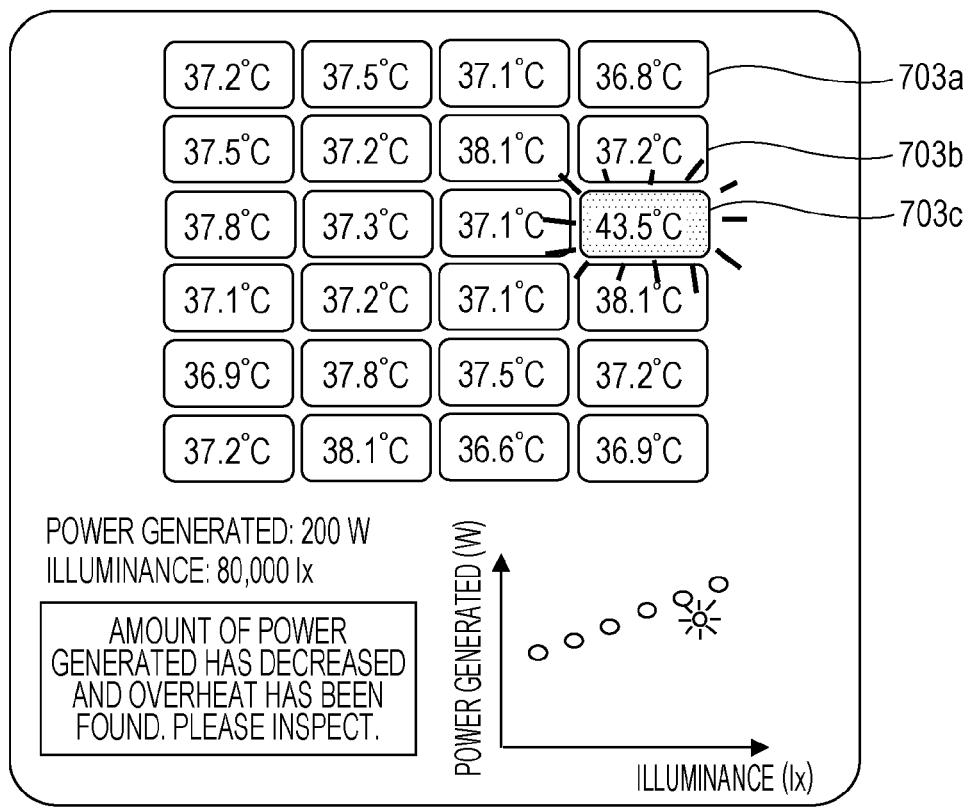
FIG. 45B is a diagram illustrating another example of a display screen of an information display panel in the detection system according to the seventh embodiment of the present disclosure.

FIG. 45A is a diagram illustrating an example of a display screen of the automotive navigation system, which is not illustrated, according to the seventh embodiment of the present disclosure. FIG. 45B is a diagram illustrating an example of a display screen of the information display panel 711 in the detection system 709 according to the seventh embodiment of the present disclosure.

As illustrated in FIG. 45A, the display screen 707 is a display screen of the automotive navigation system (not illustrated) installed in the automobile 700. In the display screen 707, for example, an icon 710 of the automobile 700, which is an image indicating the position of the automobile 700 operated by a driver, is flashing on a map. Furthermore, regions in which a shadow of a building, a roadside tree, a street lamp, or the like might fall on the solar panel module 701a arranged over the roof of the automobile 700 are indicated as shadow regions 708 in FIG. 45A. In the shadow regions 708, it is possible that heat is generated while a shadow of a building or the like is falling on the cells 703a, 703b, 703c, and so on, and therefore the measurement performed by the temperature sensors 704 in these regions can be meaningless. On the other hand, regions in which there is no building, roadside tree, street lamp, or the like that can fall its shadow on the surroundings are indicated as sunny regions 7009. Therefore, by detecting the temperatures of the cells 703 and illuminance when the icon 710 of the automobile 700 is in one of the sunny regions 7009 on the display screen 707, the operation (whether each cell is faulty or whether each cell is becoming faulty) of each cell 703 can be estimated.

For example, information obtained by the map information obtaining unit 706a of the processing apparatus 706 through the Internet may be transferred to the display screen 707 of the automotive navigation system in order to display the information on the display screen 707 of the automotive navigation system illustrated in FIG. 45A. Alternatively, the display screen 707 of the automotive navigation system illustrated in FIG. 45A may display information directly obtained by the automotive navigation system through the Internet. Map information obtained by the map information obtaining unit 706a including information regarding regions in which measurement can be performed may be generated and managed by a server used by a company that provides the detection system 709, or may be generated and managed by an external company.

Even when the automobile 700 is in one of the sunny regions 7009, power is not sufficiently generated if it is rainy or cloudy, since sufficient sunlight does not fall on the solar panel module 701a. Even if there is a faulty cell, a difference in temperature tends not to arise. Therefore, in the detection system 709, the values of the temperature sensors 704a, 704b, 704c, and so on are detected on the basis of information regarding the illuminance detected by the illumination sensor 705 and obtained by the sensor information obtaining unit 706b while a certain illuminance is being obtained and the automobile 700 is in one of the sunny regions 7009. That is, the processing apparatus 706 determines, on the basis of the map information, which is obtained by the map information obtaining unit 706a, including the information regarding the regions in which the measurement can be performed and the information regarding the illuminance obtained by the sensor information obtaining unit 706b, a timing at which the device control unit 706c obtains the values of the temperature sensors 704a, 704b, 704c, and so on. When the timing that satisfies conditions has come, the device control unit 706c obtains the values of the temperature sensors 704a, 704b, 704c, and so on.

The illuminance and temperatures obtained at this timing are collected by the sensor information obtaining unit 706b of the processing apparatus 706 through the cables, which are not illustrated. The accumulation unit 706d of the processing apparatus 706 may accumulate the collected data.

The data collected from the temperature sensors 704 and the illumination sensor 705 are classified by the output information classification unit 706e (display information generation section 7061e) of the processing apparatus 706. The classified information is transmitted by the device control unit 706c to the information display panel 711 and, as illustrated in FIG. 45B, displayed on the information display panel 711, which is arranged at such a position that the driver in the automobile 700 can see the information display panel 711. FIG. 45B illustrates the temperatures measured by the temperature sensors 704a, 704b, 704c, and so on corresponding to the cells 703a, 703b, 703c, and so on, the total amount of power generated by the cells 703a, 703b, 703c, and so on measured by a watt-hour meter, which is not illustrated, and the illuminance measured by the illumination sensor 705. FIG. 45B also includes a graph indicating a past relationship (results of the measurement) between the amount of power generated and the illuminance.

The temperature measured by the temperature sensor 704c is high. Because the temperature is higher than the average temperature of the cells 703a, 703b, 703c, and so on by a predetermined value or more (for example, 5° C.), the faulty cell identification section 7062e of the output information classification unit 706e identifies the cell 703c as a faulty cell. As illustrated in FIG. 45B, the device control unit 706c transmits, to the information display panel 711, a control command for changing the density of an icon of the faulty cell 703 and causing the icon of the faulty cell 703c to flash in the display screen. The information display panel 711 changes the density of the icon of the faulty cell 703c displayed on the display screen and causes the icon of the faulty cell 703c to flash. Upon receiving the control command for changing the density of the icon of the faulty cell 703c and causing the icon of the faulty cell 703c to flash, the information display panel 711 causes the current illuminance and the amount of power generated displayed on the display screen to flash.

The device control unit 706c also transmits, to the information display panel 711, a control command for causing the current illuminance and the amount of power generated to flash in the graph indicating the relationship between the illuminance and the amount of power generated. Upon receiving the control command for causing the current illuminance and the amount of power generated to flash, the information display panel 711 causes the current illuminance and the amount of power generated displayed on the display screen to flash. In FIG. 45B, the measured amount of power generated is small compared to the past relationship between the illuminance and the amount of power generated. Therefore, the driver who has checked the information display panel 711 can recognize that the cell 703c might be becoming faulty.

If, as illustrated in FIG. 45B, a decrease in the amount of power generated and a portion in which heat has been found, the device control unit 706c of the processing apparatus 706 may transmit, to the information display panel 711, a control command for displaying a message for prompting the driver to inspect the solar panel module 701a. Upon receiving the control command for displaying the message for prompting the driver to inspect the solar panel module 701a, the information display panel 711 displays the corresponding message on the display screen. By configuring the detection system 709 in this manner, the driver can recognize a failure in the solar panel module 701a as soon as possible by checking the information display panel 711. Therefore, the driver can take measures against the failure in the solar panel module 701a, thereby reducing downtime and the cost of measurement, which is advantageous.

Figure 46:
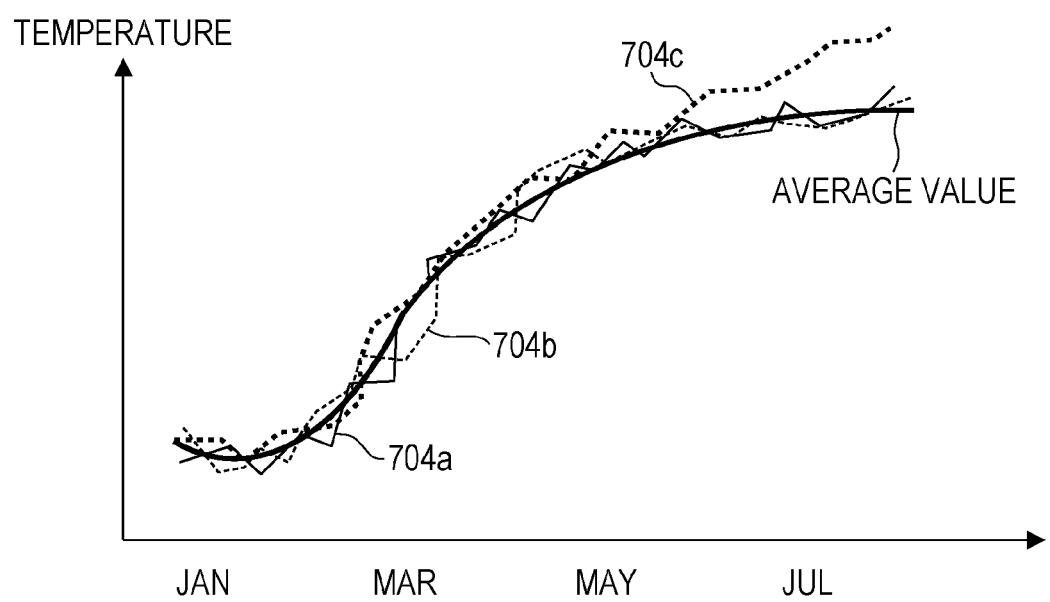
FIG. 46 is a diagram illustrating an example of a relationship between days on which the automobile is used and the average temperature of cells according to the seventh embodiment of the present disclosure.

Although a configuration in which the temperatures of the cells 703a, 703b, 703c, and so on are detected in coordination with the automotive navigation system while the automobile 700 is running in a region in which a shadow does not fall on the solar panel module 701a has been described in this embodiment, the timing at which the temperatures of the cells 703a, 703b, 703c, and so on are detected is not limited to this. For example, the temperatures of the cells 703a, 703b, 703c, and so on may be constantly measured, and the processing apparatus 706 may analyze a trend in the changes of the measured temperatures of the cells 703a, 703b, 703c, and so on over time. FIG. 46 is a graph illustrating an example of a relationship between days on which the automobile 700 is used and the average temperature measured by the temperature sensors 704a, 704b, 704c, and so on (namely, the average temperature of the cells 703a, 703b, 703c, and so on) according to the seventh embodiment of the present disclosure. For example, in FIG. 46, the average temperatures measured by the temperature sensors 704a, 704b, 704c, and so on each day on which the automobile 700 is used is plotted, and an average value of the average temperatures measured by the temperature sensors 704a, 704b, 704c, and so on is also plotted. Only the temperatures measured by the temperature sensors 704a, 704b, 704c are illustrated in order to simplify the graph. It can be seen from the graph that the temperature of the cell 703c has been higher than the average temperature. From this trend, for example, if an obtained average temperature is higher than the average temperature of the cells 703a, 703b, 703c, and so on by a predetermined value (for example, 5° C. or more), the warning may be issued on the information display panel 711 as illustrated in FIG. 45B.

Although only the driver sees the data regarding the measured temperatures, illuminance, and the like displayed on the information display panel 711 here, the detection system 709 may be connected to the Internet through a mobile telephone line, which is not illustrated, such as the 3G or LTE, and a manufacture of solar panel modules or the like may check the data.

Figure 47:
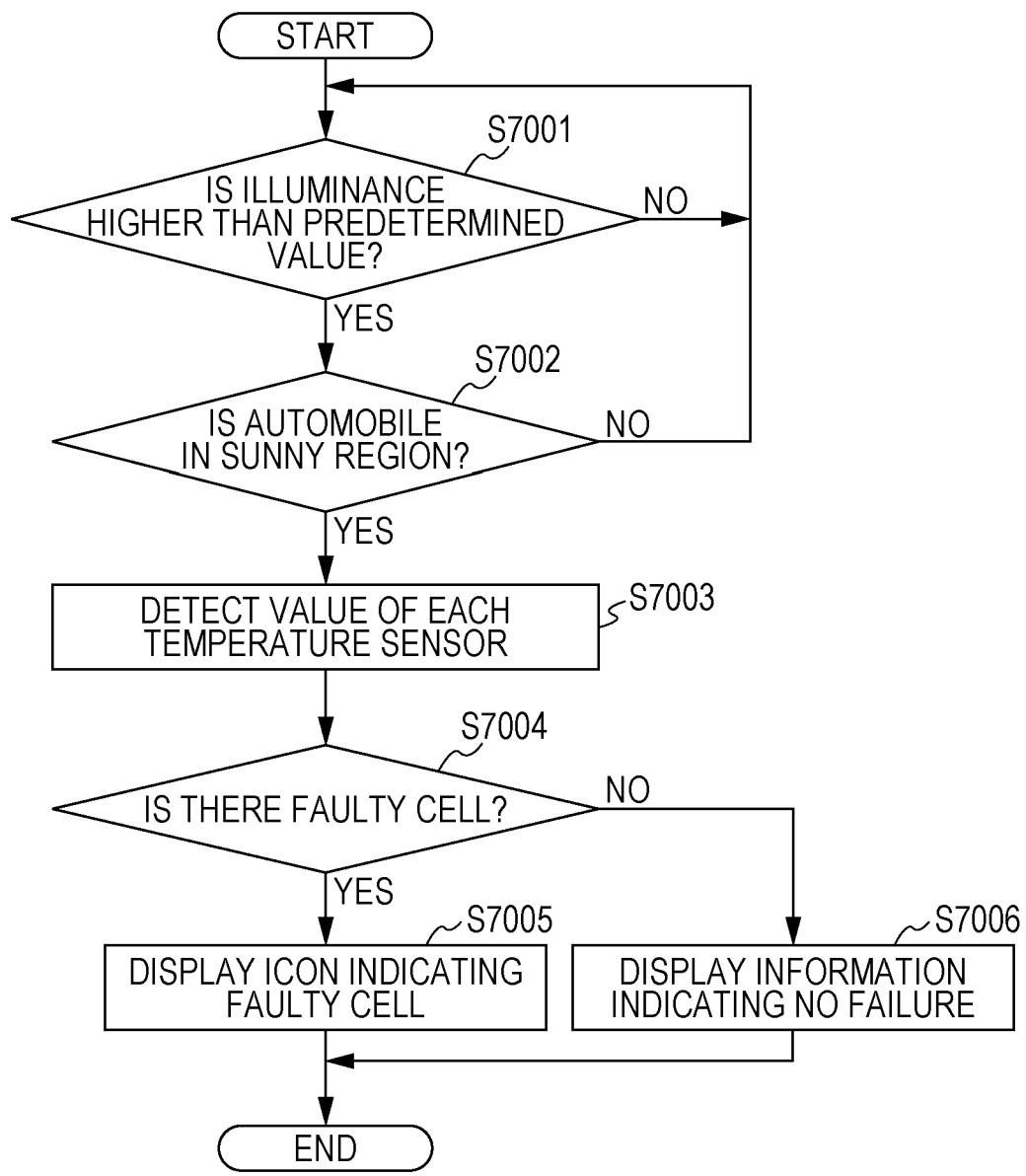
FIG. 47 is a flowchart illustrating an example of a process performed by the detection system according to the seventh embodiment of the present disclosure.

FIG. 47 is a flowchart illustrating an example of a process performed by the detection system 709 according to the seventh embodiment of the present disclosure.

First, in step S7001, the processing apparatus 706 determines whether the illuminance detected by the illumination sensor 705 and obtained by the sensor information obtaining unit 706b is higher than a predetermined value. If the processing apparatus 706 has determined in step S7001 that the illuminance is higher than the predetermined value, the process proceeds to step S7002. If the processing apparatus 706 has not determined in step S7001 that the illuminance is not higher than the predetermined value, the processing in step S7001 is performed again.

Next, in step S7002, the processing apparatus 706 determines whether the automobile 700 is in a sunny region 7009 on the basis of the position of the automobile 700 obtained by the map information obtaining unit 706a. If the processing apparatus 706 has determined in step S7002 that the automobile 700 is in a sunny region 7009, the process proceeds to step S7003. If the processing apparatus 706 has determined in step S7002 that the automobile 700 is not in a sunny region 7009, the process returns to step S7001.

Next, in step S7003, the sensor information obtaining unit 706b of the processing apparatus 706 obtains the values of the temperature sensors 704a, 704b, 704c, and so on.

Next, in step S7004, the faulty cell identification section 7062e of the processing apparatus 706 calculates the average temperature from the temperature of each cell obtained by the sensor information obtaining unit 706b. The faulty cell identification section 7062e of the processing apparatus 706 then determines whether there is a cell whose temperature is higher than the average temperature of the cells 703a, 703b, 703c, and so on by a predetermined value or more (for example, 5° C. or more).

If the faulty cell identification section 7062e has determined in step S7004 that there is a cell whose temperature is higher than the average temperature of the cells 703a, 703b, 703c, and so on by the predetermined value or more (for example, 5° C. or more), the process proceeds to step S7005. If the faulty cell identification section 7062e has determined in step S7004 that there is no cell whose temperature is higher than the average temperature of the cells 703a, 703b, 703c, and so on by the predetermined value or more (for example, 5° C. or more), the process proceeds to step S7006.

In step S7005, the display information generation section 7061e generates information indicating that the cell that has been determined to be faulty is faulty. The device control unit 706c transmits, to the information display panel 711, a control command for displaying an icon indicating that the cell is faulty on the information display panel 711 on the basis of the generated information.

In step S7006, the display information generation section 7061e generates information indicating that there is no failure among the cells. The device control unit 706c transmits, to the information display panel 711, a control command for displaying the information regarding the cells on the information display panel 711 on the basis of the generated information.

Figure 48A:
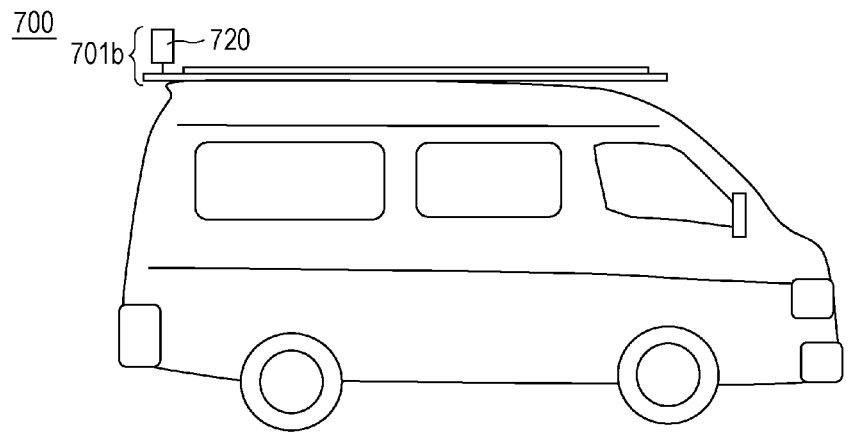
FIG. 48A is a diagram illustrating another example of the automobile in which the detection system according to the seventh embodiment of the present disclosure is installed.
Figure 48B:
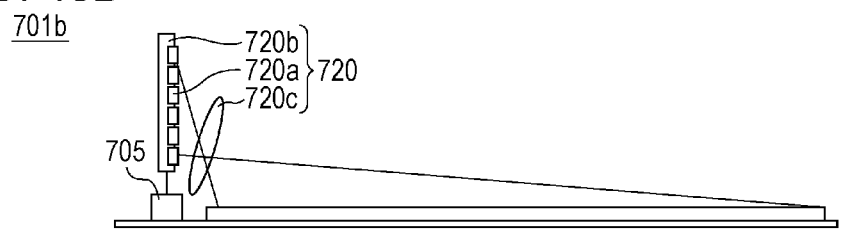
FIG. 48B is a diagram illustrating another example of a configuration at a time when the detection system according to the seventh embodiment of the present disclosure is installed in a solar panel module.
Figure 48C:
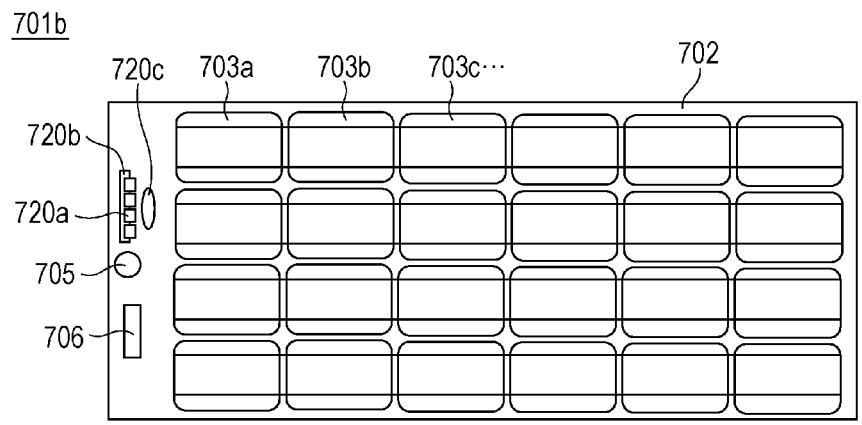
FIG. 48C is a diagram illustrating another example of the configuration at a time when the detection system according to the seventh embodiment of the present disclosure is installed in the solar panel module.

Although the temperature sensors 704a, 704b, 704c, and so on are used for measuring the temperatures of the cells 703a, 703b, 703c, and so on here, an infrared array sensor 720 may be used, instead, as illustrated in FIGS. 48A to 48C.

FIG. 48A is a diagram illustrating another example of the automobile 700 in which the detection system 709 according to the seventh embodiment of the present disclosure is installed. FIG. 48B is a diagram illustrating another example of a configuration at a time when the detection system 709 according to the seventh embodiment of the present disclosure is installed in a solar panel module 701b. More specifically, FIG. 48B is a side view of the solar panel module 701b. FIG. 48C is a diagram illustrating another example of the configuration at a time when the detection system 709 according to the seventh embodiment of the present disclosure is installed in a solar panel module 701b. More specifically, FIG. 48C is a plan view of the solar panel module 701b. The solar panel module 701b mounted on the automobile 700 illustrated in FIG. 48A is basically the same as the solar panel module 701a illustrated in FIG. 43A but different from the solar panel module 701a in that the infrared array sensor 720 is provided for the solar panel module 701b, instead of the temperature sensors 704a, 704b, 704c, and so on.

In the infrared array sensor 720 provided for the solar panel module 701b, as in the infrared array sensor 103, an infrared detection element 720a is provided on an infrared array substrate 720b as illustrated in FIG. 48B. A lens 720c is arranged such that the surface temperatures of cells 703a, 703b, 703c, and so on focus upon a surface of the infrared detection element 720a. Here, because surfaces of the cells 703 and the surface of the infrared detection element 720a are perpendicular to each other, the lens 720c is tilted downward, that is, a so-called "swing and tilt photographing method" is made. In doing so, only one infrared array sensor 720 is needed to measure the temperatures. Even if the number of cells 703 increases, it is unlikely that the number of infrared array sensors 720 needs to be increased, thereby suppressing cost.

A process performed using information regarding the measured temperatures is the same as that used by the solar panel module 701a. Data regarding the temperatures measured by the infrared array sensor 720 is transmitted to a processing apparatus 706 connected by a cable, which is not illustrated, and processed as in the case of the solar panel module 701a.

In this example of the seventh embodiment, the detection system 709 includes an illumination sensor 705, temperature sensors 704a, 704b, 704c, and so on, a processing apparatus 706, and an information display panel 711 or an illumination sensor 705, an infrared array sensor 720, a processing apparatus 706, and an information display panel 711.

Although the detection system 709 according to the seventh embodiment installed in the automobile 700 has been described above, an example in which the detection system 709 is used for a house 730 will be described hereinafter.

Figure 49A:
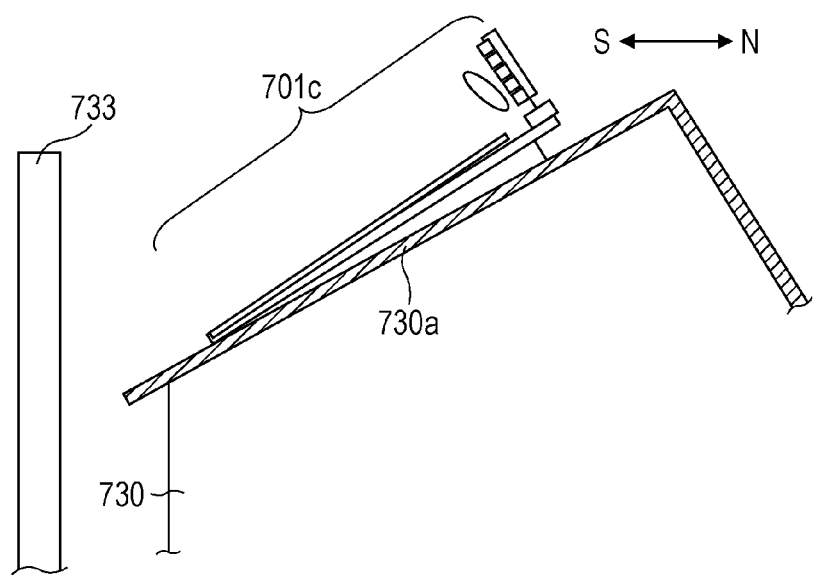
FIG. 49A is a diagram illustrating an example of a configuration at a time when the detection system according to the seventh embodiment of the present disclosure is installed in a solar panel module.
Figure 49B:
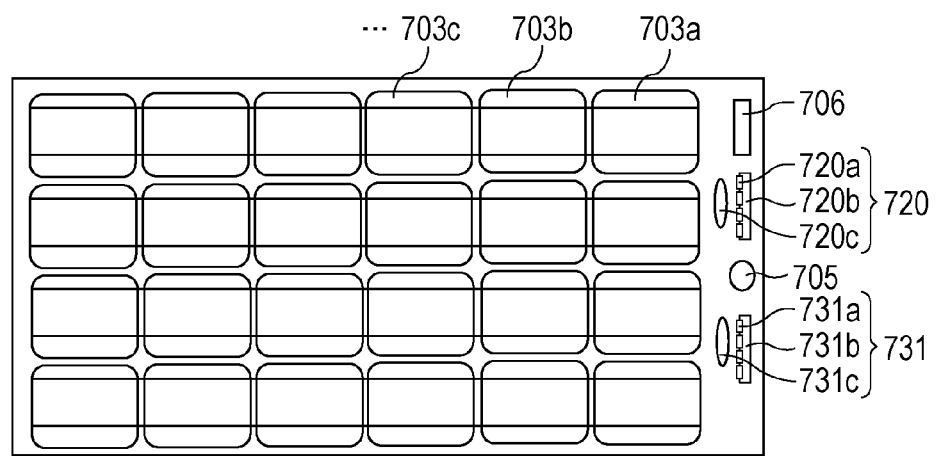
FIG. 49B is a diagram illustrating an example of the configuration of the solar panel module according to the seventh embodiment of the present disclosure.

FIG. 49A is a diagram illustrating an example of the configuration at a time when the detection system 709 according to the seventh embodiment of the present disclosure is installed in a solar panel module 701c. FIG. 49B is a diagram illustrating an example of the configuration of the solar panel module 701c according to the seventh embodiment of the present disclosure.

In FIG. 49A, the solar panel module 701c is arranged on a roof 730a of the house 730 at an angle of about 30° relative to a horizontal plane. FIG. 49B schematically illustrates the configuration of the solar panel module 701c. The solar panel module 701c is similar to the solar panel module 701b, but different from the solar panel module 701b in that a visible array sensor 731 is added to the solar panel module 701c. The visible array sensor 731 includes charge-coupled devices (CODs) 731a provided on a CCD array substrate 731b and a lens 731c that transmits visible light. The CODs 731 are sensors having wavelength sensitivity in a visible range. As with the infrared detection elements 103a, a plurality of CODs 731 are arranged. By forming an image using the lens 731c, a visible image of a certain plane in space can be obtained. The lens 731c may be of any type insofar as the lens 731c transmits visible light, and may be optical glass such as BK7 or a resin lens such as ZEONEX (registered trademark). The type of lens 731c is not particularly limited.

Next, the mechanism of an operation performed by the solar panel module 701c will be described. First, the illumination sensor 705 measures the illuminance of sunlight falling on the solar panel module 701c, and the output information classification unit 706e of the processing apparatus 706 connected to the illumination sensor 705 by a cable, which is not illustrated, checks that the measured illuminance is a certain value or more. This is because, as described above, if an illuminance of a certain value or more is not obtained, sufficient power is not generated, and accordingly if there is a faulty cell 703, little difference in temperature is caused, which makes a determination difficult.

If an illuminance of a certain value or more can be obtained, the infrared array sensor 720 and the visible array sensor 731 simultaneously capture a thermal image and a visible image, respectively, of the cells 703a, 703b, 703c, and so on. Here, as with the lens 720c of the infrared array sensor 720, the lens 731c included in the visible array sensor 731 is tilted downward, that is, a so-called "swing and tilt photographing method" is made.

Figure 50A:
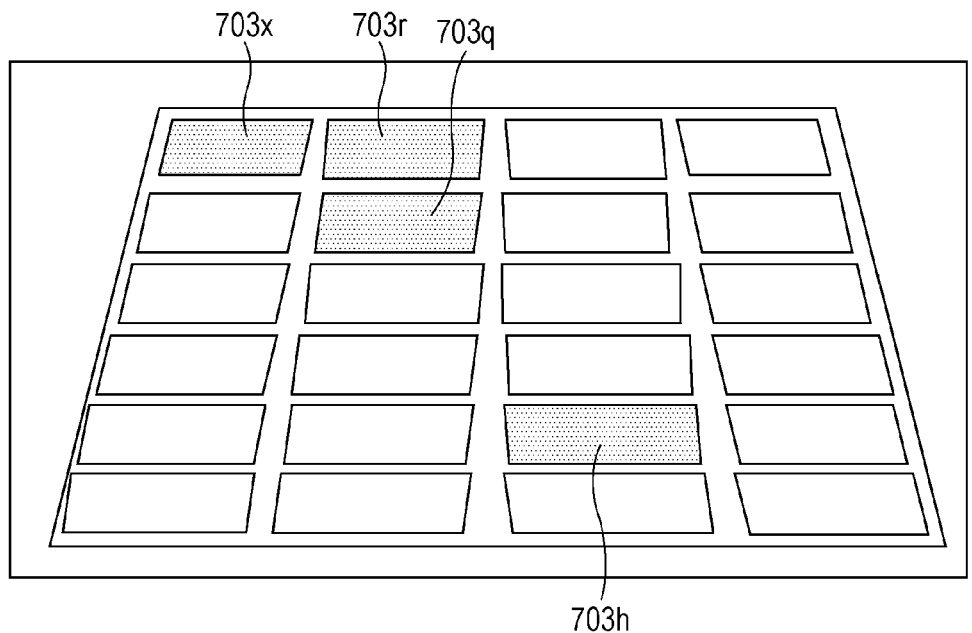
FIG. 50A is a diagram illustrating an example of a thermal image captured by an infrared array sensor.
Figure 50B:
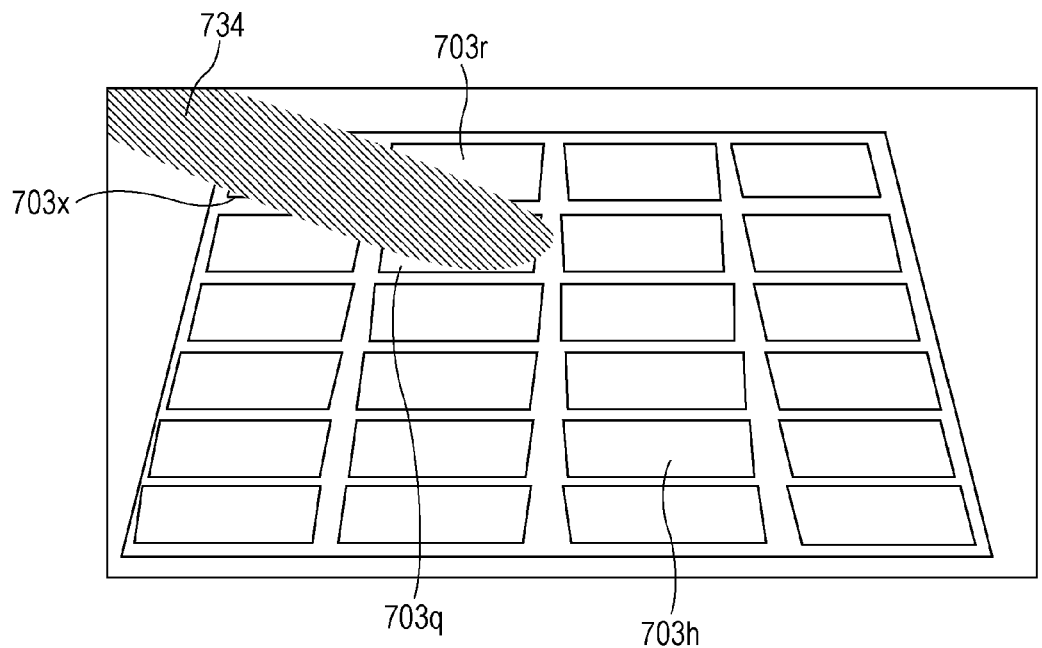
FIG. 50B is a schematic diagram illustrating an example of a visible image captured by the visible array sensor in the detection system according to the seventh embodiment of the present disclosure.

FIG. 50A is a diagram illustrating an example of the thermal image captured by the infrared array sensor 720. FIG. 50B is a diagram illustrating an example of a visible image captured by the visible array sensor 731 in the detection system 709 according to the seventh embodiment of the present disclosure.

FIG. 50A illustrates an example of the captured thermal image. FIG. 50B illustrates an example of a visible image corresponding to the captured thermal image. First, it can be seen in a thermal image 732a illustrated in FIG. 50A that the temperatures of cells 703h, 703q, and 703x are higher than those of other cells, and the temperature of a cell 703r is slightly higher than those of the other cells. On the other hand, it can be seen in a visible image 732b illustrated in FIG. 50B that a shadow 734 of a utility pole 733 located south of the house 730 is falling on the cells 703x and 703q. The shadow 734 also falls on about a half of the cell 703r.

As described above, loss is caused in a cell on which sunlight is not falling on because of a decrease in voltage generated, and accordingly heat is generated. Therefore, the output information classification unit 706e of the processing apparatus 706 can estimate that the heat in the cells 703x, 703r, and 703q has been caused by the shadow 734 of the utility pole 733. In contrast, the output information classification unit 706e can estimate that the voltage generated has decreased for some reason in the cell 703h, on which the shadow 734 or the like is not falling in the visible image 732b illustrated in FIG. 50B, and the cell 703h might be becoming faulty. That is, the output information classification unit 706e of the processing apparatus 706 processes the images captured by the infrared array sensor 720 and the visible array sensor 731 in the processing apparatus 706 connected to the infrared array sensor 720 and the visible array sensor 731 by cables, which are not illustrated, and, for example, processes only the cell 703h, on which the shadow 734 or the like is not falling in the visible image 732b, as a cell that is becoming faulty among the cells 703h, 703q, 703r, and 703x that have been found in the thermal image 732a to have generated heat.

Figure 51:
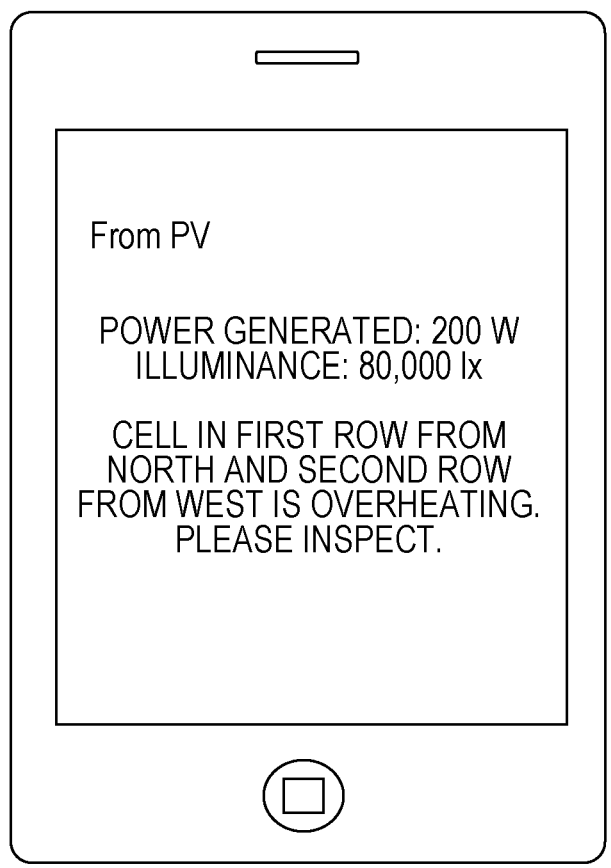
FIG. 51 is a diagram illustrating another example of the display screen of the information display panel in the detection system according to the seventh embodiment of the present disclosure.

Results obtained by the output information classification unit 706e of the processing apparatus 706 are transmitted to the Internet through a mobile telephone line, which is not illustrated, such as the 3G or LTE using a communication device, which is not illustrated. FIG. 51 is a diagram illustrating another example of the display screen of the information display panel 711 in the detection system 709 according to the seventh embodiment. For example, device control unit 706c performs control (transmits a control command) to display the results on a mobile terminal 736 owned by a user as illustrated in FIG. 51. Therefore, the user can recognize a possible failure in the cell 703 early and inspect the cell 703 soon even if a failure actually occurs in the cell 703, thereby reducing downtime and repair cost, which is advantageous. Of course, a manufacture of solar panel modules may check the data and prompt the user to inspect the cell 703.

The visible array sensor 731 and the infrared array sensor 720 are preferably provided at an upper end of the solar panel module 701c as in this embodiment. In doing so, it becomes possible to prevent the visible array sensor 731 and the infrared array sensor 720 from casting their shadows and reducing power generation efficiency.

Although the visible array sensor 731 and the infrared array sensor 720 are, for example, two-dimensional array sensors in FIGS. 49A and 49B, line sensors may perform scanning, instead. For example, FIG. 52A illustrates an example in which the infrared array sensor 720 has been replaced by an infrared line sensor 735.

Figure 52A:
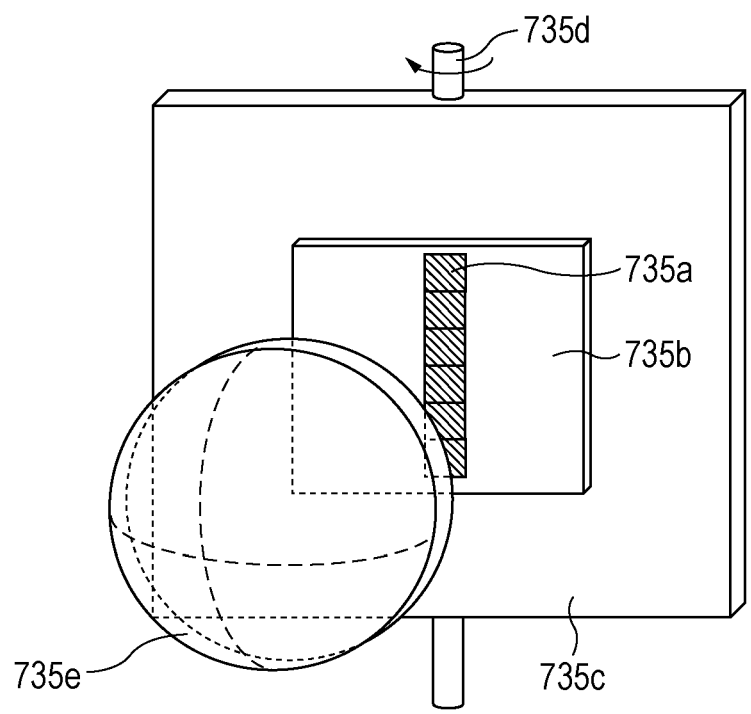
FIG. 52A is a perspective view of an example of the configuration of an infrared line sensor in the detection system according to the seventh embodiment of the present disclosure.
Figure 52B:
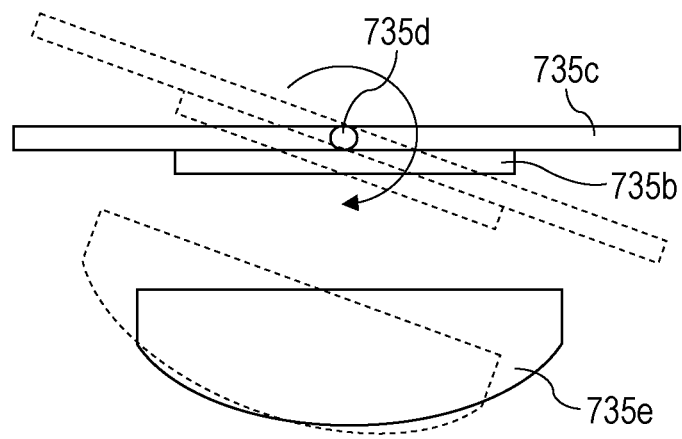
FIG. 52B is a plan view of an example of the configuration of the infrared line sensor in the detection system according to the seventh embodiment of the present disclosure.

FIG. 52A is a perspective view of an example of the configuration of the infrared line sensor 735 in the detection system 709 according to the seventh embodiment of the present disclosure. FIG. 52B is a plan view of an example of the configuration of the infrared line sensor 735 in the detection system 709 according to the seventh embodiment of the present disclosure.

In the infrared line sensor 735 illustrated in FIG. 52A, infrared detection elements 735a are vertically arranged in a line on an infrared array substrate 735b. In addition, a rotation axis 735d is inserted into a base 735c provided in a vertical direction. A lens 735e is integrated with the base 735c using a mount, which is not illustrated. In this state, the infrared line sensor 735 can measure two-dimensional temperature distribution by rotating around the rotation axis 735d as illustrated in FIG. 52B. In doing so, the number of infrared detection elements 735a can be decreased, and accordingly cost can be reduced, which is advantageous.

By performing scanning as described above, a frame rate at which an image is obtained decreases, but since an image to be obtained is that of the solar panel module 701c, no problem arises insofar as images can be obtained at intervals of tens of seconds. Therefore, the infrared line sensor 735 described above can be used without any problem. The same holds for the visible array sensor 731. The infrared array sensors according to the first to sixth embodiments may also be replaced by infrared line sensors, or infrared array sensors and infrared line sensors may be combined as necessary.

Although the infrared array sensor 720, the visible array sensor 731, infrared line sensor 735, and the like have been described in the above description, the number of elements included in each sensor may be larger than illustrated. The number of elements illustrated in the drawings is small just in order to prompt understanding, and the number of elements used is not particularly limited. The sensors may be designed as necessary.

Eighth Embodiment

In this embodiment, for example, speakers are provided at left and right rear doors.

In addition, in this embodiment, for example, air conditioners are provided at the back of a driver's seat and the back of a seat next to the driver's seat (front passenger seat).

Figure 53:
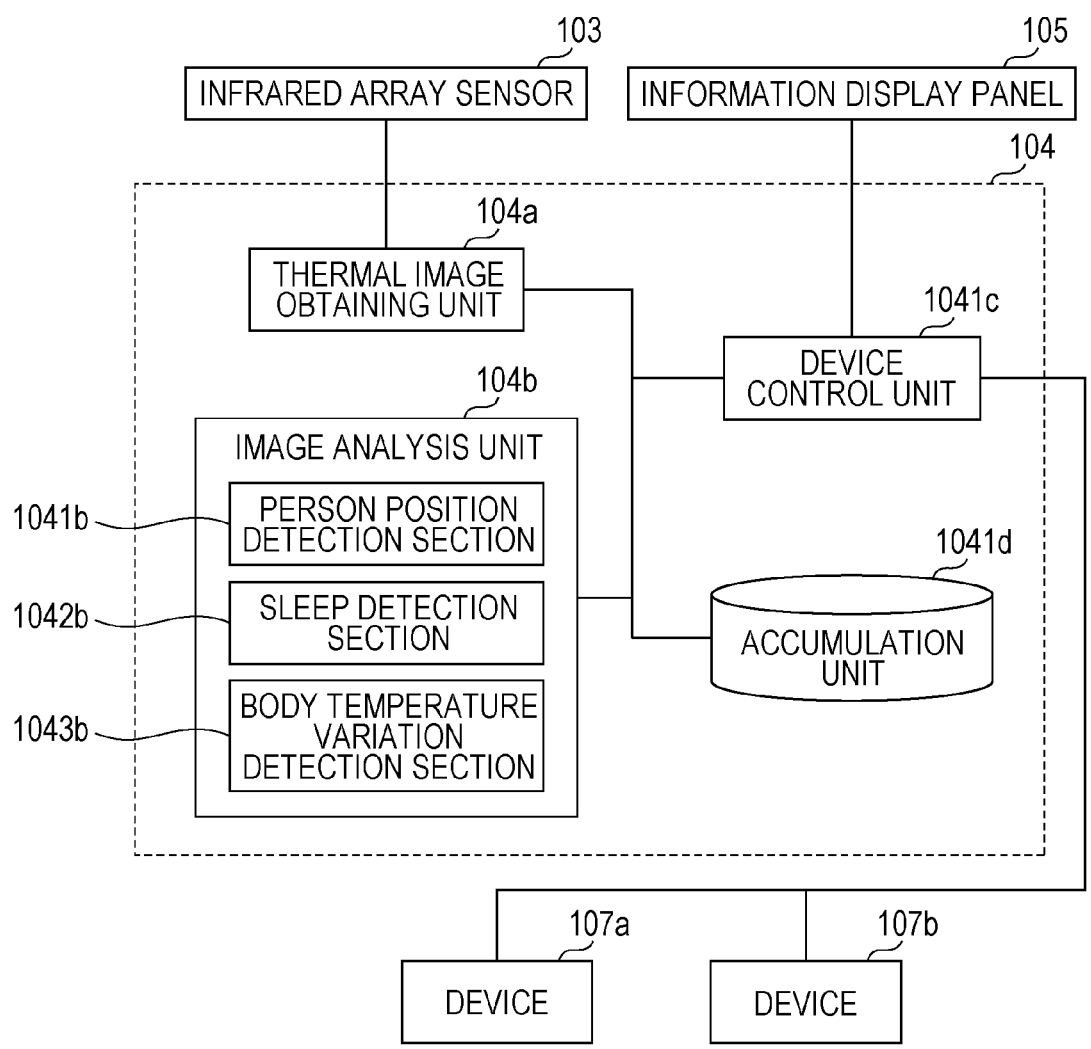
FIG. 53 is a diagram illustrating an example of the configuration of a detection system according to an eighth embodiment of the present disclosure.

FIG. 53 is a diagram illustrating an example of the configuration of a detection system according to the eighth embodiment of the present disclosure. Components illustrated in FIG. 53 having the same reference numerals as those used in FIG. 4 are the same as or correspond to the components illustrated in FIG. 4. Therefore, description of the components illustrated in FIG. 53 having the same reference numerals as those used in FIG. 4 is omitted here.

In FIG. 53, for example, an accumulation unit 1041d accumulates, in addition to the information accumulated by the accumulation unit 104d according to the first embodiment, information regarding icons for controlling the devices 107a and 107b and control commands corresponding to the icons while associating the icons and the control commands with each other.

The device 107a is, for example, a speaker. The device 107b is, for example, an air conditioner.

The accumulation unit 1041d also accumulates information regarding the positions of the devices 107a and 107b.

Upon detecting, for example, that a first operation has been performed on a certain region in a diagram of the inside of an automobile displayed on the information display panel 105, a device control unit 1041c transmits the control command for displaying the icon for controlling the device 107a to the information display panel 105.

Upon receiving the control command for displaying the device 107a, the information display panel 105 displays the icon for controlling the device 107a on the diagram.

Upon detecting, for example, that a second operation has been performed on a certain region in the diagram of the inside of the automobile displayed on the information display panel 105, the device control unit 1041c transmits the control command for displaying the icon for controlling the device 107b to the information display panel 105.

Upon receiving the control command for displaying the device 107b, the information display panel 105 displays the icon for controlling the device 107b in the diagram.

In the first embodiment, the diagram of the inside of the automobile 100 including the icon 801 corresponding to the driver's seat, the icon 802 corresponding to the seat next to the driver's seat, and the icon 803 corresponding to the backseat is displayed on the information display panel 105. In addition, in the first embodiment, the icon corresponding to the state of the driver 101, the icon corresponding to the state of the passenger 102, and the icon corresponding to the state of the passenger 107 are displayed in the diagram. In addition, in the first embodiment, the icon of the device installed near the passenger 102, who is asleep, is displayed in the diagram in the information display panel 105.

Figure 54A:
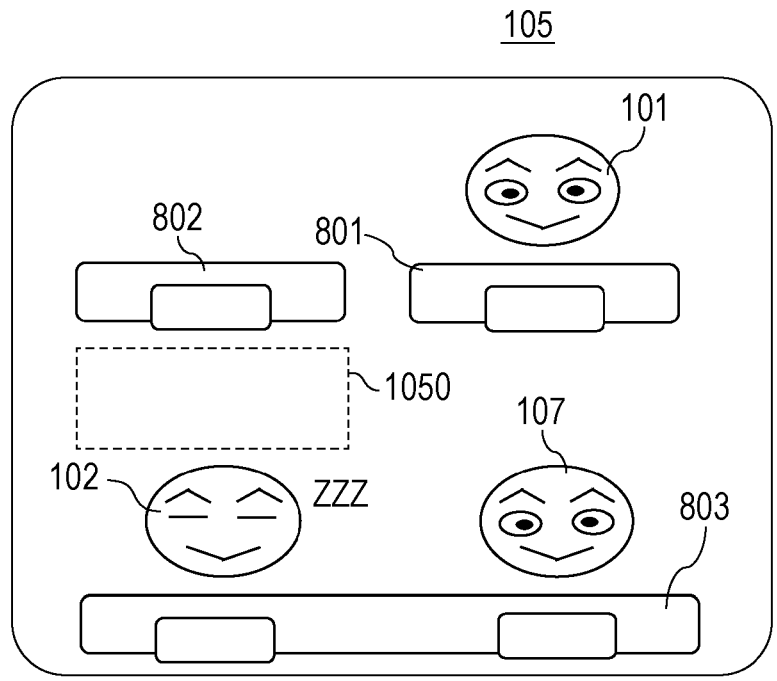
FIG. 54A is a diagram illustrating an example of a display screen of an information display panel in the detection system according to the eighth embodiment of the present disclosure.

FIG. 54A is a diagram illustrating an example of the display screen of the information display panel 105 in the detection system according to the eighth embodiment of the present disclosure. More specifically, FIG. 54A illustrates an example of the display screen at a time when the icon of the device installed near the passenger 102, who is asleep, is not displayed in the diagram. This embodiment is characterized in that if an operation performed by the driver 101 on a region 1050 between the icon 802 corresponding to the seat next to the driver's seat and the icon corresponding to the passenger 102 has been detected, the icon of the device installed near the position at which the passenger 102 has been detected is displayed.

In the information display panel 105 of a touch panel type, for example, if a left-to-right (or the opposite) sliding operation performed on the region 1050 has been detected, the information display panel 105 outputs operation data corresponding to the sliding operation to the device control unit 1041c. The device control unit 1041c detects that the sliding operation has been performed on the region 1050 in the information display panel 105 by receiving the operation data corresponding to the sliding operation.

The device control unit 1041c extracts a control command according to the sliding operation from the accumulation unit 104d. The control command according to the sliding operation is, for example, a control command for displaying an icon for controlling the device 107a in the region 1050. The device control unit 1041c outputs the control command to the information display panel 105.

The information display panel 105 displays the icon for controlling the device 107a in the region 1050. In this example, an icon for controlling the volume of the speaker located on the left side of the backseat is displayed in the region 1050.

The icon for controlling the volume of the speaker may be, for example, an icon corresponding to the input area 109a illustrated in FIG. 10. Alternatively, the icon for controlling the volume of the speaker may be an icon having a shape different from that of the icon corresponding to the input area 109a.

Figure 55A:
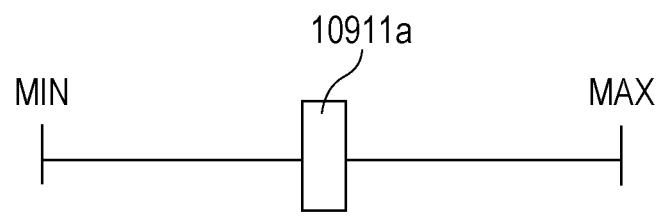
FIG. 55A is a diagram illustrating an example of an icon for controlling a device in the detection system according to the eighth embodiment of the present disclosure.

FIG. 55A is a diagram illustrating an example of an icon for controlling a device in the detection system according to the eighth embodiment of the present disclosure. More specifically, FIG. 55A illustrates an example of an icon 1091a for controlling the volume of a speaker. In FIG. 55A, when the icon 1091a is displayed on the information display panel 105, the position of a slide bar 10911a changes if the slide bar 10911a is slided while being touched.

For example, if the position of the slide bar 10911a has been changed to the left, the device control unit 1041c outputs a control command for turning down the volume to the corresponding speaker.

On the other hand, for example, if the position of the slide bar 10911a has been changed to the right, the device control unit 1041c outputs a control command for turning up the volume to the corresponding speaker.

At this time, how much the volume is changed is associated with how much the slide bar 10911a has been slided.

In addition, in the information display panel 105 of a touch panel type, for example, if a downward (or upward) sliding operation performed on the region 1050 has been detected, the information display panel 105 outputs operation data corresponding to the sliding operation to the device control unit 1041c. The device control unit 1041c detects that the sliding operation has been performed on the region 1050 in the information display panel 105 by receiving the operation data corresponding to the sliding operation.

The device control unit 1041c extracts a control command according to the sliding operation from the accumulation unit 104d. The control command according to the sliding operation is, for example, a control command for displaying an icon for controlling the device 107b in the region 1050. The device control unit 1041c outputs the control command to the information display panel 105. The information display panel 105 displays the icon for controlling the device 107b in the region 1050. In this example, an icon for controlling the air conditioner installed on the back of the seat corresponding to the icon 802 is displayed in the region 1050.

The icon for controlling the air conditioner may be, for example, an icon corresponding to the input area 109b illustrated in FIG. 10. Alternatively, the icon for controlling the air conditioner may be an icon having a shape different from that of the icon corresponding to the input area 109b.

Figure 55B:
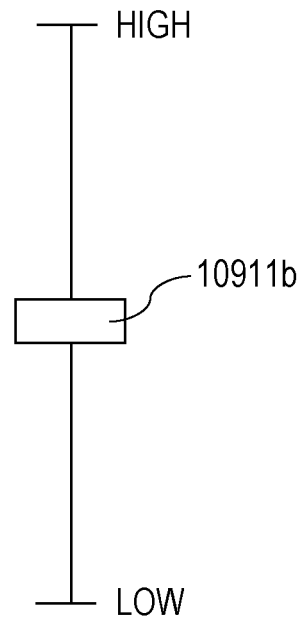
FIG. 55B is a diagram illustrating another example of the icon for controlling a device in the detection system according to the eighth embodiment of the present disclosure.

FIG. 55B is a diagram illustrating an example of an icon for controlling a device in the detection system according to the eighth embodiment of the present disclosure. More specifically, FIG. 55B illustrates an example of an icon 1091b for controlling the temperature of an air conditioner.

In FIG. 55B, when the icon 1091b is displayed on the information display panel 105, the position of a slide bar 10911b changes if the slide bar 10911b is slided while being touched.

For example, if the position of the slide bar 10911b has been changed upward, the device control unit 1041c outputs a control command for raising the temperature to the corresponding air conditioner.

On the other hand, for example, if the position of the slide bar 10911b has been changed downward, the device control unit 1041c outputs a control command for lowering the temperature to the corresponding air conditioner.

At this time, how much the temperature is changed is associated with how much the slide bar 10911b has been slided.

Thus, the user can display an icon of a device in the region 1050 that the user desires to display.

Figure 54B:
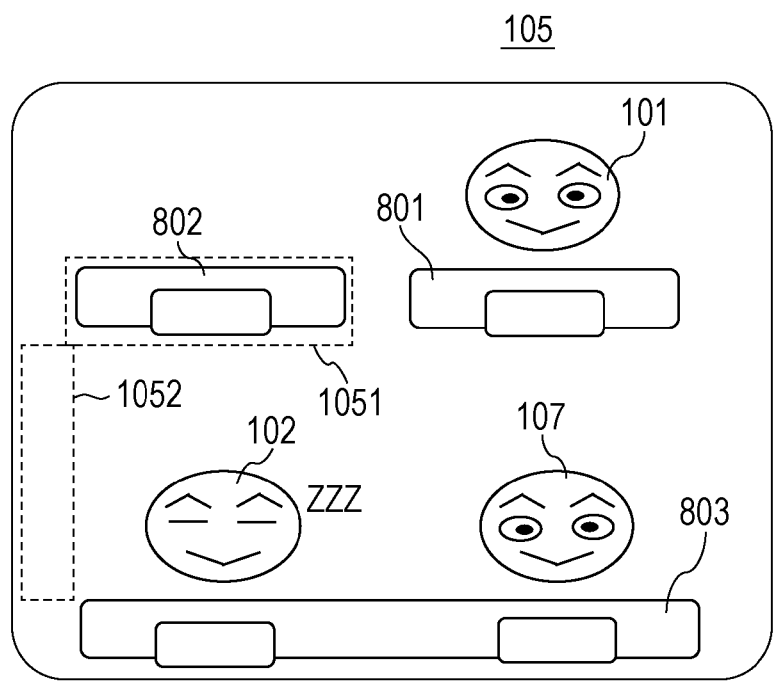
FIG. 54B is a diagram illustrating another example of the display screen of the information display panel in the detection system according to the eighth embodiment of the present disclosure.

The certain region is not limited to the region 1050. FIG. 54B is a diagram illustrating another example of the display screen of the information display panel 105 in the detection system according to the eighth embodiment of the present disclosure.

More specifically, FIG. 54B illustrates an example of the display screen at a time when the icon of the device installed near the passenger 102, who is asleep, is not displayed in the diagram. For example, a region 1051 of the diagram including the position at which the speaker is installed may be the certain region. In this example, a region including the icon 802 corresponding to the front passenger seat is the certain region. If a left to right (or opposite) sliding operation performed on the region 1051 has been detected, the icon for controlling the volume of the speaker is displayed in the region 1051.

In addition, for example, a region 1052 of the diagram including the position at which the air conditioner is installed may be the certain region. If a downward (or upward) sliding operation performed on the region 1052 has been detected, the icon for controlling the temperature of the air conditioner is displayed in the region 1052.

In addition, for example, if a left to right (or opposite) sliding operation performed on the region 1051 has been detected, the icon for controlling the volume of the speaker may be displayed in the region 1050.

In addition, for example, if a downward (or upward) sliding operation performed on the region 1052 has been detected, the icon for controlling the temperature of the air conditioner may be displayed in the region 1050.

By configuring the detection system in the above-described manner, the driver can display an icon of a device that the driver desires to display, when the driver wants to control the device.

Figure 56:
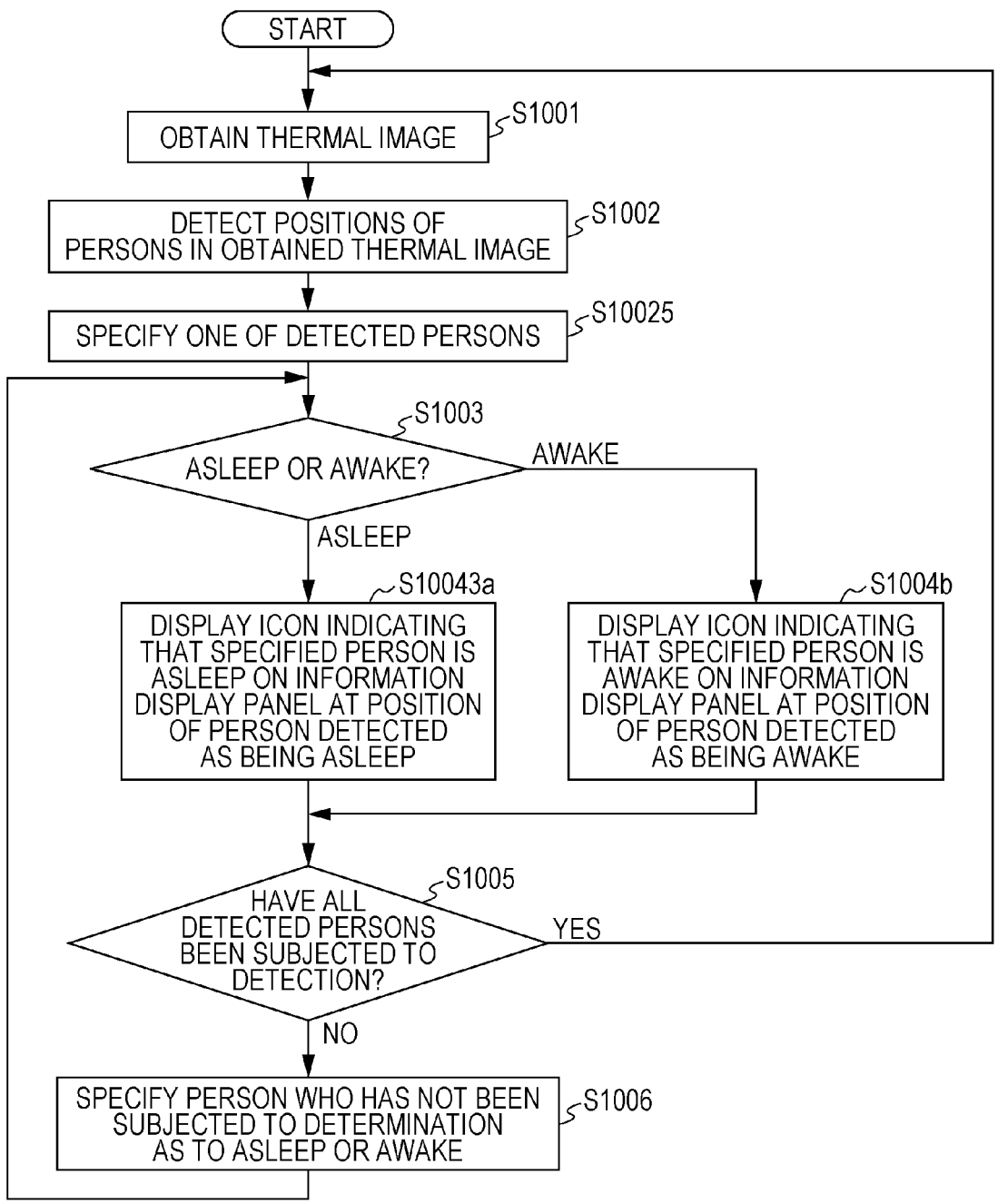
FIG. 56 is a flowchart illustrating an example of a process performed by the detection system according to the eighth embodiment of the present disclosure.

FIG. 56 is a flowchart illustrating an example of a process performed by the eighth embodiment of the present disclosure. In FIG. 56, steps having the same reference numerals as those used in FIG. 5 are the same as or correspond to the steps illustrated in FIG. 5. Therefore, description of the steps illustrated in FIG. 56 having the same reference numerals as those used in FIG. 5 is omitted here.

In step S10043a, the information display panel 105 displays an icon indicating that the specified person is asleep at the position of the specified person detected as being asleep.

In this embodiment, by executing the flowchart illustrated in FIG. 56, for example, the display screen illustrated in FIG. 54A is displayed.

Figure 57:
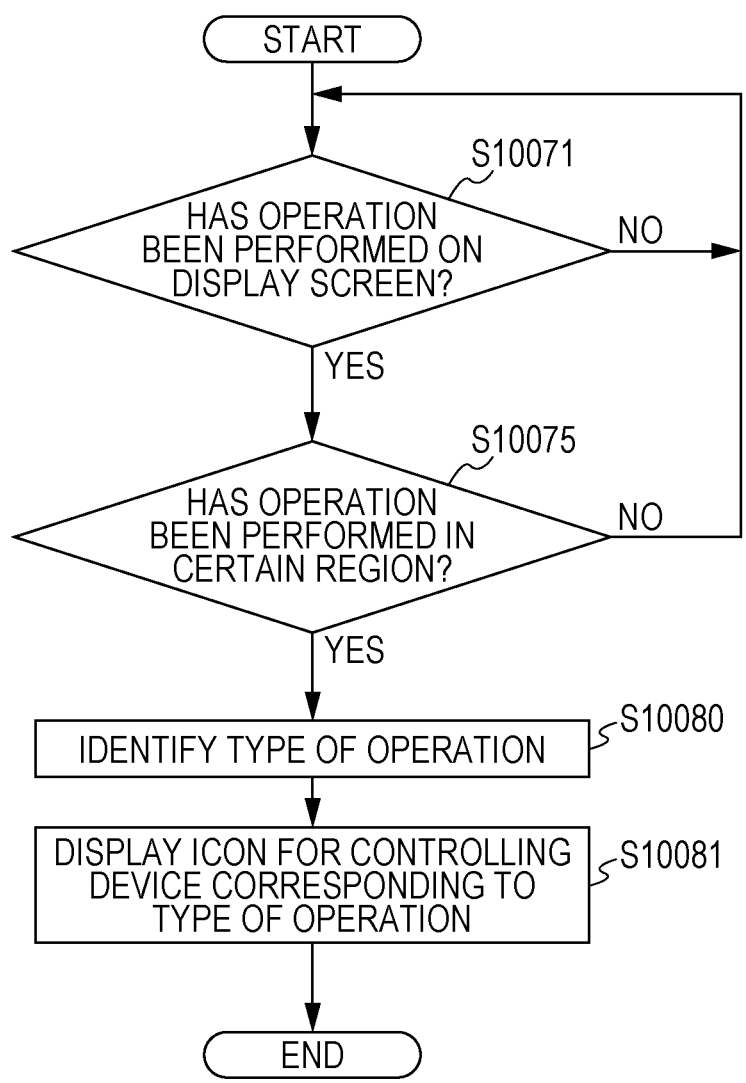
FIG. 57 is a flowchart illustrating an example of a process performed by the detection system according to the eighth embodiment of the present disclosure.

FIG. 57 is a flowchart illustrating an example of a process performed by the detection system according to the eighth embodiment of the present disclosure. The process illustrated in FIG. 57 is performed in parallel with, for example, the process illustrated in FIG. 56. In addition, the process illustrated in FIG. 57 will be described while taking the region 1050 illustrated in FIG. 54A as an example of the certain region.

First, in step S10071, the device control unit 1041c determines whether an operation has been performed on the information display panel 105 that is displaying the diagram of the inside of the automobile.

If the device control unit 1041c determines in step S10071 that an operation has been performed on the information display panel 105, the process proceeds to step S10075. If the device control unit 1041c has determined in step S10071 that an operation has not been performed on the information display panel 105, the processing in step S10071 is performed again.

Next, in step S10075, the device control unit 1041c determines whether a position at which the operation has been performed is inside the region 1050. If the device control unit 1041c has determined in step S10075 that the position at which the operation has been performed is inside the region 1050, the process proceeds to step S10080. If the device control unit 1041c has determined in step S10075 that the position at which the operation has been performed is not inside the region 1050, the process returns to step S10071.

In step S10080, the device control unit 1041c identifies the type of operation performed on the region 1050.

In step S10081, the device control unit 1041c transmits a control command for displaying an icon for controlling a device corresponding to the identified type of operation to the information display panel 105.

Upon receiving the control command for displaying the icon for controlling the device, the information display panel 105 displays the icon.

Although a configuration in which an icon for controlling a device installed near a person detected as being asleep is displayed has been described, the configuration used is not limited to this. For example, a region between the icon of the passenger 107, who is awake, and the icon 801 of the driver's seat in the display screen of the information display panel 105 illustrated in FIG. 54B may be determined as the certain region, and upon detecting an operation performed by the driver 101 on the certain region, the information display panel 105 may display an icon of a device installed near the position at which the passenger 107 has been detected.

In addition, a region to the right of the icon 801 of the driver's seat or the icon of the passenger 107 in the display screen of the information display panel 105 illustrated in FIG. 54B may be determined as the certain region, and upon detecting an operation performed by the driver 101 on the certain region, the information display panel 105 may display an icon of a device installed near the position at which the passenger 107 has been detected.

Needless to say, the configurations described in the above embodiments are examples and may be modified in various ways without deviating from the scope of the present disclosure. The above embodiments and modifications thereof may be obviously combined with one another and implemented.

Similarly, the above-described pieces of information displayed on the display screens of the information display panels 105, 305, 408, 507, and 711, the mobile terminals 606 and 736, and the like are examples and may be obviously modified in various ways without deviating from the scope of the present disclosure.

The detection system in the present disclosure is effective in, for example, a processing method, a program, a processing apparatus, and a detection system.

What is claimed is:

1. A processing method for a processing apparatus, the processing method causing a computer of the processing apparatus to perform a process comprising:
   detecting a position and a state of a passenger inside a vehicle on a basis of information indicating a state of space including seats inside the vehicle, the information being obtained from a sensor provided inside the vehicle;
   notifying an operator of the vehicle of the detected position and the detected state of the passenger inside the vehicle; and
   transmitting, upon detecting an operation, the operation being performed by the operator of the vehicle in response to the notifying, for controlling a device near the detected position of the passenger, a control command corresponding to the operation to the device,
   wherein, the processing apparatus is connected to a display in front of the operator of the vehicle,
   wherein, in the notifying, a display screen indicating a diagram including the seats inside the vehicle is displayed on the display, an icon corresponding to the detected state of the passenger inside the vehicle at a position of the diagram corresponding to the detected position of the passenger is displayed on the display, and an icon for controlling the device near the detected position of the passenger in the diagram is displayed on the display,
   wherein, if it has been detected that the icon for controlling the device has been selected, a control command for the device corresponding to the selected icon for controlling the device is transmitted to the device,
   wherein the information obtained from the sensor is information indicating temperature distribution in the space including the seats inside the vehicle, and
   wherein the detected position of the passenger and whether the passenger is asleep are determined on a basis of the temperature distribution, and, if it has been determined that the passenger is asleep, an icon, indicating that the passenger is asleep, is displayed on the display.

2. The processing method according to claim 1,
   wherein an icon for controlling, among air conditioners installed at a plurality of positions inside the vehicle, an air conditioner installed near the detected position of the passenger is displayed, as the icon for controlling the device, on the display, and
   wherein, if it has been detected that the icon for controlling the air conditioner has been selected, a control command for controlling at least any of air volume, set temperature, and a wind direction of the air conditioner corresponding to the icon for controlling the air conditioner.

3. The processing method according to claim 1,
   wherein whether the passenger is wearing a seatbelt is detected on a basis of the temperature distribution in the vehicle, and, if it has been determined that the passenger is not wearing the seatbelt, the operator of the vehicle is notified that the passenger is not wearing the seatbelt.

4. The processing method according to claim 1,
   wherein a position of a seatbelt worn by the passenger is detected on a basis of the temperature distribution in the vehicle, and warning information is issued on a basis of the detected position of the passenger and the detected position of the seatbelt.

5. The processing method according to claim 1,
   the processing method further causes the computer of the processing apparatus to perform detecting whether the vehicle is running or stationary,
   wherein the display is inhibited from displaying the icon for controlling the device when the detecting detects that the vehicle is running, and
   wherein the display is permitted to display the icon for controlling the device when the detecting detects that the vehicle is stationary.

6. The processing method according to claim 1,
   wherein the sensor is an infrared array sensor, and
   wherein the information obtained from the sensor is a thermal image indicating temperature distribution in the space including the seats inside the vehicle.

7. The processing method according to claim 1,
   wherein the vehicle is an automobile.

8. The processing method according to claim 1,
   wherein the detected state of the passenger is a physiological state of the passenger.

9. The processing method according to claim 1,
   wherein the detected position and the detected state of the passenger is detected based on thermal imaging by the sensor.

10. The processing method according to claim 1,
    wherein the detected state of the passenger is a sleep state of the passenger.

11. The processing method according to claim 1,
    wherein the detected position is a position of a particular body part of the passenger.

12. The processing method according to claim 1,
    wherein the operator of the vehicle is a driver of the vehicle.

13. A processing method for a processing apparatus, the processing method causing a computer of the processing apparatus to perform a process comprising:
    detecting a position and a state of a passenger inside a vehicle on a basis of information indicating a state of space including seats inside the vehicle, the information being obtained from a sensor provided inside the vehicle;
    notifying an operator of the vehicle of the detected position and the detected state of the passenger inside the vehicle; and
    transmitting, upon detecting an operation, the operation being performed by the operator of the vehicle in response to the notifying, for controlling a device near the detected position of the passenger, a control command corresponding to the operation to the device,
    wherein, the processing apparatus is connected to a display in front of the operator of the vehicle,
    wherein, in the notifying, a display screen indicating a diagram including the seats inside the vehicle is displayed on the display, an icon corresponding to the detected state of the passenger inside the vehicle at a position of the diagram corresponding to the detected position of the passenger is displayed on the display, and an icon for controlling the device near the detected position of the passenger in the diagram is displayed on the display,
    wherein, if it has been detected that the icon for controlling the device has been selected, a control command for the device corresponding to the selected icon for controlling the device is transmitted to the device, wherein the information obtained from the sensor is information indicating temperature distribution in the space including the seats inside the vehicle, and wherein whether the passenger is asleep is determined on a basis of an amount of variation in the temperature distribution over time, the variation in the temperature distribution being obtained from the sensor, and, if it has been determined that the passenger is asleep, an icon, indicating that the passenger is asleep, is displayed on the display.

14. A processing method for a processing apparatus, the processing method causing a computer of the processing apparatus to perform a process comprising:

detecting a position and a state of a passenger inside a vehicle on a basis of information indicating a state of space including seats inside the vehicle, the information being obtained from a sensor provided inside the vehicle;

notifying an operator of the vehicle of the detected position and the detected state of the passenger inside the vehicle; and transmitting, upon detecting an operation, the operation being performed by the operator of the vehicle in response to the notifying, for controlling a device near the detected position of the passenger, a control command corresponding to the operation to the device, wherein the information obtained from the sensor is information indicating temperature distribution in the space including the seats inside the vehicle, wherein whether the passenger is wearing a seatbelt is detected on a basis of the temperature distribution in the vehicle, and, if it has been determined that the passenger is not wearing the seatbelt, the operator of the vehicle is notified that the passenger is not wearing the seatbelt, and wherein the seatbelt includes two materials having different values of emissivity, and whether the seatbelt is used is detected by detecting a pattern of temperature distribution corresponding to the two materials.

15. A processing method for a processing apparatus, the processing method causing a computer of the processing apparatus to perform a process comprising:

detecting a position and a state of a passenger inside a vehicle on a basis of information indicating a state of space including seats inside the vehicle, the information being obtained from a sensor provided inside the vehicle;

notifying an operator of the vehicle of the detected position and the detected state of the passenger inside the vehicle; and transmitting, upon detecting an operation, the operation being performed by the operator of the vehicle in response to the notifying, for controlling a device near the detected position of the passenger, a control command corresponding to the operation to the device, wherein the information obtained from the sensor is information indicating temperature distribution in the space including the seats inside the vehicle, wherein a position of a seatbelt worn by the passenger is detected on a basis of the temperature distribution in the vehicle, and warning information is issued on a basis of the detected position of the passenger and the detected position of the seatbelt, and wherein the seatbelt includes two materials having different values of emissivity, and the detected position of the seatbelt is detected by detecting a pattern of temperature distribution corresponding to the two materials.

* * * * *